US008700659B2

(12) United States Patent
Skeen et al.

(10) Patent No.: US 8,700,659 B2
(45) Date of Patent: Apr. 15, 2014

(54) VENUE-RELATED MULTI-MEDIA MANAGEMENT, STREAMING, AND ELECTRONIC COMMERCE TECHNIQUES IMPLEMENTED VIA COMPUTER NETWORKS AND MOBILE DEVICES

(71) Applicant: Opus Deli, Inc., Berkeley, CA (US)

(72) Inventors: Wayne Donald Maddock Skeen, Berkeley, CA (US); Christopher Thomas Ross, Berkeley, CA (US); Howard Gregg Cockrill, Oakland, CA (US); Sara Anne Mertz, Berkeley, CA (US); Matthew Paul Smith, Berkeley, CA (US); David Mendel Mayeri, Orinda, CA (US)

(73) Assignee: Opus Deli, Inc., Emeryville, CA (US)

( * ) Notice: Subject to any disclaimer, the term of this patent is extended or adjusted under 35 U.S.C. 154(b) by 0 days.

(21) Appl. No.: 13/873,204

(22) Filed: Apr. 29, 2013

(65) Prior Publication Data

US 2013/0339877 A1 Dec. 19, 2013

Related U.S. Application Data

(63) Continuation-in-part of application No. 13/517,505, filed on Jun. 13, 2012.

(60) Provisional application No. 61/713,582, filed on Oct. 14, 2012.

(51) Int. Cl.
*G06F 17/30* (2006.01)
*G06F 17/00* (2006.01)

(52) U.S. Cl.
USPC ............... 707/769; 707/754; 709/203

(58) Field of Classification Search
CPC .............. G06F 17/30699; Y10S 707/99933
USPC ............ 707/736, 754, 769, 805; 709/203
See application file for complete search history.

(56) References Cited

U.S. PATENT DOCUMENTS

| 6,925,458 | B2 * | 8/2005 | Scaturro et al. ............... 1/1 |
| 7,693,978 | B2 * | 4/2010 | Eliason et al. ............... 709/223 |
| 7,720,871 | B2 | 5/2010 | Rogers et al. |
| 8,392,206 | B2 * | 3/2013 | Parekh et al. ............... 705/1.1 |
| 2004/0093325 | A1 | 5/2004 | Banerjee et al. |
| 2007/0022055 | A1 * | 1/2007 | Eliason et al. ............... 705/51 |
| 2007/0156664 | A1 | 7/2007 | Norton et al. |
| 2008/0104627 | A1 * | 5/2008 | Avedissian ............... 725/25 |
| 2009/0144244 | A1 | 6/2009 | Maghoul et al. |
| 2012/0047077 | A1 * | 2/2012 | Humphrey ............... 705/300 |

OTHER PUBLICATIONS

Apple computers (apple store), "iTunes Radio", www.apple.com/itunes/itunes-radio, pp. 1-8, printed Aug. 12, 2013.*

(Continued)

*Primary Examiner* — Cheryl Lewis
(74) *Attorney, Agent, or Firm* — EcoTech Law Group, P.C.; Dean E. Wolf, Esq.

(57) ABSTRACT

Various aspects described or referenced herein are directed to different methods, systems, and computer program products relating to multi-media management and streaming techniques implemented over a computer network, including, for example, one or more features and/or functions relation to one or more of the following (or combinations thereof): venue-based streaming radio stations, mobile user graphical user interfaces, QuickPlay dynamic streaming radio stations based on a user's geolocation, etc.

19 Claims, 31 Drawing Sheets

(56) References Cited

OTHER PUBLICATIONS

PCT International Search Report, PCT Application No. PCT/US2012/042306, International Filing Date Jun. 13, 2012, Search report mailed Dec. 18, 2012.
PCT International Written Opinion, PCT Application No. PCT/US2012/042306, International Filing Date Jun. 13, 2012, Search report mailed Dec. 18, 2012.
www.8Tracks.com, website printout, printed Jun. 20, 2012.
www.artistgrowth.com, website printout, Jun. 20, 2012.
www.bandcamp.com, website printout, Jun. 20, 2012.
www.bandsintown.com, website printout, Jun. 20, 2012.
www.earbits.com, website printout, Jun. 20, 2012.
www.grooveshark.com website printout, Jun. 20, 2012.
www.iheart.com, website printout, Jun. 20, 2012.
www.jango.com, website printout, Jun. 20, 2012.
www.last.fm, website printout Jun. 20, 2012.
https://apps.facebook.com/concertcalender/#_=_, website printout Jun. 20, 2012.
https://mog.com, website printout Jun. 20, 2012.
www.myspace.com, website printout Jun. 20, 2012.
www.pandora.com, website printout Jun. 20, 2012.
www.rdio.com, website printout Jun. 20, 2012.
www.reverbnation.com, website printout Jun. 20, 2012.
www.slacker.com, website printout Jun. 20, 2012.
www.getsongbird.com, website printout Jun. 20, 2012.
www.songza.com, website printout Jun. 20, 2012.
www.soundcloud.com, website printout Jun. 20, 2012.
www.spotify.com/us/desktop-splash/?utm_source=spotify&utm_medium=web&utm_campaign=start, website printout Jun. 20, 2012.
www.turntable.fm, website printout Jun. 20, 2012.

* cited by examiner

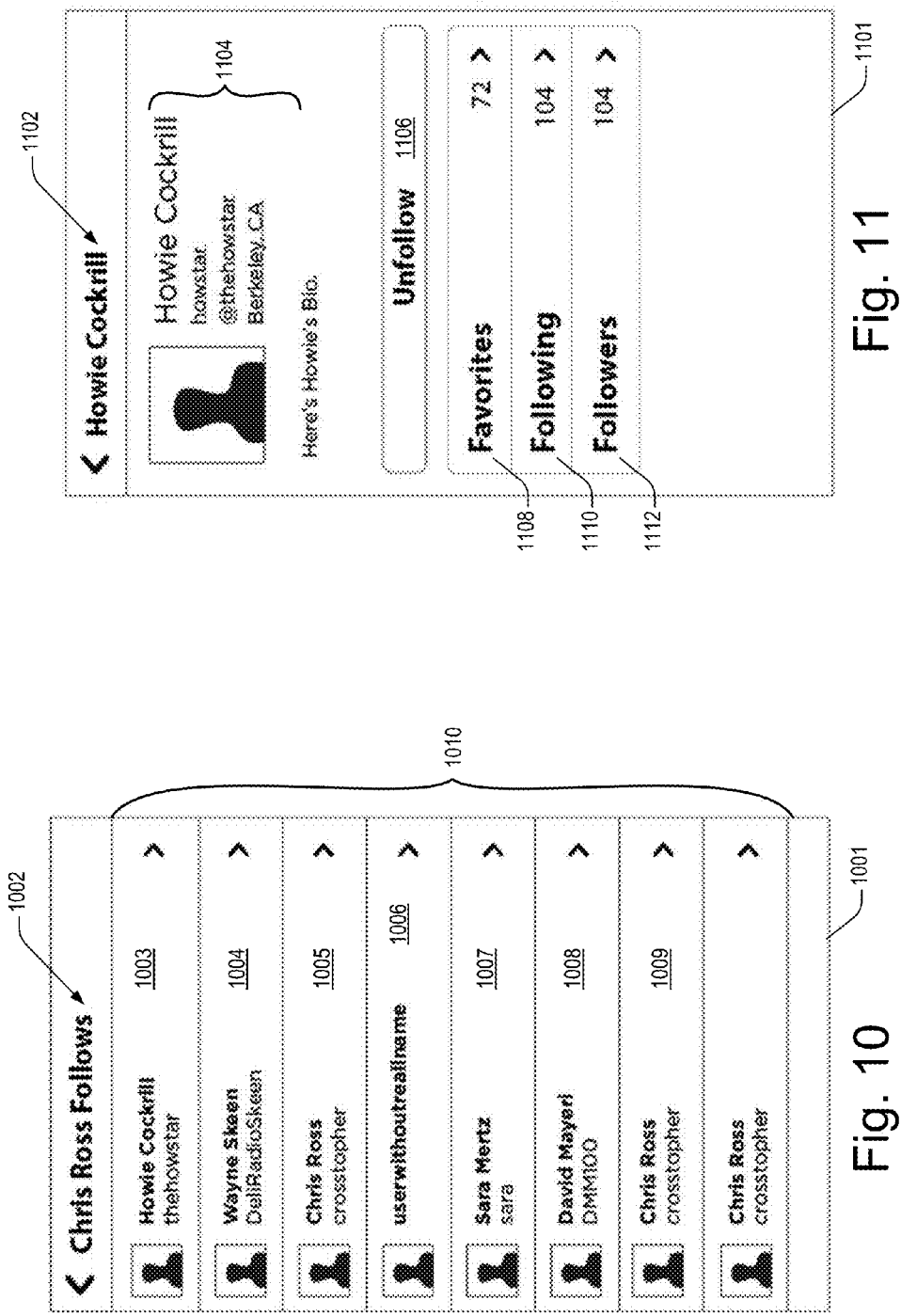

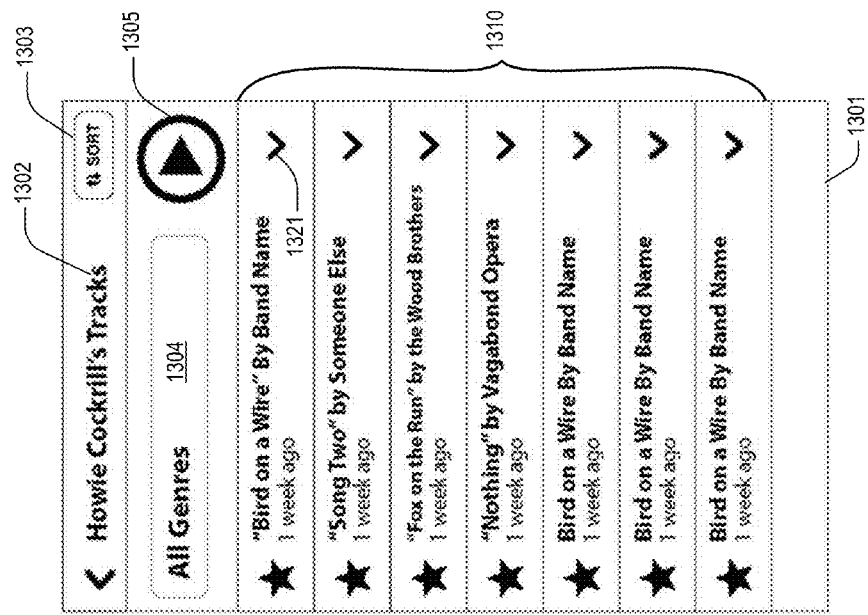
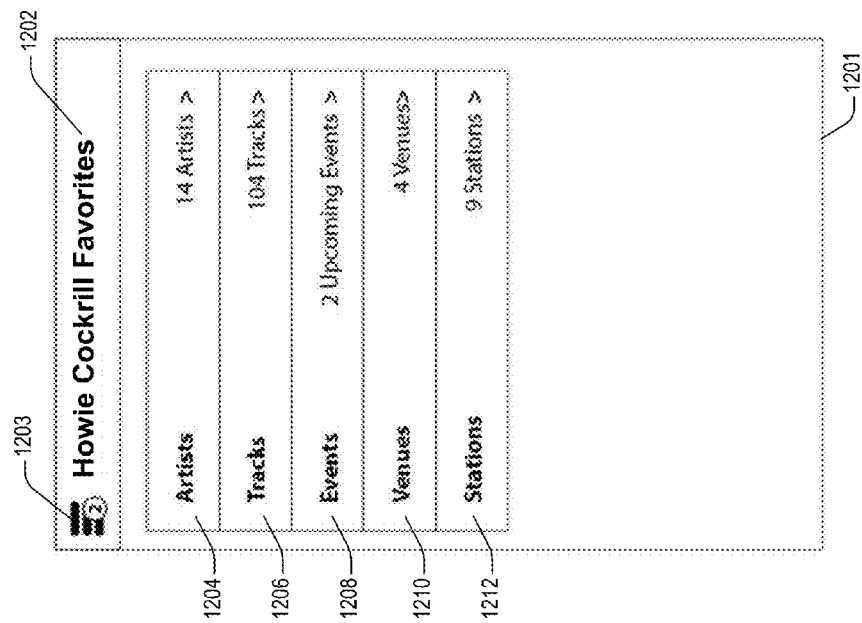
Fig. 13
Fig. 12

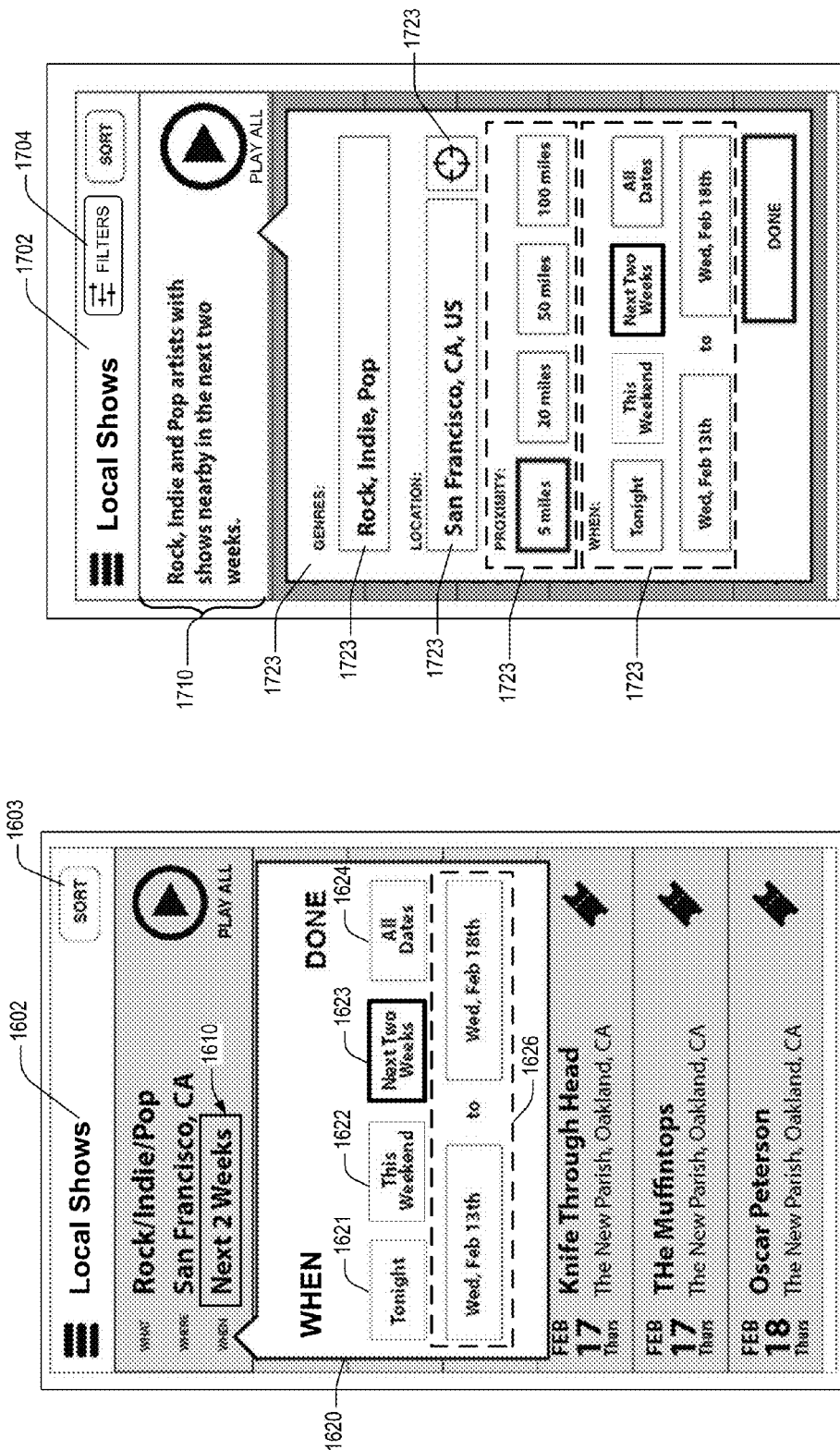

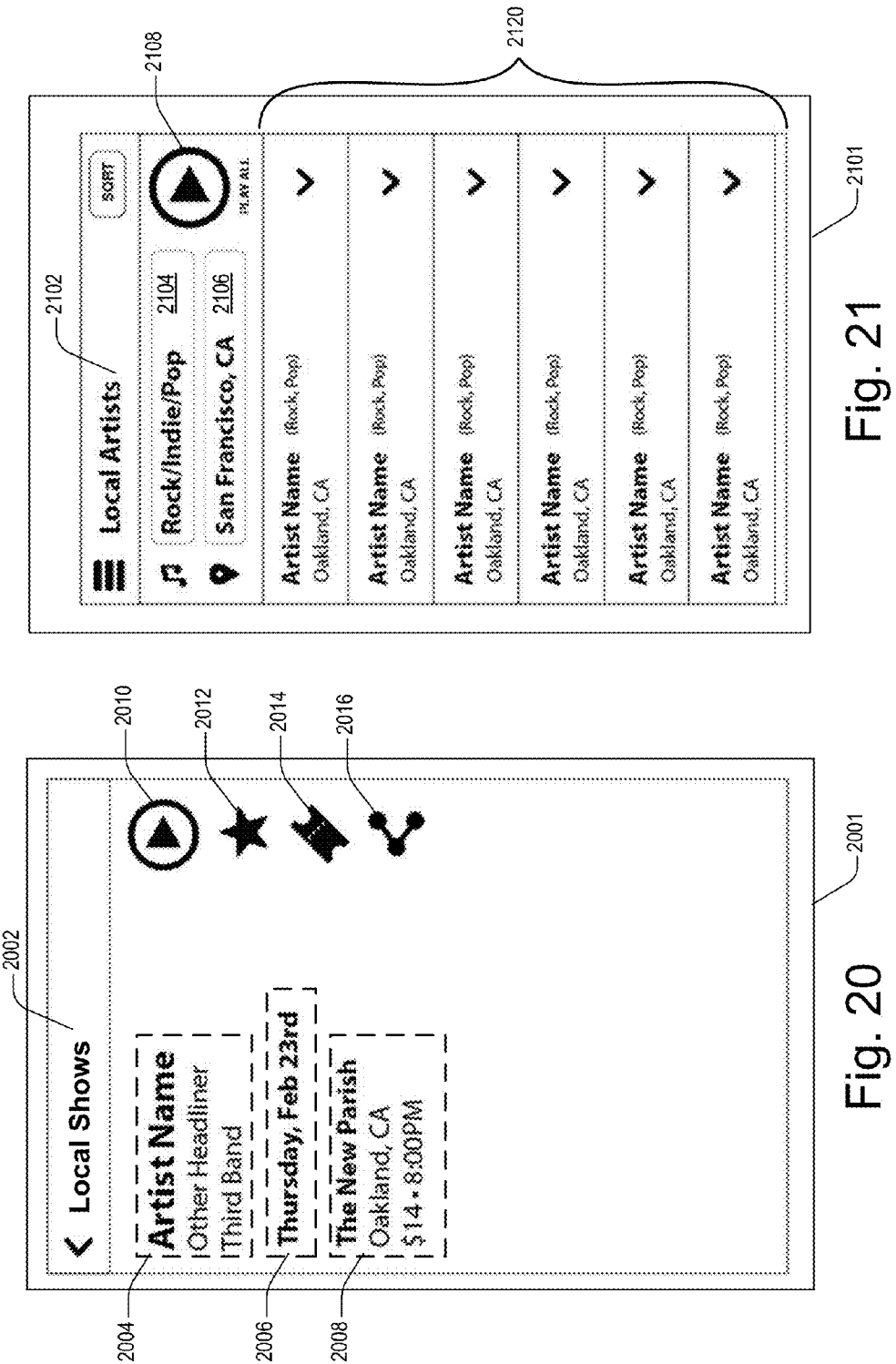

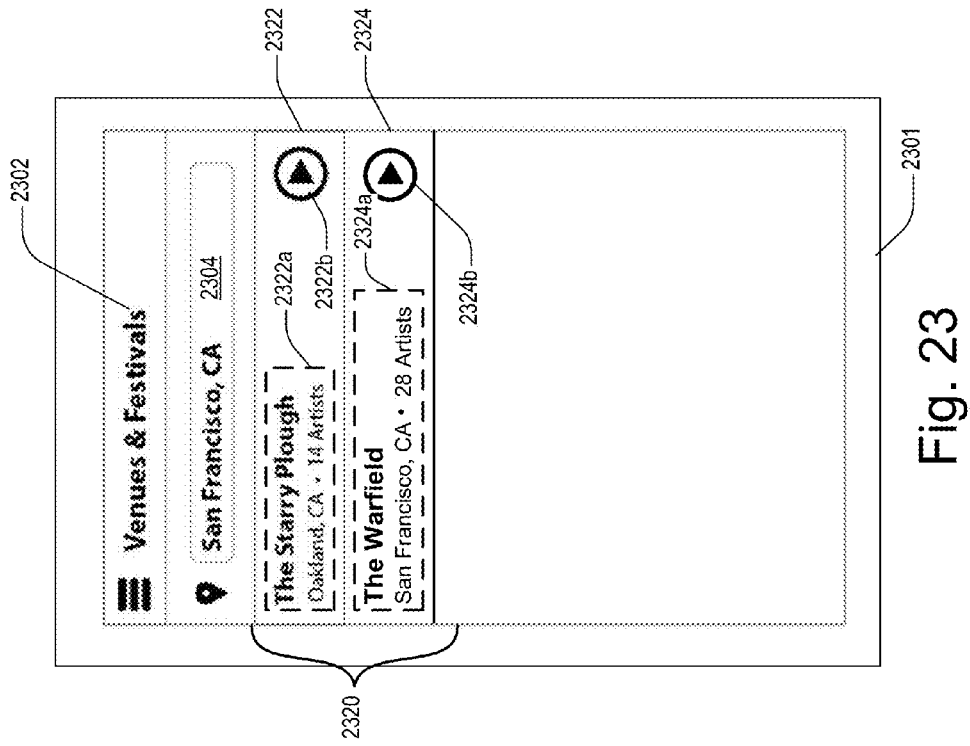
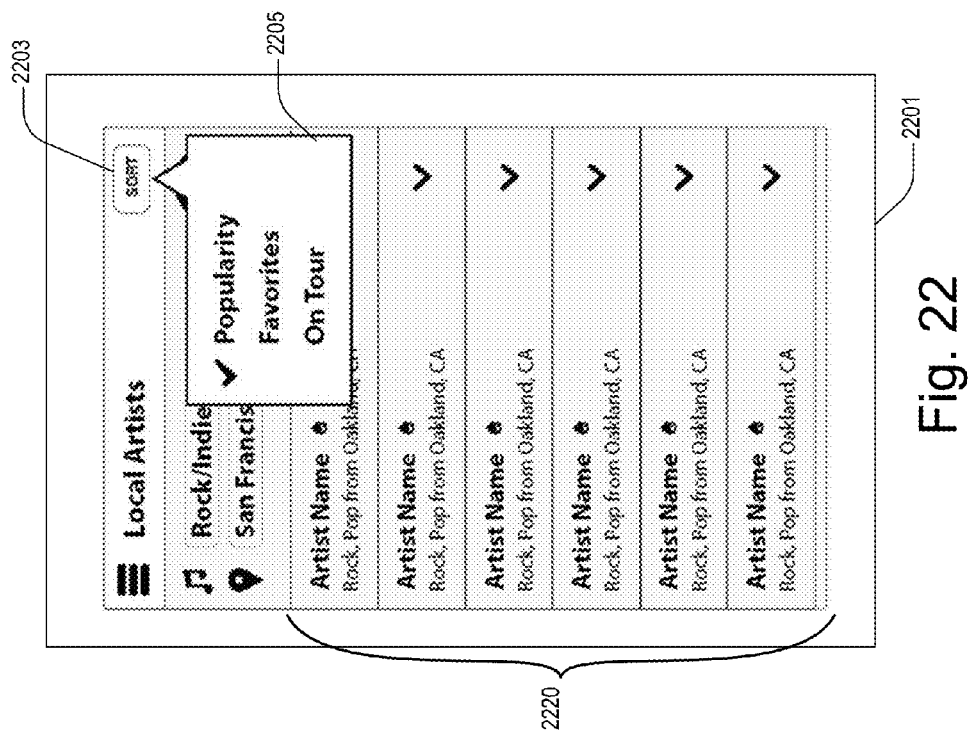
Fig. 23
Fig. 22

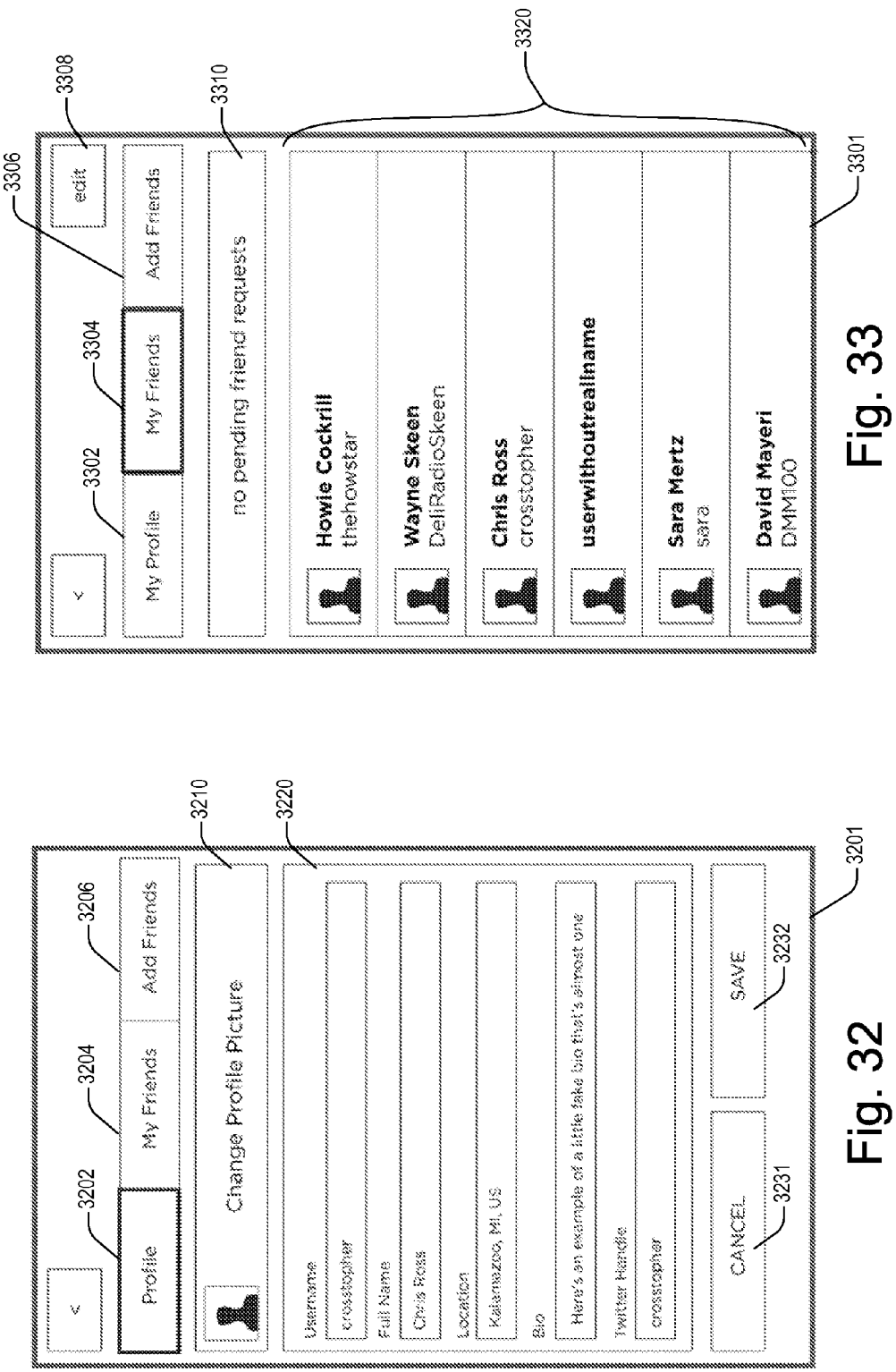

VENUE-RELATED MULTI-MEDIA MANAGEMENT, STREAMING, AND ELECTRONIC COMMERCE TECHNIQUES IMPLEMENTED VIA COMPUTER NETWORKS AND MOBILE DEVICES

RELATED APPLICATION DATA

The present application claims benefit, pursuant to the provisions of 35 U.S.C. §119, of U.S. Provisional Application Ser. No. 61/713,582, titled "MULTI-MEDIA MANAGEMENT, STREAMING, AND ELECTRONIC COMMERCE TECHNIQUES IMPLEMENTED OVER A COMPUTER NETWORK", naming Skeen et al. as inventors, and filed Oct. 14, 2012, the entirety of which is incorporated herein by reference for all purposes.

This application is a continuation-in-part application, pursuant to the provisions of 35 U.S.C. §120, of prior U.S. patent application Ser. No. 13/517,505, titled "MULTI-MEDIA MANAGEMENT AND STREAMING TECHNIQUES IMPLEMENTED OVER A COMPUTER NETWORK", naming SKEEN, et. al. as inventors, and filed Jun. 13, 2012, the entirety of which is incorporated herein by reference for all purposes.

BACKGROUND

The present disclosure relates to network-based information searching and content delivery. More particularly, the present disclosure relates to multi-media management and streaming techniques implemented over a computer network.

BRIEF DESCRIPTION OF THE DRAWINGS

FIGS. 7-47 illustrate example screenshots of various graphical user interfaces (GUIs) which may be used to facilitate, initiate and/or perform various operation(s) and/or action(s) relating to one or more of the MMMS aspects disclosed or referenced herein.

DETAILED DESCRIPTION OF EXAMPLE EMBODIMENTS

Overview

Figure 1:
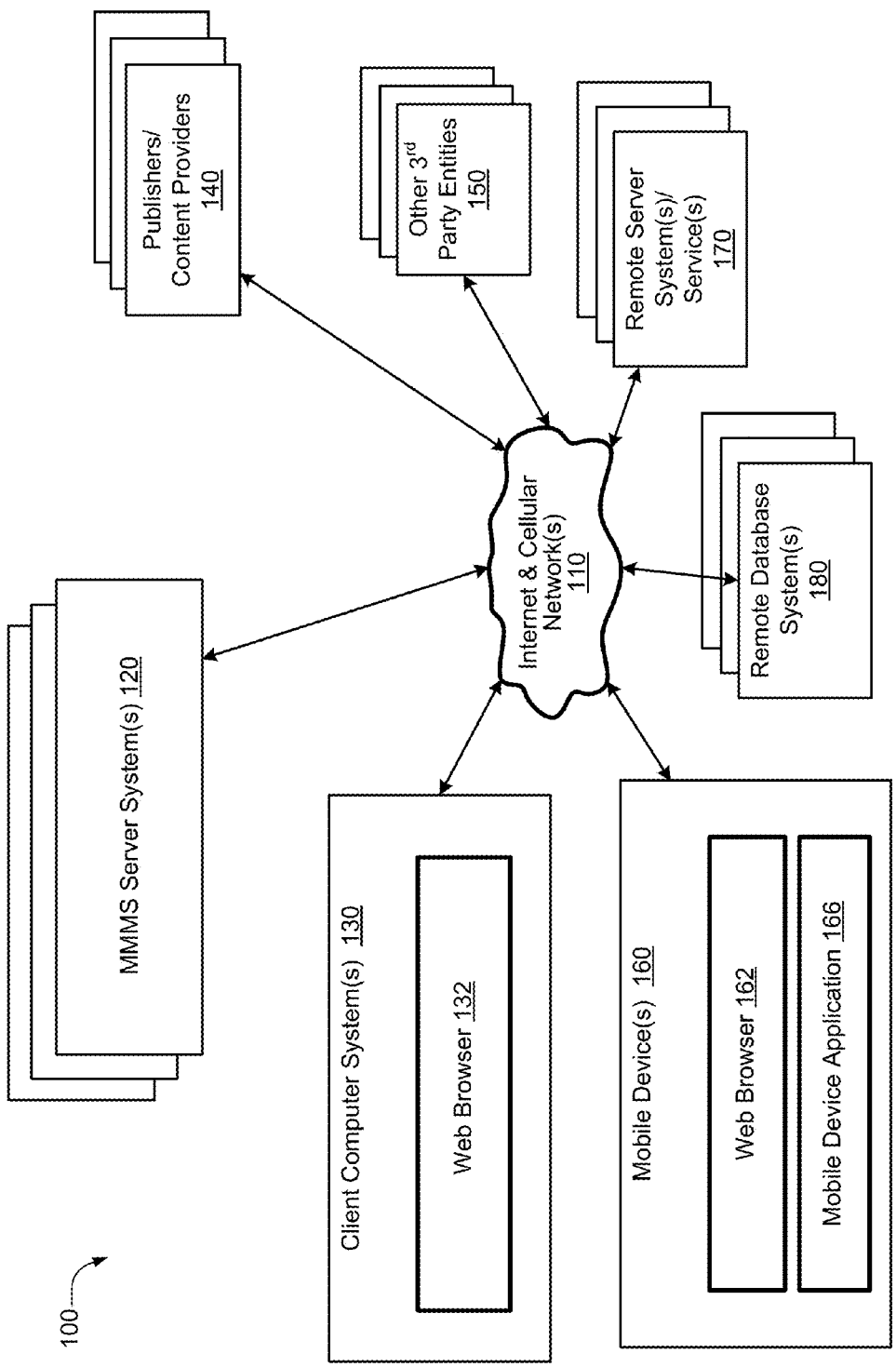
FIG. 1 illustrates a simplified block diagram of a specific example embodiment of a Multi-Media Management and Streaming (MMMS) System 100 which may be implemented in network portion 100.

Various aspects described or referenced herein are directed to different methods, systems, and computer program products relating to venue-related multi-media management, streaming, and electronic commerce techniques implemented via computer networks and mobile devices, including, for example, one or more features and/or functions relation to one or more of the following (or combinations thereof): venue-based streaming radio stations, mobile user graphical user interfaces, QuickPlay dynamic streaming radio stations based on a user's geolocation, etc.

One aspect disclosed herein is directed to different methods, systems, and computer program products for facilitating user access to streamed multimedia content via a computer network, the method comprising: determining a first set of filter criteria for use in performing a database search for music-related information matching the first set of filter criteria, wherein the first set of filter criteria includes first venue filter criteria specifying a first venue; identifying a first set of artists or bands ("artists/bands") that are scheduled to perform in at least one live music performance at the first venue; performing, using the first set of artists/bands, a database search of at least one database for songs or tracks ("songs/tracks") which are performed by or recorded by at least one of the artists/bands of the first set of artists/bands; identifying a first set of songs/tracks from the at least one database which are performed by or recorded by at least one of the artists/bands of the first set of artists/bands; and; dynamically creating, using the first set of songs/tracks, a first venue-related streaming media station, wherein the first venue-related streaming media station is configured to stream songs/tracks from the first set of songs/tracks to a first user's electronic device for audio presentation at the first user's electronic device.

In at least one embodiment, various method(s), system(s) and/or computer program product(s) may be operable for: receiving a first set of input from the first user, the first set of input including the first venue filter criteria, and including genre criteria specifying a first genre; identifying, using the first genre criteria, a filtered set of songs/tracks from the at least one database which match the first genre criteria and which are performed by or recorded by at least one of the artists/bands of the first set of artists/bands; dynamically creating, using the filtered set of songs/tracks, a filtered venue-related streaming media station, wherein the filtered venue-related streaming media station is configured to stream songs/tracks from the filtered set of songs/tracks to the first user's electronic device; and; streaming, in response to the first request, songs/tracks from the filtered set of songs/tracks to the first user's electronic device.

In at least one embodiment, various method(s), system(s) and/or computer program product(s) may be operable for: receiving a first set of input from the first user, the first set of input including the first venue filter criteria, and including timeframe criteria specifying a first time interval; identifying a second set of artists or bands ("artists/bands") that are scheduled to perform in at least one live music performance at the first venue during the first time interval; and; performing, using the second set of artists/bands, a database search of at least one database for songs or tracks ("songs/tracks") which are performed by or recorded by at least one of the artists/bands of the second set of artists/bands; identifying a filtered set of songs/tracks from the at least one database which are performed by or recorded by at least one of the artists/bands of the second set of artists/bands; dynamically creating, using the filtered set of songs/tracks, a filtered venue-related streaming media station, wherein the filtered venue-related streaming media station is configured to stream songs/tracks from the filtered set of songs/tracks to the first user's electronic device; and; streaming, in response to the first request, songs/tracks from the filtered set of songs/tracks to the first user's electronic device.

Another aspect disclosed herein is directed to different methods, systems, and computer program products for facilitating user access to multimedia content via a computer network, the method comprising: determining a first set of filter criteria for use in performing a database search for music-related information matching the first set of filter criteria, wherein the first set of filter criteria includes search type criteria indicating that a search is to be performed for artists or bands matching the first set of filter criteria which have upcoming shows at the at least one venue; performing, using the first set of filter criteria, a database search of at least one database for music-related information matching the first set of filter criteria; identifying, using the first set of filter criteria, a first set of artists or bands matching the first set of filter criteria which have upcoming shows at the at least one venue; and; dynamically creating a streaming media station which is configured or designed to play songs performed by or recorded by the first set of artists or bands.

Yet another aspect disclosed herein is directed to different methods, systems, and computer program products for facilitating user access to streamed multimedia content via a first graphical user interface (GUI), the method comprising: presenting the first GUI at a first computer device of a first user; receiving, via the first GUI, a first set of input from the first user, the first set of input including first venue filter criteria specifying a first venue; receiving, via the first GUI, a first request from the first user to listen to a venue-related streaming media station which is configured to play songs or tracks ("songs/tracks") performed by or recorded by artists or bands ("artists/bands") that are scheduled to perform in at least one live music performance at the first venue; identifying a first set of artists or bands that are scheduled to perform in at least one live music performance at the first venue; performing, using the first set of artists/bands, a database search of at least one database for songs or tracks which are performed by or recorded by at least one of the artists/bands of the first set of artists/bands; identifying a first set of songs/tracks from the at least one database which are performed by or recorded by at least one of the artists/bands of the first set of artists/bands; and; dynamically creating, using the first set of songs/tracks, a first venue-related streaming media station, wherein the first venue-related streaming media station is configured to stream songs/tracks from the first set of songs/tracks to a first user's electronic device; and; streaming, in response to the first request, songs/tracks from the first set of songs/tracks to a first user's electronic device for playback at the first user's electronic device.

SPECIFIC EXAMPLE EMBODIMENTS

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Various aspects described or referenced herein are directed to different methods, systems, and computer program products relating to multi-media management and streaming techniques implemented over a computer network. According to various embodiments disclosed herein, a Multi-Media Management and Streaming (MMMS) System may be configured or designed to provide online users with "location based" streaming radio functionality. Users from different geographic locations may access a variety of MMMS System GUIs to search for, create, and/or share customized streaming radio stations which may be configured to identify and play/stream music associated with one or more of the following (or combinations thereof):

Upcoming shows;
Bands/Artists;
Venue related events;
Online streaming radio stations;
Online streaming video stations;
Etc.

In at least one embodiment, the MMMS System may include functionality for enabling users to selectively filter search results and/or presented content according to a variety of different filtering criteria such as, for example, one or more of the following (or combinations thereof):

geographic location;
geographic proximity;
time/date criteria;
venue name(s);
music genre(s);
video genre(s);
artist/band name(s)
user ID;
geographic location of artist/band origin (e.g., home town);
geographic location of upcoming shows and/or events;
geographic proximity of upcoming shows and/or events;
etc.

In at least some embodiments described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain deliradio.com (www.deliradio.com). Thus, for example, as used herein, the terms "MMMS System", "DeliRadio", and "DeliRadio System" may be used interchangeably, unless otherwise noted. Additionally, at least some embodiments described herein, the terms "Artist" or "Band" may be used interchangeably to refer to one or more of the following (or combinations thereof): music related artist(s)/band(s), songwriters, composers, performers, etc.

FIG. 1 illustrates a simplified block diagram of a specific example embodiment of a Multi-Media Management and Streaming (MMMS) System 100 which may be implemented in network portion 100. As described in greater detail herein, different embodiments of MMMS Systems may be configured, designed, and/or operable to provide various different types of operations, functionalities, and/or features generally relating to MMMS System technology. Further, as described in greater detail herein, many of the various operations, functionalities, and/or features of the MMMS System(s) disclosed herein may provide may enable or provide different types of advantages and/or benefits to different entities interacting with the MMMS System(s).

Figure 6:
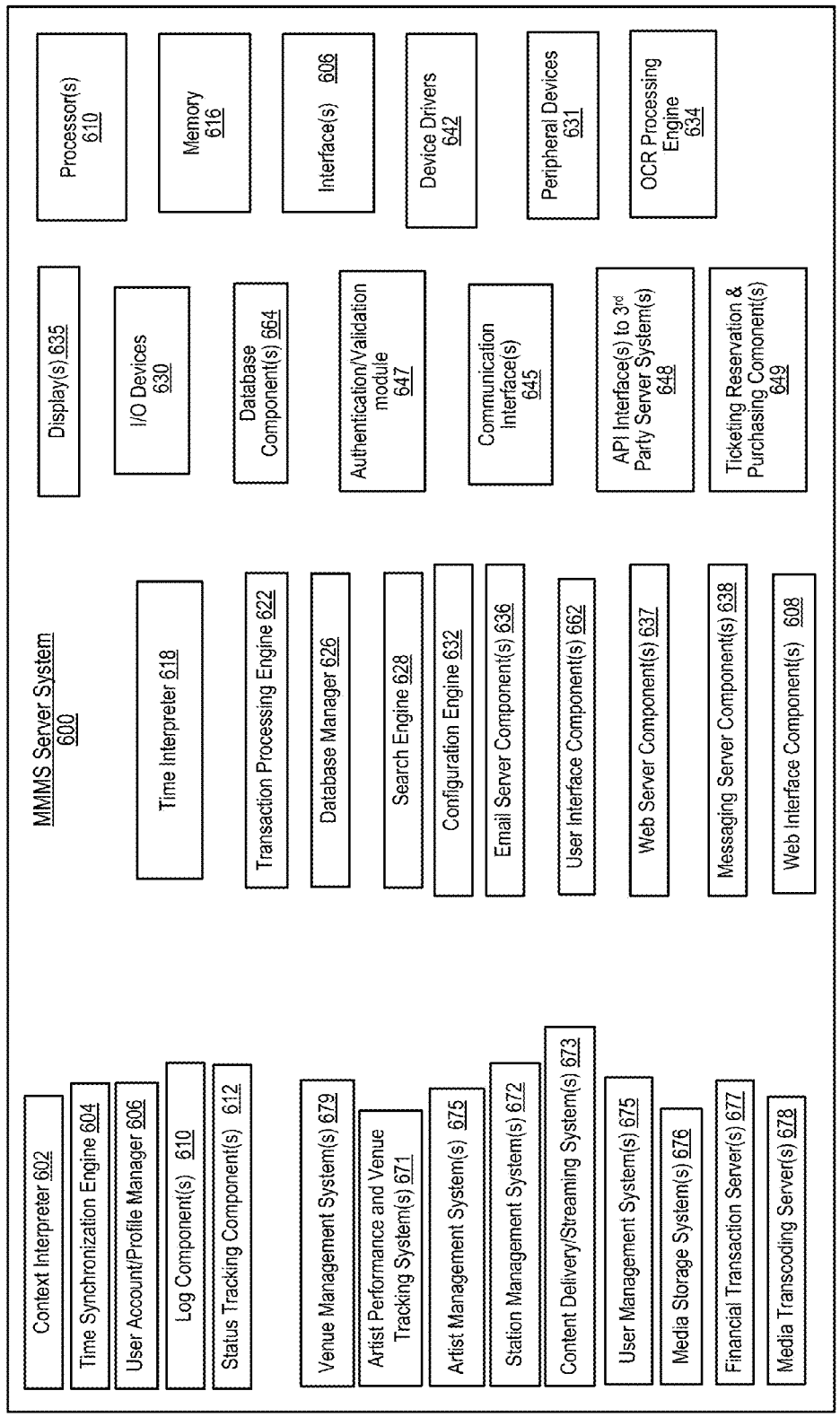
FIG. 6 illustrates an example of a functional block diagram of a MMMS Server System in accordance with a specific embodiment.

According to different embodiments, the MMMS System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the MMMS System may include one or more of the following types of systems, components, devices, processes, etc. (or combinations thereof):

MMMS Server System(s) 120—In at least one embodiment, the MMMS Server System(s) may be operable to perform and/or implement various types of functions, operations, actions, and/or other features such as those described or referenced herein (e.g., such as those illustrated and/or described with respect to FIG. 6).

Publisher/Content Provider System component(s) 140. In at least one embodiment, one or more devices, components, and/or systems of the MMMS System (100) may be operable to interface with external content sources via an import/export API to load information into the various storage devices and database within the MMMS System (120).

Client Computer System (s) 130
$3^{rd}$ Party System(s)/Service(s) 150
Internet & Cellular Network(s) 110
Remote Database System(s) 180
Remote Server System(s) 170, which, for example, may include, but are not limited to, one or more of the following (or combinations thereof):
Content provider servers/services
Media Streaming servers/services
Database storage/access/query servers/services
Financial transaction servers/services
Payment gateway servers/services
Electronic commerce servers/services
Event management/scheduling servers/services
Etc.

Figure 4:
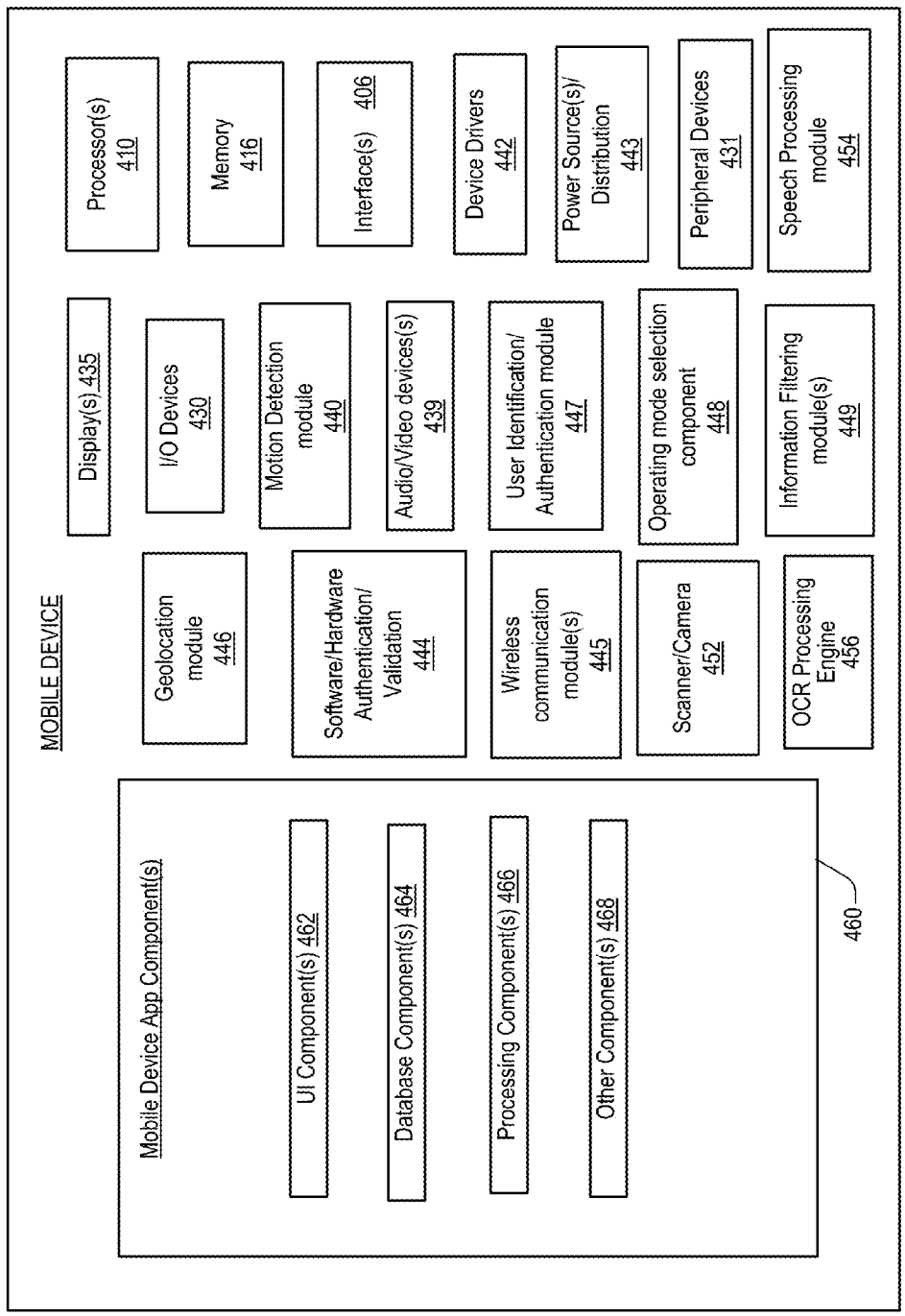
FIG. 4 is a simplified block diagram of an exemplary client system 400 in accordance with a specific embodiment.

Mobile Device(s) 160—In at least one embodiment, the Mobile Device(s) may be operable to perform and/or implement various types of functions, operations, actions, and/or other features such as those described or referenced herein (e.g., such as those illustrated and/or described with respect to FIG. 4). Additionally, in some embodiments, mobile devices which interact with the MMMS may offer additional unique functionality, including, but not limited to, temporal and geographic operations involving bands, events, users, and venues, enhanced social networking functionality, and photographic and videographic capture and transmission.

Etc.

In at least one embodiment, the MMMS System may be operable to utilize and/or generate various different types of data and/or other types of information when performing specific tasks and/or operations. This may include, for example, input data/information and/or output data/information. For example, in at least one embodiment, the MMMS System may be operable to access, process, and/or otherwise utilize information from one or more different types of sources, such as, for example, one or more local and/or remote memories, devices and/or systems. Additionally, in at least one embodiment, the MMMS System may be operable to generate one or more different types of output data/information, which, for example, may be stored in memory of one or more local and/or remote devices and/or systems. Examples of different types of input data/information and/or output data/information which may be accessed and/or utilized by the MMMS System may include, but are not limited to, one or more of those described and/or referenced herein.

According to specific embodiments, multiple instances or threads of the MMMS System may be concurrently implemented and/or initiated via the use of one or more processors and/or other combinations of hardware and/or hardware and software. For example, in at least some embodiments, various aspects, features, and/or functionalities of the MMMS System may be performed, implemented and/or initiated by one or more of the various systems, components, systems, devices, procedures, processes, etc., described and/or referenced herein.

In at least one embodiment, a given instance of the MMMS System may access and/or utilize information from one or more associated databases. In at least one embodiment, at least a portion of the database information may be accessed via communication with one or more local and/or remote memory devices. Examples of different types of data which may be accessed by the MMMS System may include, but are not limited to, one or more of those described and/or referenced herein.

According to different embodiments, various different types of encryption/decryption techniques may be used to facilitate secure communications between devices in MMMS System(s) and/or MMMS Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well known hardware-based and/or software-based security components, and/or any other known or yet to be devised security and/or hardware and encryption/decryption processes implemented in hardware and/or software.

According to different embodiments, one or more different threads or instances of the MMMS System may be initiated in response to detection of one or more conditions or events satisfying one or more different types of minimum threshold criteria for triggering initiation of at least one instance of the MMMS System. Various examples of conditions or events which may trigger initiation and/or implementation of one or more different threads or instances of the MMMS System may include, but are not limited to, one or more of those described and/or referenced herein.

It will be appreciated that the MMMS System of FIG. 1 is but one example from a wide range of MMMS System embodiments which may be implemented. Other embodiments of the MMMS System (not shown) may include additional, fewer and/or different components/features that those illustrated in the example MMMS System embodiment of FIG. 1.

Generally, the MMMS techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the MMMS techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
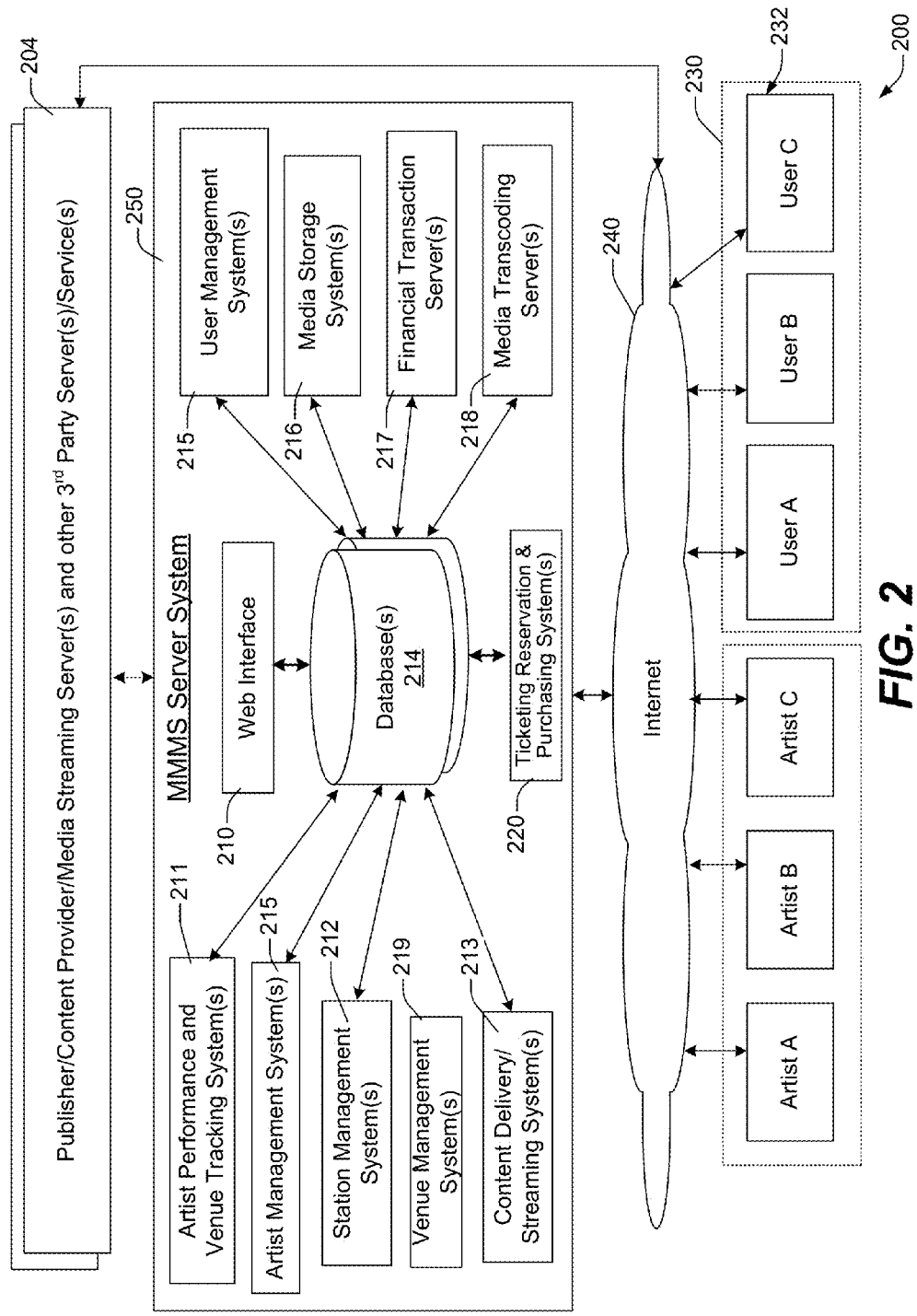
FIG. 2 shows a specific example embodiment of a network diagram illustrating an embodiment of an MMMS System 200.

FIG. 2 shows a specific example embodiment of a network diagram illustrating an embodiment of an MMMS System 200, which may be configured or designed for implementing various aspects, functions, and/or features such as one or more of those described and/or referenced herein. Additionally, the example embodiment of FIG. 2 provides an illustrative example of the different interactions and communication paths between and among the various components of the MMMS System network.

According to specific embodiments, the MMMS System may be accessible to various entities such as, for example: individual persons, corporate or business entities, system administrators, online content providers, online publishers, merchants, artists, copyright holders, etc.

In at least one embodiment, the MMMS System may include a plurality of hardware and/or software components operable to perform and/or implement various types of functions, operations, actions, and/or other features of the MMMS technology disclosed herein. Examples of such components may include, but are not limited to, one or more of the following (or combinations thereof):

MMMS Server System (e.g. 250).
Artist Performance and Venue Tracking System(s) 211, which, for example, may be configured or designed to facilitate, initiate and/or perform one or more of the following operation(s)/action(s) (or combinations thereof):
  Manage database(s) of Event information.
  Information about Events may be stored or cached, include artist(s), date(s) and venue(s), geographic location(s), photographs along with ticketing information, as well as additional fields.
  Venue and Event data may be incorporated from external sources, using external API as available and permitted.
  Accommodate discrepancies between internal and external databases and data.
Artist Management System(s) 215, which, for example, may be configured or designed to facilitate, initiate and/or perform one or more of the following operation(s)/action(s) (or combinations thereof):
  Provide interfaces to, and manage database(s) for the purpose of storing, editing and distributing media and material relating to the Artist's identity, including but not limited to Albums, Tracks, Photographs, Video Links, Biographies, Tags, Locations, Comments, Reviews, Social Networks and Hyperlinks.
  Once authenticated, Artists may easily edit their own information, and access statistics and analytics associated with their account from a central dashboard.
  Artists may view the statistics and activities of their Stations, Tracks, Albums, email subscribers, and Radio Play.
Station Management System(s) 212, which, for example, may be configured or designed to facilitate, initiate and/ or perform one or more of the following operation(s)/ action(s) (or combinations thereof):

Store and cache 'Stations' of two types: Static and Dynamic.

Static Stations may include a ranked list of Artists, with no minimum or maximum number.

Dynamic Stations may include a "snapshot" of Filter Settings used when the Station was created or saved. At any point in time the Station may be refreshed, resulting in a new Ranked List of Artists recalculated from the most current MMMS databases, according to the Saved Filters.

MMMS may store or cache usage statistics and listenership data for one or more Stations Content Delivery/Streaming System(s) 213, which, for example, may be configured or designed to facilitate, initiate and/or perform one or more of the following operation(s)/action(s) (or combinations thereof): Serve digital content, including, but not limited to audio, video, images, or other documents to a variety of network enabled devices, including, but not limited to, desktop and laptop computers, PDAs, smart phones, tablets, iOS devices, or other external networks.

User Management System(s) 215, which, for example, may be configured or designed to facilitate, initiate and/or perform one or more of the following operation(s)/ action(s) (or combinations thereof): Store information and usage statistics for several classes of User, including Visitors, Users, Artists, Venues, and Administrators Media Storage System(s) 216, which, for example, may be configured or designed to facilitate, initiate and/or perform one or more of the following operation(s)/action(s) (or combinations thereof): Employ sufficient and reliable digital storage, as is necessary to hold Artist Content in an organized fashion.

Financial Transaction Server(s) 217, which, for example, may be configured or designed to facilitate, initiate and/ or perform one or more of the following operation(s)/ action(s) (or combinations thereof): Provide servers or services related to the processing of financial transactions, through a variety of methods.

Media Transcoding Server(s) 218, which, for example, may be configured or designed to facilitate, initiate and/ or perform one or more of the following operation(s)/ action(s) (or combinations thereof): Receive digital audio content from Artists, and performing any operations that are necessary for operation of the MMMS system, and related subsystems.

Venue Management System(s) 219, which, for example, may be configured or designed to facilitate, initiate and/ or perform one or more of the following operation(s)/ action(s) (or combinations thereof): Provide interfaces to, and manage database(s) for the purpose of storing, editing and distributing media and material relating to the identity of a Venue, including but not limited to Calendar Information, Photographs, Video Links, Descriptions, Tags, Locations, Social Networks and Website. Once authenticated, Venues may easily edit their own information, and access statistics and analytics associated with their account from a central dashboard.

Ticketing Reservation and Purchasing System(s) (TRPS) 220, which, for example, may be configured or designed to facilitate, initiate and/or perform activities/operations relating to reservation and/or purchasing of tickets to events such as live performances at one or more venues.

According to different embodiments, at least some MMMS System(s) may be configured, designed, and/or operable to provide a number of different advantages and/or benefits and/or may be operable to initiate, and/or enable various different types of operations, functionalities, and/or features, such as, for example, one or more of the following (or combinations thereof):

"Shows Near" Geographic Location Stations Functionality

In at least one embodiment, MMMS System (also referred to herein as "DeliRadio") users may create geographic location specific (e.g., "city specific") streaming radio stations playing artists with upcoming live performances within the geographic location (e.g., San Francisco) specified by the user. Additionally, users may specify other filtering criteria (either separately or in different combinations) such as, for example, one or more of the following (or combinations thereof):

Geographic proximity or "radius" filtering criteria (e.g. "within 15 miles of Paris" or "within 50 miles of Chicago");

Time/Date filtering criteria (e.g. "tonight," "this week," "next 2 weeks," "all dates" or "custom dates" wherein a user specifies a specific date range such as between July $15^{th}$ and August $3^{rd}$);

"Genre" and/or "Tag" filtering criteria (e.g. folk, folk+ rock, folk+rock but not experimental)

Venue specific filtering criteria (e.g., limit search results to events at The Fillmore (San Francisco) or The Great American Music Hall (San Francisco) or Yoshi's Jazz Club (Oakland)).

Artist/band specific filtering criteria (e.g., "The Cribs"; "STS9 or Mojomama"; etc.)

In at least one embodiment, when a user enters their filter criteria for a "Shows Near" Geographic Location search, DeliRadio searches its database (and/or remote database(s)) and automatically and dynamically generates (e.g., in real-time) at least one streaming radio station which will play only songs from artists who match the criteria. For example, "Folk Rock but not Experimental Artists with upcoming live performances in the next 2 weeks within 50 miles of Chicago."

Venue(s) Stations Functionality

In at least one embodiment, DeliRadio users may create "venue specific" streaming radio stations playing artists with upcoming live performances at one or more venues selected by the user. Users may also set "timeframe" filter criteria (e.g. "tonight," "this week," "next 2 weeks," "all dates" or "custom dates" wherein a user specifies a specific date range such as between July $15^{th}$ and August $3^{rd}$). Users may also set "genre" filter criteria (e.g. "folk," or "folk+rock," or "folk+rock but not experimental"). When a user enters their filter criteria for a Venue(s) Station, DeliRadio searches its database (and/or remote database(s)) and automatically and dynamically generates (e.g., in real-time) at least one streaming radio station playing only songs from artists who match the specified filter criteria. For example, using one or more DeliRadio GUIs, a user may initiate a filtered search for "Folk Rock but not Experimental Artists with upcoming live performances at The Fillmore, Great American Music Hall and Café Du Nord between July $15^{th}$ and August $3^{rd}$." In response, DeliRadio may search its database (and/or remote database(s)) and automatically and dynamically identify and display (e.g., in real-time) information relating to artists/bands and/or upcoming live performances which match the user specified filter criteria. Additionally, DeliRadio may identify songs of artists/ bands which match the user specified filter criteria, and dynamically generate a streaming radio station which includes only songs from the identified artists who match the user specified filter criteria.

Hometown/Neighborhood Stations Functionality

In at least one embodiment, DeliRadio users may create "artist hometown/neighborhood" streaming radio stations which includes only those artists whose hometown or "home-hood" matches a city or neighborhood specified by the user. Users may also specify geographic proximity (e.g., "radius") filter criteria (e.g. "within 15 miles of Paris" or "within 50 miles of Chicago"); and/or may also specify "genre" filter criteria (e.g. "folk," or "folk+rock," or "folk+rock but not experimental"). When a user enters their filter criteria for a Hometown/Homehood Station. DeliRadio searches its database (and/or remote database(s)) and automatically and dynamically generates (e.g., in real-time) at least one streaming radio station for playing only songs by artists who match the criteria. For example, "Folk Rock but not Experimental Artists from within 5 miles of Moscow" or "Indie Singer-Songwriter but not Country Artists from the Lower East Side of New York City."

Artist/Show Recommendation Stations Functionality

In at least one embodiment, DeliRadio users may enter the name of one or more artist(s)/band(s) (herein the "Target Artist(s)") to create "recommendation" stations, where the "recommendation criteria" for the station is based primarily on live performance and tour information, such as, for example, one or more of the following (or combinations thereof):

(1) other artists who have performed with the Target Artist(s) in the past;
(2) other artists who are scheduled to perform with the Target Artist(s) in the future;
(3) other artists who have performed at the same venue(s) and/or festival(s) that the Target Artist(s) has performed at in the past; and/or
(4) other artists who are scheduled to perform in the future at the same venue(s) and/or festival(s) that the Target Artist(s) has performed at.

Additional "recommendation criteria" may include other filter criteria such as, for example, one or more of the following (or combinations thereof): other artists who have been "starred" by DeliRadio users who have also starred the Target Artist(s); genre and tag cross-matching filter criteria (e.g., specified by the user); play count and popularity within the DeliRadio System; geolocation based criteria (such as prioritizing other artists in the station based on upcoming concerts that are proximal to the listener); "similar artist" results which, for example, may be acquired from API calls to external databases (e.g. EchoNest, Last.FM); user created stations that include one or more of the Target Artist(s); etc.

Ticket Reservation Service Functionality

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by $3^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, DeliRadio users may be able to view a Concert Page for a particular event. On the Concert Page, the user may view (e.g., in real-time) information relating to the total number of tickets sold for that event and the number of reservations available. DeliRadio users may be able to "buy now" for immediate ticket purchase and/or be able to make ticket reservations (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make Reservations.

Making the Reservation: In at least one embodiment, when making the Reservation, the Reservation Host may be able to designate other DeliRadio users (Reservation Recipients) to receive an "invitation to accept the Reservation." This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example. In at least one embodiment, DeliRadio users who reserve or purchase their tickets via the DeliRadio System may receive other types of promotional offers or benefits such as, for example:

Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.

Promotional Offers: drink tickets, venue swag, VIP privileges, priority seat reservations, discount coupons, etc.

Future Show Discounts: Discounts on Ticket purchases for future shows at that venue, or at shows among various venues in a Venue Group.

Vendor Affiliate Discounts: Discounts at vendors/merchants in the same neighborhood as the venue.

Venue "Points": Redeemable by the Host at the venue at some later date for any of the above.

TRPS Monetization: Monetization of the TRPS could take one or more of the following forms (or combinations thereof): Per Ticket Fee; Per Order Fee; and/or Per Show Fee.

Example Models for Sponsorship Sales: (1) local/national sponsor underwrites one or more fees and is perceived as paying one or more convenience fees related to Tickets purchased through the TRPS for that event, in exchange for brand goodwill and/or user data provided by DeliRadio; (2) local/national sponsor pays a flat fee per show to buy a relationship with a specific demographic and receives demographic specific user data from DeliRadio; (3) local/national sponsor pays a flat fee per show and offers product giveaways and/or raffle entries for a contest.

Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)

According to different embodiments, a reservation window may close the sooner of (1) x days before the event or (2) X % of Tickets sold. Alternatively, X days after the Reservation is made, but no later than X days before the event.

Example Benefits/Advantages of MMMS System TRPS: Various benefits/advantages of the MMMS System TRPS may include, for example: the limited quantity of Reservations; the limited time window in which to convert Reservations into Ticket Buys; and/or the social broadcast nature of the Reservation (allowing one or more DeliRadio users to see the status of one or more Reservations for a given show at any time.

Functionality for Display of Relevant Gigs on a Per-User Geo-Location Basis

In at least one embodiment, when a DeliRadio station is created, information relating to the station may be displayed or presented to the user via a Pop-Out Player GUI which may include one or more of the following types of content and/or features (or combinations thereof):

Venue Station: if the station created is venue-specific, then the first concert date displayed for at least one artist in that station matches the concert scheduled to occur at the venue(s) selected in the user's search criteria.

Geographic proximity: if the station created is not venue-specific, and an artist in the station has an upcoming concert within a predetermined radius (e.g., 200 miles) of user's location (as determined by geo-locating the user's IP address or user's mobile device, for example), then that concert within 200 miles of the user is the first displayed concert.

Chronologically: if the station created is not venue-specific, and an artist in the station does not have an upcoming concert within the predetermined radius (e.g., 200 miles) of user's location (e.g., as determined by geo-located the user's IP Address or user's mobile device), then the concert that is occurring next chronologically is the first displayed concert.

Stations Map Overlay Functionality

In at least one embodiment, information relating to any given station created on DeliRadio may be selectively displayed according to the user's viewing preferences, such as, for example: "List View" (e.g., FIG. 11), "Tile View" (e.g., FIG. 12) or "Map View" (e.g., FIG. 13). In one embodiment, when a genre and/or hometown station is viewed in map view, at least one artist's hometown is plotted on a map (e.g., using "guitar pick" icons to indicate the location(s) on the displayed map), and a number inside the guitar pick indicating how many artists matching the search reside in that location (see, e.g., FIG. 13). When a DeliRadio Station for "shows near" city/neighborhood or one or more venues is created, the guitar pick icons indicate venue locations where a concert that matches the search criteria may take place, and the number inside the guitar pick indicate how many artists matching the search may perform at that venue. In either instance (hometown/genre stations or "shows near" city/venue stations), clicking on a displayed icon may open a small window listing the artists matching the overall search criteria who are located (or who have upcoming concerts located) in or near the location indicated by the corresponding selected icon. In at least one embodiment, each of the List View, Tile View, and Map View GUIs may also include a "Play Station" button which enables a user to create a new station which is automatically configured to play only songs from the artists displayed in the current window/GUI (and, in some embodiments, related artists as well).

For example, creating a DeliRadio Station of rock bands (without indicating a specific location) may include all rock bands on DeliRadio. The map view may initially only display rock bands within a certain radius of the user's IP Address or user's mobile device. The user may then zoom out to see one or more DeliRadio rock bands across the world, as indicated by guitar picks for at least one location. Clicking on a guitar pick over London, England, may reload the map view to focus only on London. Clicking on the guitar pick over London may open a window listing one or more the London rock bands. The user may then click the play button to hear only rock bands from London. This same example could be used for a "hometown" only station (e.g., indicating a search for one or more bands from a specific city or town) or a hybrid hometown/genre station (e.g., indicating a search for one or more bands of a specific genre (or genres) from a specific city or town).

For example, creating a DeliRadio Station of rock bands with upcoming shows within 100 miles of Amsterdam, Netherlands, when viewed in map view, may display one or more DeliRadio rock bands with upcoming shows in this radius around Amsterdam. In one embodiment, at least a portion of the displayed icons on the map may represent or indicate venues where one or more of the show(s) (matching the filtered search criteria) are to take place. In at least one embodiment, one or more displayed icons may each display a numerical value indicating the number of upcoming shows at that particular venue for which ticket reservations/purchases are currently available. In one embodiment, clicking on an icon may cause a Venue Info GUI to be displayed which includes information about one or more bands matching the search criteria at that particular venue. In one embodiment, a user may click a "Play" button displayed in the Venue Info GUI to dynamically generate a DeliRadio Station playing only those bands at that venue.

Gig Sharing (user-to-user) Functionality

In at least one embodiment, a user may select a particular concert/event from an artist's upcoming calendar, and share the event information (e.g., date, artists performing, location, ticket price, ticket purchase information, etc.) as well as content associated with the performing artists (e.g., audio recordings, photos, biographical information, website links, Facebook URLs, Twitter URLs, etc.) directly with other DeliRadio users (e.g., via DeliRadio's DeliRadio Mobile Applications and web applications), and associate a personal message from the sharer with the information shared. This would present an opportunity for the "sharer" and the "sharee(s)" to express their interest in attending the show together, whether by making plans offline or purchasing tickets online, including via the DeliRadio Ticket Reservation Service.

Social Blogging Functionality

By embedding the DeliRadio BloggerTool javascript in the <head> of their HTML pages, website operators may use DeliRadio to provide playable links next to the textual mention of any Artist Name that currently has music available for public streaming on DeliRadio. Clicking on a play link may launch the DeliRadio Pop-Out Player that may either play the single artist that was clicked on, or a DeliRadio Station comprising one or more artists (including the selected artist) with DeliRadio music on that web page. A single web page may include multiple instances of the DeliRadio BloggerTool.

Play Traction Heat Map Functionality

In at least one embodiment, artists may view an interactive world map overlaid with "heat zones" indicating where and to what degree listeners have been streaming that artist's music. Artists may interact with a Play Traction Heat Map GUI to change views and/or filter criteria to view mobile plays, website plays, or both combined. In at least one embodiment, the Play Traction Heat Map Functionality may also be operable to enable the artist to further hone this map to a specific album or track.

Artist/Band Tweet@Functionality

In at least one embodiment, if an artist has provided their Twitter handle in their DeliRadio artist profile, then, when a DeliRadio listener is streaming an artist's recording on the DeliRadio Mobile Application, with 1-click the user may send a Twitter message ("tweet") directly at the artist's Twitter handle, with an automatically generated (or personalized) comment and a link to the artist's DeliRadio station. Any Twitter user who "follows" the DeliRadio user sending the tweet, who follows the artist on Twitter or who follows DeliRadio on Twitter may see the tweet in their "feed." Any Twitter user who clicks on the link for the artist's station may view the artist's upcoming concert dates. In one embodiment, the first date displayed may be presented per the algorithm described in the "Display of Relevant Gigs on a Per User Geo-Location Basis" section.

Auto-Magic Blog Functionality

In at least one embodiment, any DeliRadio City/Neighborhood/Venue "Shows Near" or "Bands From" station may include a more comprehensive display of related content via that station's own unique, automatically updating website (or GUI or webpage). The station's own unique, automated content updating website may be referred to as the "AutoMagic Blog." In one embodiment of the AutoMagic Blog, the DeliRadio user responsible for owning or managing the station/blog would receive their own unique Twitter handle for that station/blog (e.g. @drfm_oakland). Information and/or other content which may be displayed at the AutoMagic Blog may include, but are not limited to, one or more of the following (or combinations thereof):

- A map showing the specified radius for the station;
- The station's venue and/or artist search results overlaid on that map, with associated playable links;
- The station's search results of artists and concerts presented in list form;
- Artist profiles of at least one artist in the search results;
- A DeliRadio embedded player which plays the search results for that station;
- A customized "outgoing" twitter feed of one or more tweets from the blog's owner;
- A customized "incoming" twitter feed representing a real time search of one or more tweets by twitter users who include in their tweet a hashtag for the blog (e.g. #drfm_oakland). In at least one embodiment, the Blog's owner could "re-tweet" (e.g., from the owner's official Blog handle) any tweets containing the hashtag, thus creating a method for Twitter users to tweet comments and a method for the Blog owner to officially recognize those comments by retweeting them;
- A "PLAY" button for the outgoing Twitter feed that uses technology to "scrape" any DeliRadio station links, allowing at least one tweet to be played as a DeliRadio Station, or one or more tweets in the feed to be played as a separate station;
- A "PLAY" button for the incoming Twitter feed that uses technology to scrape any DeliRadio station links, allowing at least one tweet to be played as a DeliRadio Station, or one or more tweets in the feed to be played as a separate station;
- Editorial content related to the artists and venues currently displayed, either linked in from outside websites or created within the Blog itself by the Blog owner;
- Etc.

Track-Level Control Slider Functionality

In at least one embodiment, when an artist uploads audio recordings to DeliRadio, the "Track-Level Control Slider" gives them fine-grain control over how their recordings are made available and promoted across the internet, based on a "promotional sliding scale" that increases by degree of public availability. In at least one embodiment, the Track-Level Control Slider GUI may be configured or designed to enable a user to assign one or more separately definable access and/or usage attributes to each of the Artist's recordings (e.g., which have been uploaded to the DeliRadio System). Examples of such access and/or usage control attributes may include, but are not limited to, one or more of the following (or combinations thereof):

- For Sale Only: Tracks marked as "for sale only" are not streamable anywhere on DeliRadio, but downloads may be purchased on the artist's DeliRadio profile page by listeners.
- Profile Only: Tracks marked as "profile only" are streamable only on the artist's DeliRadio profile page via the Pop-Out Player (which may also be embedded elsewhere on the internet), but these tracks may not be included in the pool of tracks available for stations created by DeliRadio users and stations automatically generated by DeliRadio.
- Radio Enabled: Tracks marked as "radio enabled" may be streamable on the artist's DeliRadio profile page via the Pop-Out Player, and may also be included in the pool of tracks available for stations created by DeliRadio users and automatically generated by DeliRadio.

Radio Preferred: Same as Radio Enabled, but "Radio Preferred" tracks may be played first when this artist appears in a DeliRadio station.

Free Download: This checkbox may be applied to any track, and may allow the free, promotional download of the marked track. Free downloads are only available on the artist's DeliRadio profile page.

Functionality for Targeted Promotion of Stations on the Dr Website, Based on User Location In at least one embodiment, the DeliRadio homepage may be comprised in part of a "mosaic" of image "tiles", wherein each tile may depict a DeliRadio station selected for promotion on the homepage, including but not limited to one or more of the following (or combinations thereof): festival stations, venue stations, record label stations, artist stations, etc. These promotional mosaic tiles may be "tagged" in the DeliRadio System as being associated with a specific geographic region or regions. For example, a festival taking place in New York may be tagged as being associated with the eastern coast of the United States. When a user arrives at the DeliRadio homepage, the user may be geo-located based on their IP Address or user's mobile device, and the DeliRadio homepage promotional mosaic tiles may be automatically and dynamically selected (e.g., in real-time) based on that user's location, such that the promotional mosaic tiles the user sees on the homepage may be directly geo-targeted to each individual user. For example, the DeliRadio System may determine a first user's geolocation as being Paris, France, and in response, the DeliRadio System may display to the user only promotional mosaic tiles associated with the geographic region(s) in and around Paris. In contrast, the DeliRadio System may determine a second user's geolocation as being San Francisco, Calif., and may display to the second user only promotional mosaic tiles associated with the geographic region(s) in and around San Francisco, Calif.

Share a Gig Functionality

Compatible with the conventional ways to share content between users and among existing social networks (e.g., Facebook, Twitter, etc.), a DeliRadio user may select a particular show or event from an artist's upcoming tour calendar, and share that show/event via the DeliRadio mobile and web apps. This would mark a user's interest in that particular show, which may be visible to other users of the DeliRadio System, and may present an opportunity to other DeliRadio users to express their interest in the identified show/event.

Venue Check-In Functionality

In at least one embodiment, mobile device users may use the DeliRadio Mobile Application to "Check-In" at a show or event. For example, in one embodiment, by accessing one or more databases relating to events, shows, and/or tour dates (e.g., including, for example, DeliRadio tour date archive database), and using the geolocation services/functionality at the user's mobile device (at least a portion of which may be provided by the DeliRadio Mobile Application), the venue check-in process may be streamlined considerably as compared to more traditional methods of check-in. In at least one embodiment, the DeliRadio Mobile Application may be configured or designed to include functionality for facilitating user "Check-In" activities at a given venue & event. After completing a check-in activity at a given location, the user may be granted (e.g., via the DeliRadio Mobile Application and/or DeliRadio website) access to additional functionality, promotional opportunities, and/or rewards, such as, for example, one or more of the following (or combinations thereof):

Join the venue email list

Vote for upcoming shows (e.g., at that venue);

Access current band's info, twitter, Facebook, merchandise and email list signups;

Incentives for discounted drinks and/or merchandise;

receive information or notification about friends or other DeliRadio users who will be attending one or more show(s) at the venue and/or who have already check-in at the venue for the current show;

Send photos to band and/or DeliRadio Band/Artist webpage or blog;

Integrate with additional "check-in" services;

Earn points for social activity which may be later redeemed by the user for promotional rewards, incentives, etc.

Embedded Players and Extended Functionality

In at least one embodiment, the DeliRadio System technology disclosed herein provides capability for any DeliRadio Station, Album, or Artist to be embedded in any webpage on the World Wide Web, using an <iframe> tag and HTML5 code, for example. The user may customize the appearance of the embedded player prior to receiving the code. The user may customize: color scheme & width of the player, along with choosing the visibility of tour dates, photos, & station title. In one embodiment, when an embedded player is first loaded, it will cycle through the artists in the station in a random order, displaying one highlighted gig according to certain criteria. This first displayed tour date is chosen with regards to the 'closest upcoming show' in geographic proximity, based on the geolocation of the user (e.g., via user's IP address or via geolocation of users mobile device). If a DeliRadio Station has been created based on specific 'Venue Criteria', the highlighted date(s) will be the upcoming date(s) that occurs at one of the specified venue(s).

In some embodiments, the Embedded Players and Extended Functionality may include the ability for a venue to embed a complete concert calendar which may include listings for bands that aren't currently members of DeliRadio and/or which may include bands which are not currently in the DeliRadio database. Concert calendars may be accompanied by additional GUI features/buttons in the embedded window for enabling features such as, for example, one or more of the following (or combinations thereof): genre and date range selectors, multiple stages or associated venues, social sharing tools, etc.

In at least one embodiment, Track and Album embeds may be accompanied by corresponding track list(s), with additional GUI features/buttons in the embedded window for enabling features such as, for example, one or more of the following (or combinations thereof): downloading the tracks, social sharing tools, favoriting/liking/following controls, purchase options, links to external sites for purchase/download, etc.

In one embodiment, a user may choose to customize and embed a button (e.g., via a <script> tag) that creates a button on an external web page that immediately triggers a pop-up window containing just the DeliRadio player for that Station, Artist or Track. The Embedded Players and Extended Functionality may include is functionality for the embedded player to cycle through the photos of bands in the embedded station, even if the visitor to the website where the player is embedded has not tapped or clicked on the "PLAY" button. In at least one embodiment, this may result in the display of an automatically and/or dynamically generated "slideshow" of images of the artist(s) associated with that particular station.

EXAMPLES

The following examples are intended to help illustrate some of the various types of functions, operations, actions, and/or other features which may be provided by the MMMS System. By way of example, described below are some examples of "Stations" that may be created, named, saved, shared and listened to in real-time via the MMMS System, by adjusting the intuitive filters that appear in the various GUIs presented by the MMMS System.

(1) A DeliRadio Station comprised of songs by indie rock bands (or any other genre) that are playing shows within 10 miles San Francisco this Saturday night.

While the collection of songs is being streamed to the user's computer or mobile device, a photo slide-show of the current Artist is simultaneously streamed and rotated on the listeners browser or mobile device.

Date and location of upcoming show nearby is displayed next to current Artist and track information.

In many urban areas, fans have the opportunity to see dozens of shows on any given night. By creating this station, they may be able to hear a selection of songs relating only to those Artists who have been identified as playing upcoming shows within 10 miles San Francisco within the specified time period.

Stations may be shared with friends on Facebook, twitter or any other social media sites, instantly.

(2) A DeliRadio Station comprised of bands from a high school, college, hometown, or any other geographical grouping.

In at least one embodiment, the MMMS System may include functionality for enabling the user to post a link to a selected DeliRadio Station on Facebook or social networks. From there, one or more the user's friends may view the post/link, and may instantly listen to the DeliRadio Station by clicking on the link (for example). In at least one embodiment, the user's social networking friends and/or other DeliRadio users may be able to chat with the user (or with others) via a chat GUI which may be incorporated into the associated DeliRadio Station web page. According to different embodiments, DeliRadio Station chat functionality may be selectively enabled and/or disabled by the creator/owner of that DeliRadio Station.

(3) A DeliRadio Station comprised of choir music from choirs based in and around Oakland, Calif.

Very many choir groups exist nationwide, and most of them make recordings which are difficult to promote and share publically.

A DeliRadio 'Oakland Choir Radio' Station may be dynamically created by the MMMS System and could be made to be publically accessible a variety of different groups such as, for example, one or more of the following (or combinations thereof): users/members of the MMMS System; social network friends and family; anyone who is able to obtain the URL to the DeliRadio Oakland Choir Radio Station (e.g., by doing a Google search, for example).

(4) A DeliRadio Station comprised of California high school bands that rank in the top 100 "most popular", "most listened to", etc.

Rankings may be generated and/or updated manually, automatically, and/or programmatically via data gathered from statistics and analytics relating to artist and user actions, such as 'track play count', 'page views', 'MMMS player spins', most starred, 'band preferred', upcoming tour dates, etc.

(5) A DeliRadio Station of US serviceman rock bands (stationed anywhere in the world.)

Could be active members only, or active and retired.

Could be genre agnostic; for instance, it could be rap-specific, reggae, etc

Example DeliRadio Station: One or more 'Southern Rock' groups, currently stationed in Iraq.

(6) A DeliRadio Station comprised of bands made up of workers at Safeway supermarkets Once a DeliRadio Safeway Station was created, bands that want to be included in this station may send requests to the station owner asking to be added.

Stations may be earmarked as "closed" or "open" to non-owner manipulation of content.

Corporations could find this a healthy morale building enterprise, and could even promote it actively as such.

(7) A DeliRadio Station comprised of bands playing upcoming shows at a SPECIFIC VENUE.

A lot of music fans have a favorite venue(s).

The songs and artists associated with the Station may be automatically, dynamically and/or periodically updated so that it may be kept current with the upcoming events, shows, artists, song popularity, etc.

Venues could post links to their DeliRadio Station on their web sites, and send links to their DeliRadio Station out to recipients on the venue mailing list.

In at least one embodiment, the content streamed by the DeliRadio Venue Station may automatically and periodically be updated (e.g., "Always Be Current"). In one embodiment, the Station owner (e.g., which may be the venue's agent) may manually update DeliRadio's database of upcoming shows and events that particular venue. In other embodiments, the MMMS System may automatically and periodically access updated venue-specific event/date/artist information from one or more remote databases and APIs such as, for example, those provided by, Songkick, Last FM, etc.

One significant advantage/benefit of the customized DeliRadio Venue Station is that it facilitates and provides the ability for end users and customers to easily access, learn about, explore, and listen to music from bands/artists who will be performing (and/or who have performed) at a given venue. Venues may advantageously leverage the features and advantages by embedding their customized, venue-specific DeliRadio Station in the home page (or other web pages) of the venue's website.

Another significant advantage/benefit customized DeliRadio Venue Station is that it allows the venue to offload the tasks of managing, uploading, and updating the venue's website with new music relating to the artists of upcoming shows. For example, in one embodiment, when the venue books an upcoming show with a given artist, the venue may simply instruct the artist to upload one or more of the artist's song(s) and/or album(s) to the DeliRadio System. In at least one embodiment, the DeliRadio System may include functionality for automatically monitoring newly uploaded content, and cross checking the identified content with other resources in order to automatically link selected portions of the newly uploaded content with selected DeliRadio Stations.

In at least one embodiment, the MMMS System may be configured or designed to automatically identify various types of criteria (e.g., song, artist, album, video, venue, user location, artist location, etc.) relating to content being displayed to a user as the user accesses the DeliRadio website and/or DeliRadio Mobile Application.

In at least one embodiment, one or more GUIs may be displayed to the user to facilitate operation and/or initiation of the various features and functions disclosed herein. According to different embodiments, the GUIs may be implemented via use of a web browser application, a mobile device application, a desktop application, a cloud-based service, etc. In at least one embodiment, a User Web Interface may provide functionality for dynamically generating at least a portion of the GUIs.

As illustrated in the example embodiment of FIG. 2, the MMMS System may include one or more databases (e.g. 240, FIG. 2), which, for example, may be populated with information and/or content relating to music, videos, venues, events, merchants, merchandise, artists, user profile information, user activity information, radio station information, etc.

In at least one embodiment, one or more of the databases may be queried via the use of various types of programming languages and/or protocols such as, for example, one or more of the following (or combinations thereof): HTML, XML, MySQL, Perl, Ajax, JavaScript, Etc.

In at least one embodiment, a user may initiate a MMMS session via the Internet (e.g., via 240, FIG. 2) to cause the MMMS System to perform and/or initiate various functions and operations (such as those described and/or referenced herein), according to user-specified criteria.

In at least one embodiment, the MMMS System may be operable to populate and/or access information at Database(s) 214, and utilize such information in order to identify and/or determine artist information and/or music content according to user-specified criteria. Examples of such database information may include, but are not limited to, one or more of the following (or combinations thereof):
- artist profile criteria, including, but not limited to artist rating, artist feedback, etc.;
- artist location information;
- music genre information;
- venue information;
- artist event performance information and related venue information;
- ticketing information;
- geographical information relating to artists, events, venues, users, etc.
- calendar information relating to artist performances, venue events, etc.
- negative filter criteria;
- music streaming services;
- Artist criteria;
- Similarity to other artists
- Brand-related criteria such as, for example, branding information related to (or associated with) one or more of the following (or combinations thereof): Song; Artist; Team; Celebrity; Album; Venue; Trademarks; Corporate Identities; Content owners; Publisher; Author; Distributor; Digital Content Criteria; Etc.

Various embodiments disclosed herein may be configured, designed, or otherwise operable to initiate, perform and/or provide different types of advantages, benefits and/or other features such as, for example, one or more advantages and/or benefits described and/or referenced herein.

For example, in at least one embodiment, the MMMS System functionality may be operable to perform and/or implement various types of functions, operations, actions, and/or other features such as, for example, one or more of the following (or combinations thereof):
- Monitor user behaviors and activities;
- Identify brand-related information associated with user-accessible content that the user is accessing; has requested access to; and/or has interest in;
- Identify songs and/or artists based on specified criteria;
- Manage and track revenue sharing;
- Manage reporting;
- Transact online ordering and purchasing;
- Transact Database queries/responses
- Acquire and manage artist-related music content and other artist-related information;
- Manage artist subscription services;
- Create user customized music streaming stations, e.g., based on user-specified filter criteria;
- Acquire and manage artist performance event and related venue information;
- Provide query disambiguation;
- Provide input correction/suggestion functionality such as, for example, normalization of brand name, brand identity and/or other searchable criteria amongst misspelled and/or other spelling variations;
- Facilitate artist profile management and user subscriptions;
- Manage and track songs and/or other media content which has been streamed to user(s);
- Etc.

According to specific embodiments, multiple instances or threads of the MMMS System functionality may be concurrently implemented and/or initiated via the use of one or more processors and/or other combinations of hardware and/or hardware and software. For example, in at least some embodiments, various aspects, features, and/or functionalities of the MMMS System mechanism(s) may be performed, implemented and/or initiated by one or more of the various systems, components, systems, devices, procedures, and/or processes described herein.

According to different embodiments, one or more different threads or instances of the MMMS System functionality may be initiated in response to detection of one or more conditions or events satisfying one or more different types of minimum threshold criteria for triggering initiation of at least one instance of the MMMS System functionality. Various examples of conditions or events which may trigger initiation and/or implementation of one or more different threads or instances of the MMMS System functionality may include, but are not limited to, one or more of the following (or combinations thereof):
- Detection of user interest in particular artist, brand, genre, geographic location and/or other criteria
- Identification of user;
- Identification of music content matching specified criteria;
- Detection of user input;
- Identification of artist performance event(s) matching specified criteria;
- Detection of artist input;
- Identification of artist performance event(s);
- Identification of user's geographic location;
- Determination of revenue sharing distributions;
- Receiving database query communication from external server;
- Etc.

In at least one embodiment, a given instance of the MMMS System functionality may access and/or utilize information from one or more associated databases. In at least one embodiment, at least a portion of the database information may be accessed via communication with one or more local and/or remote memory devices. Examples of different types of data which may be accessed by the MMMS System functionality may include, but are not limited to, one or more of the following (or combinations thereof):

- Brand-related information;
- User behavior and analytic information;
- Performance information;
- Artist information;
- Venue Information;
- Artist performance event information;
- Geographic location information (e.g., relating to artist performances, events, user location, artist origination, venues, etc.)
- Brand related taxonomy information;
- Artist subscription information;
- Ecommerce related transaction information;
- Publisher/Content Provider information;
- User profile information;
- Artist profile information;
- Music inventory information;
- Artist-brand association information;
- etc.

It may be appreciated that the various embodiments of the MMMS Systems disclosed herein are but a few examples from a wide range of MMMS System embodiments which may be implemented. Other embodiments of the MMMS System (not shown) may include additional, fewer and/or different components/features that those illustrated and described herein.

Figure 3:
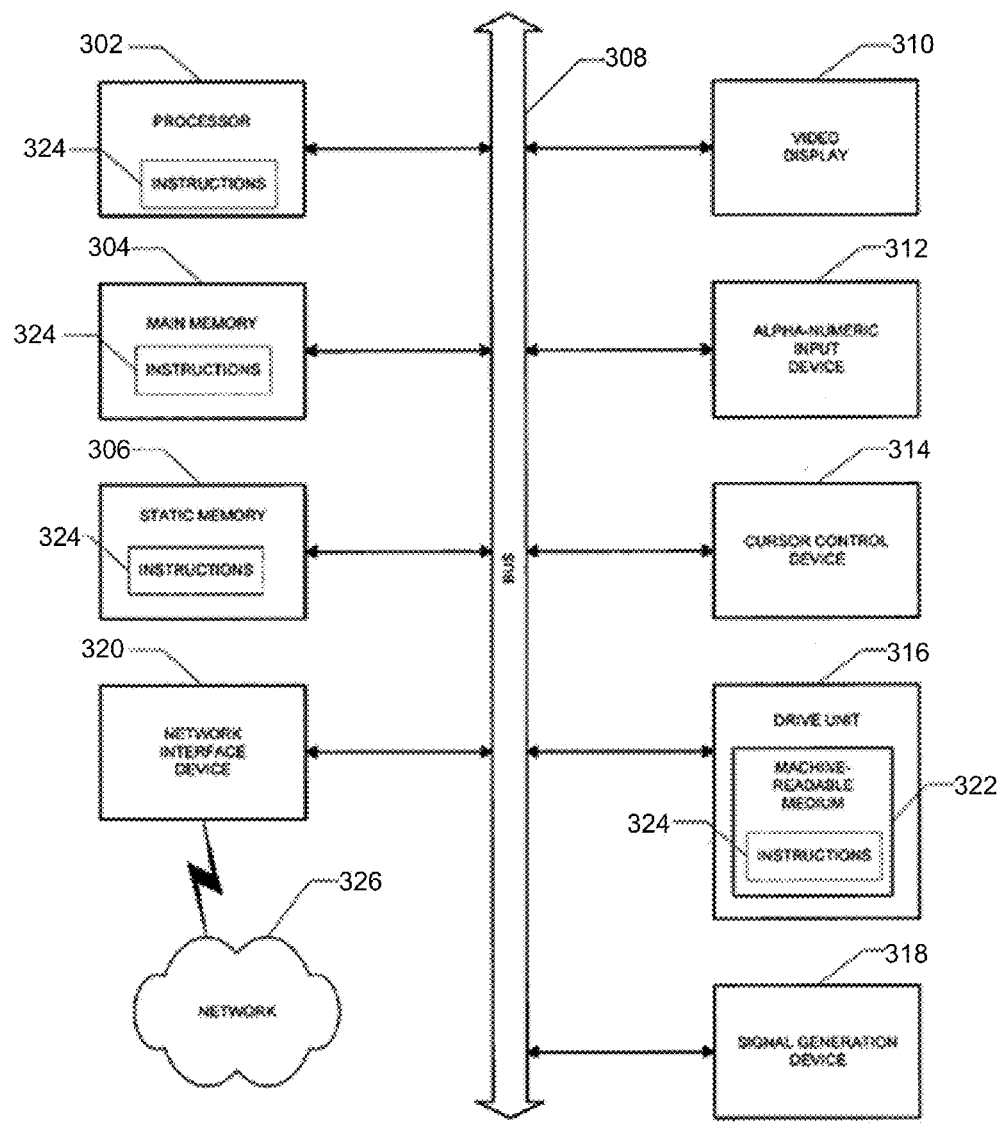
FIG. 3 shows a diagrammatic representation of machine in the exemplary form of a client (or end user) computer system 300.

FIG. 3 shows a diagrammatic representation of machine in the exemplary form of a client (or end user) computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with at least one other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 300 may include a variety of components, modules and/or systems for providing various types of functionality. For example, in at least one embodiment, Client Computer System 300 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

- User Interface (UI) Components such as those illustrated, described, and/or referenced herein.
- Database Components such as those illustrated, described, and/or referenced herein.
- Processing Components such as those illustrated, described, and/or referenced herein.
- Other Components which, for example, may include components for facilitating and/or enabling the Client Computer System to perform and/or initiate various types of operations, activities, functions such as those described herein.

FIG. 4 is a simplified block diagram of an exemplary client system 400 in accordance with a specific embodiment. In at least one embodiment, the client system may include MMMS Mobile Device App Component(s) which have been configured or designed to provide functionality for enabling or implementing at least a portion of the various MMMS techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

Processor(s) 410
    Device Drivers 442
    Memory 416
    Interface(s) 406
    Power Source(s)/Distribution 443
    Geolocation module 446
    Display(s) 435
    I/O Devices 430
    Audio/Video devices(s) 439
    Peripheral Devices 431
    Motion Detection module 440
    User Identification/Authentication module 447
    Client App Component(s) 460
    Other Component(s) 468
    UI Component(s) 462
    Database Component(s) 464
    Processing Component(s) 466
    Software/Hardware Authentication/Validation 444
    Wireless communication module(s) 445
    Information Filtering module(s) 449
    Operating mode selection component 448
    Speech Processing module 454
    Scanner/Camera 452
    OCR Processing Engine 456
    etc.

As illustrated in the example of FIG. 4 Mobile Device 400 may include a variety of components, modules and/or systems for providing various functionality. For example, as illustrated in FIG. 4, Mobile Device 400 may include Mobile Device Application components (e.g., 460), which, for example, may include, but are not limited to, one or more of the following (or combinations thereof):

UI Components 462 such as those illustrated, described, and/or referenced herein.
    Database Components 464 such as those illustrated, described, and/or referenced herein.
    Processing Components 466 such as those illustrated, described, and/or referenced herein.
    Other Components 468 which, for example, may include components for facilitating and/or enabling the Mobile Device to perform and/or initiate various types of operations, activities, functions such as those described herein.

In at least one embodiment, the Mobile Device Application component(s) may be operable to perform and/or implement various types of functions, operations, actions, and/or other features such as, for example, one or more of those described or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, such as, for example, one or more of those described or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more of those described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more of those described or referenced herein.

According to different embodiments, Mobile Device 400 may further include, but is not limited to, one or more of the following types of components, modules and/or systems (or combinations thereof):

At least one processor 410. In at least one embodiment, the processor(s) 410 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various MMMS techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the MMMS techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 406 which, for example, may include wired interfaces and/or wireless interfaces. In at least one implementation, the interface(s) 406 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 442. In at least one implementation, the device driver(s) 442 may include functionality similar to at least a portion of functionality implemented by one or more computer system driver devices such as those described herein and/or generally known to one having ordinary skill in the art.

At least one power source (and/or power distribution source) 443. In at least one implementation, the power source may include at least one mobile power source (e.g., battery) for allowing the client system to operate in a wireless and/or mobile environment. For example, in one implementation, the power source 443 may be implemented using a rechargeable, thin-film type battery. Further, in embodiments where it is desirable for the device to be flexible, the power source 443 may be designed to be flexible.

Geolocation module 446 which, for example, may be configured or designed to acquire geolocation information from remote sources and use the acquired geolocation information to determine information relating to a relative and/or absolute position of the client system.

Motion detection component 440 for detecting motion or movement of the client system and/or for detecting motion, movement, gestures and/or other input data from user. In at least one embodiment, the motion detection component 440 may include one or more motion detection sensors such as, for example, MEMS (Micro Electro Mechanical System) accelerometers, that may detect the acceleration and/or other movements of the client system as it is moved by a user.

User Identification/Authentication module 447. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 435. According to various embodiments, such display(s) may be implemented using, for example, LCD display technology, OLED display technology, and/or other types of conventional display technology. In at least one implementation, display(s) 435 may be adapted to be flexible or bendable. Additionally, in at least one embodiment the information displayed on display(s) 435 may utilize e-ink technology (such as that available from E Ink Corporation, Cambridge, Mass., www.eink.com), or other suitable technology for reducing the power consumption of information displayed on the display(s) 435.

One or more user I/O Device(s) 430 such as, for example, keys, buttons, scroll wheels, cursors, touchscreen sensors, audio command interfaces, magnetic strip reader, optical scanner, etc.

Audio/Video device(s) 439 such as, for example, components for displaying audio/visual media which, for example, may include cameras, speakers, microphones, media presentation components, wireless transmitter/receiver devices for enabling wireless audio and/or visual communication between the client system 400 and remote devices (e.g., radios, telephones, computer systems, etc.). For example, in one implementation, the audio system may include componentry for enabling the client system to function as a cell phone or two-way radio device.

Other types of peripheral devices 431 which may be useful to the users of various client systems, such as, for example: PDA functionality; memory card reader(s); fingerprint reader(s); image projection device(s); social networking peripheral component(s); etc.

Information filtering module(s) 449 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 449 may also be adapted to display, in real-time, filtered information to the user based upon a variety of criteria such as, for example, geolocation information, casino data information, player tracking information, etc.

Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 444 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for one or more purposes.

Operating mode selection component 448 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 452) which may be configured or designed for use in scanning identifiers and/or other content from other devices and/or objects such as for example: mobile device displays, computer displays, static displays (e.g., printed on tangible mediums), etc.

OCR Processing Engine (e.g., 456) which, for example, may be operable to perform image processing and optical character recognition of images such as those captured by a mobile device camera, for example.

Speech Processing module (e.g., 454) which, for example, may be operable to perform speech recognition, and may be operable to perform speech-to-text conversion.

Etc.

Figure 5:
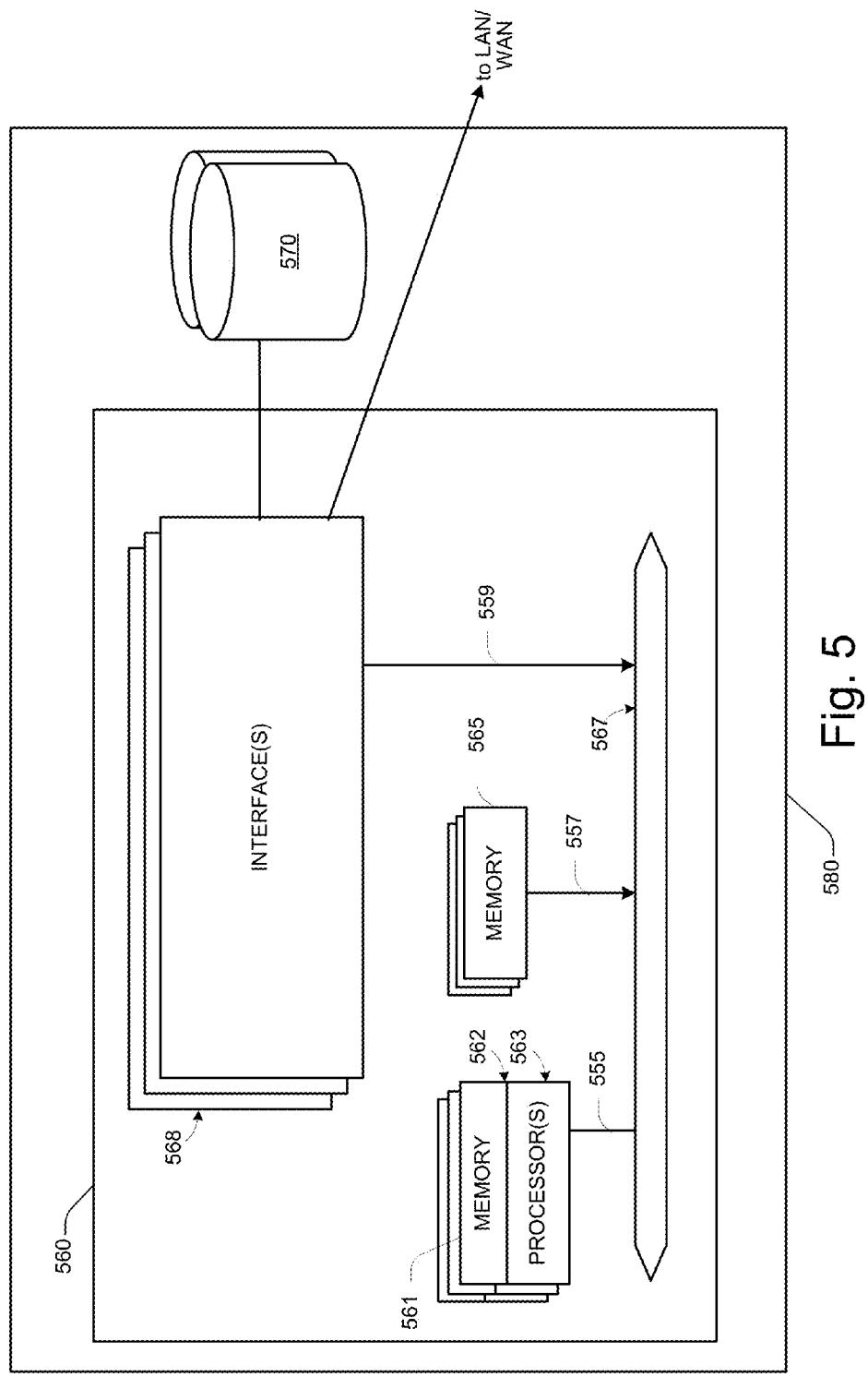
FIG. 5 illustrates an example embodiment of a server system 580 which may be used for implementing various aspects/features described herein.

FIG. 5 illustrates an example embodiment of a server system 580 which may be used for implementing various aspects/features described herein. In at least one embodiment, the server system 580 includes at least one network device 560, and at least one storage device 570 (such as, for example, a direct attached storage device). In one embodiment, server system 580 may be suitable for implementing at least some of the MMMS techniques described herein.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software (such as, for example, AppLogic™™ software).

CPU 562 may include one or more processors 563 such as, for example, one or more processors from the AMD, Motorola, Intel and/or MIPS families of microprocessors. In an alternative embodiment, processor 563 may be specially designed hardware for controlling the operations of server system 580. In a specific embodiment, a memory 561 (such as non-volatile RAM and/or ROM) also forms part of CPU 562. However, there may be many different ways in which memory could be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as onboard interface controllers built into the system motherboard. Generally, they control the sending and receiving of data packets over the network and sometimes support other peripherals used with the server system 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the server system 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various MMMS techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 6 illustrates an example of a functional block diagram of a MMMS Server System in accordance with a specific embodiment. In at least one embodiment, the MMMS Server System may be operable to perform and/or implement various types of functions, operations, actions, and/or other features such as, for example, one or more of those described or referenced herein (e.g., such as those previously described with respect to FIGS. 1 and 2).

In at least one embodiment, the MMMS Server System may include a plurality of components operable to perform and/or implement various types of functions, operations, actions, and/or other features such as, for example, one or more of the following (or combinations thereof):

- Artist Performance and Venue Tracking System(s) 671
- Artist Management System(s) 675
- Station Management System(s) 672
- Content Delivery/Streaming System(s) 673
- Venue Management System(s) 679
- User Management System(s) 675
- Media Storage System(s) 676
- Financial Transaction Server(s) 677
- Media Transcoding Server(s) 678
- Context Interpreter (e.g., 602) which, for example, may be operable to automatically and/or dynamically analyze contextual criteria relating to a given transaction, and automatically determine or identify the type of transaction to be performed. According to different embodiments, examples of contextual criteria which may be analyzed may include, but are not limited to, one or more of the following (or combinations thereof):
  - location-based criteria (e.g., geolocation of client device, geolocation of agent device, etc.)
  - time-based criteria
  - identity of user
  - identity of artist
  - user profile information
  - transaction history information
  - recent user activities
  - etc.
- Time Synchronization Engine (e.g., 604) which, for example, may be operable to manages universal time synchronization (e.g., via NTP and/or GPS)
- Search Engine (e.g., 628) which, for example, may be operable to search for transactions, logs, items, accounts, options in the TIS databases
- Configuration Engine (e.g., 632) which, for example, may be operable to determine and handle configuration of various customized configuration parameters for one or more devices, component(s), system(s), process(es), etc.
- Time Interpreter (e.g., 618) which, for example, may be operable to automatically and/or dynamically modify or change identifier activation and expiration time(s) based on various criteria such as, for example, time, location, transaction status, etc.
- Authentication/Validation Component(s) (e.g., 647) (password, software/hardware info, SSL certificates) which, for example, may be operable to perform various types of authentication/validation tasks such as, for example, one or more of the following (or combinations thereof):
  - verifying/authenticating devices,
  - verifying passwords, passcodes, SSL certificates, biometric identification information, and/or other types of security-related information
  - verify/validate activation and/or expiration times
  - etc.
- Transaction Processing Engine (e.g., 622) which, for example, may be operable to handle various types of transaction processing tasks such as, for example, one or more of the following (or combinations thereof):
  - identifying/determining transaction type
  - determining which payment gateway(s) to use
  - associating databases information to identifiers
  - etc.
- OCR Processing Engine (e.g., 634) which, for example, may be operable to perform image processing and optical character recognition of images such as those captured by a mobile device camera, for example.
- Database Manager (e.g., 626) which, for example, may be operable to handle various types of tasks relating to database updating, database management, database access, etc. In at least one embodiment, the Database Manager may be operable to manage databases, MMMS Device Application databases, etc.
- Log Component(s) (e.g., 610) which, for example, may be operable to generate and manage transactions history logs, system errors, connections from APIs, etc.
- Status Tracking Component(s) (e.g., 612) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.
- Gateway Component(s) (e.g., 614) which, for example, may be operable to facilitate and manage communications and transactions with external Payment Gateways.
- Web Interface Component(s) (e.g., 608) which, for example, may be operable to facilitate and manage communications and transactions with TIS web portal(s).
- API Interface(s) to MMMS Server System(s) (e.g., 646) which, for example, may be operable to facilitate and manage communications and transactions with API Interface(s) to MMMS Server System(s)
- API Interface(s) to 3rd Party Server System(s) (e.g., 648) which, for example, may be operable to facilitate and manage communications and transactions with API Interface(s) to 3rd Party Server System(s)
- Ticketing Reservation and Purchasing Component(s) (e.g., 649), which, for example, may be configured or designed to facilitate, initiate and/or perform activities/operations relating to reservation and/or purchasing of tickets to events such as live performances at one or more venues.
- OCR Processing Engine (e.g., 634) which, for example, may be operable to perform image processing and optical character recognition of images such as those captured by a mobile device camera, for example.
- At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the MMMS System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art.

Device driver(s) 642. In at least one implementation, the device driver(s) 642 may include functionality similar to at least a portion of functionality implemented by one or more computer system driver devices such as those described herein and/or generally known to one having ordinary skill in the art.

One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, Mass., www.eink.com), or other suitable technology for reducing the power consumption of information displayed on the display(s) 635.

Email Server Component(s) 636, which, for example, may be configured or designed to provide various functions and operations relating to email activities and communications.

Web Server Component(s) 637, which, for example, may be configured or designed to provide various functions and operations relating to web server activities and communications.

Messaging Server Component(s) 638, which, for example, may be configured or designed to provide various functions and operations relating to text messaging and/or other social network messaging activities and/or communications.

Etc.

In at least some embodiments described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain deliradio.com (www.deliradio.com). Thus, for example, as used herein, the terms "MMMS System", "DeliRadio", and "DeliRadio System" may be used interchangeably, unless otherwise noted. Additionally, at least some embodiments described herein, the terms "Artist" or "Band" may be used interchangeably to refer to one or more of the following (or combinations thereof): music related artist(s)/band(s), songwriters, DeliRadio Mobile Functionality FIG. 7A illustrates an example screenshot of a User Profile graphical user interface (GUI) which may be used to facilitate, initiate and/or perform various operation(s) and/or action(s) relating to the DeliRadio System technology described herein. In at least one embodiment, a user my select a DeliRadio user from a DeliRadio friend list, and/or may search for other DeliRadio users via DeliRadio System search functionality. The user may view, via User Profile GUI 701, information relating to the selected user's DeliRadio user profile, which, for example, may include, but is not limited to, one or more of the following (or combinations thereof): username info 710; user bio information, and hometown/geographic location 720; user's Twitter handle 732; user's favorite DeliRadio artist(s) 734; other users followed by this user 736; other users the selected user is following 738, etc.

Figure 7B:
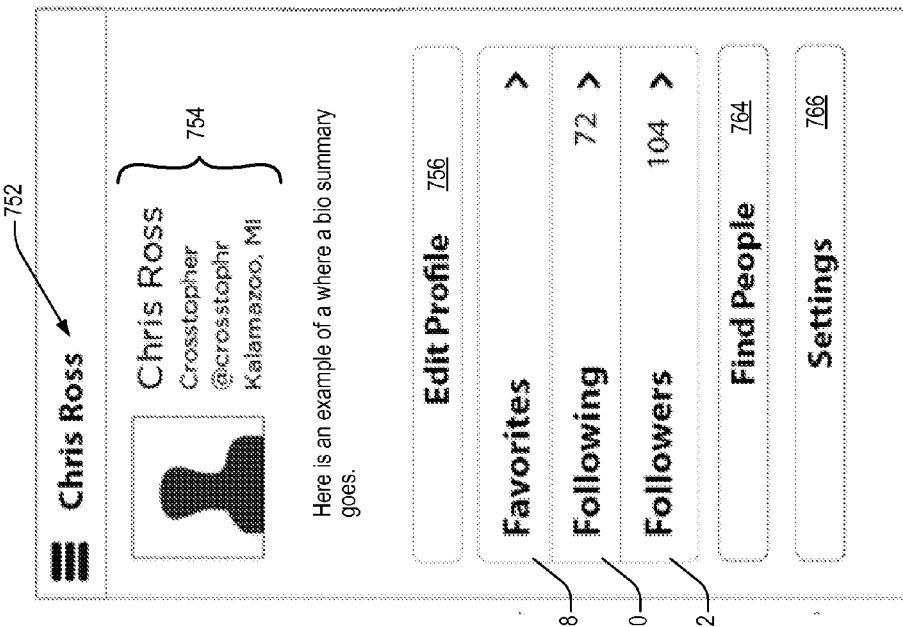
Figure 7A:
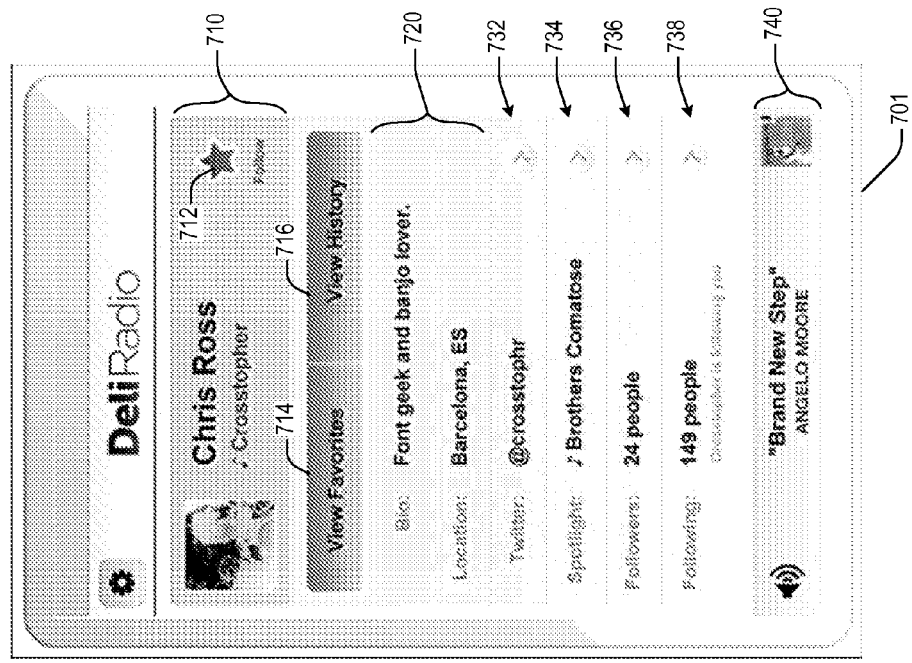

FIG. 7B illustrates an example screenshot of an alternate embodiment of a User Profile GUI 751 which may be used to facilitate, initiate and/or perform various operation(s) and/or action(s) relating to the DeliRadio System technology described herein. In at least one embodiment, User Profile GUI 751 represents a registered user's view of their own Mobile User Profile, which can display a variety of information and capabilities, such as, for example, one or more of the following (or combinations thereof):

The user's real name (e.g., as shown at 754).

The user's DeliRadio username (e.g., as shown at 754).

The user's twitter handle (e.g., as shown at 754).

The user's hometown (e.g., as shown at 754).

User profile/bio information.

The ability of the user to edit their own mobile user profile 756. For example, in at least one embodiment, the user may change their user profile picture; enter/edit other fields such as their username, real name, location and bio; connect their DeliRadio account with their Facebook account, Twitter account, and/or other social network account, etc.

Functionality 758 for enabling access to the user's collection of starred or "favorite" content 758, such as, for example, the user's favorite tracks, albums, bands, playlists, etc. In at least one embodiment, the DeliRadio Mobile Application may provide functionality for enabling the user to access to a User Favorites GUI for viewing, modifying, and/or updating the user's Favorites content and information. Examples of various features of the User Favorites GUI are illustrated, for example, in FIGS. 24 and 25 of the drawings.

Following Information 760 relating to other persons, artists/bands, and/or users which the identified user (Chris Ross) is currently following. In one embodiment, the user may tap on the Following menu item 760 to access a list of other DeliRadio users and/or artists that the user is following.

Follower Information 762 relating to other persons, artists/bands, and/or users who are following the user (Chris Ross). In one embodiment, the user may tap on the Follower menu item 762 to access a list of other DeliRadio users and/or artists who are following the user.

Functionality 764 for enabling the user to search for new DeliRadio friends and send follow requests.

Functionality 766 for enabling the user to access to a User Settings GUI for viewing, modifying, and/or updating other types of settings associated with the user's DeliRadio profile or account. An example of a DeliRadio User Settings GUI is illustrated, for example, in FIG. 28 of the drawings.

In at least one embodiment, the user may tap on the Favorites row 758 to access a User Favorites GUI which may be configured or designed to display and/or provide access to various types of information associated with the user's favorite or starred content such as, for example, one or more of the following (or combinations thereof):

Favorite artists.

Favorite tracks or songs.

Favorite shows or events.

Favorite venues.

Favorite stations (e.g., DeliRadio stations).

And/or other types of information and/or functionality described herein.

According to specific embodiments, a user may add to their customized favorites by "starring" a selected artist/band, song/track, show/event, station, and/or venue. In at least one embodiment, at least a portion of user's Favorites may be accessed or viewed by other users of the DeliRadio System, such as, for example, the identified user's friends, followers, etc.

Figures 24, 25:
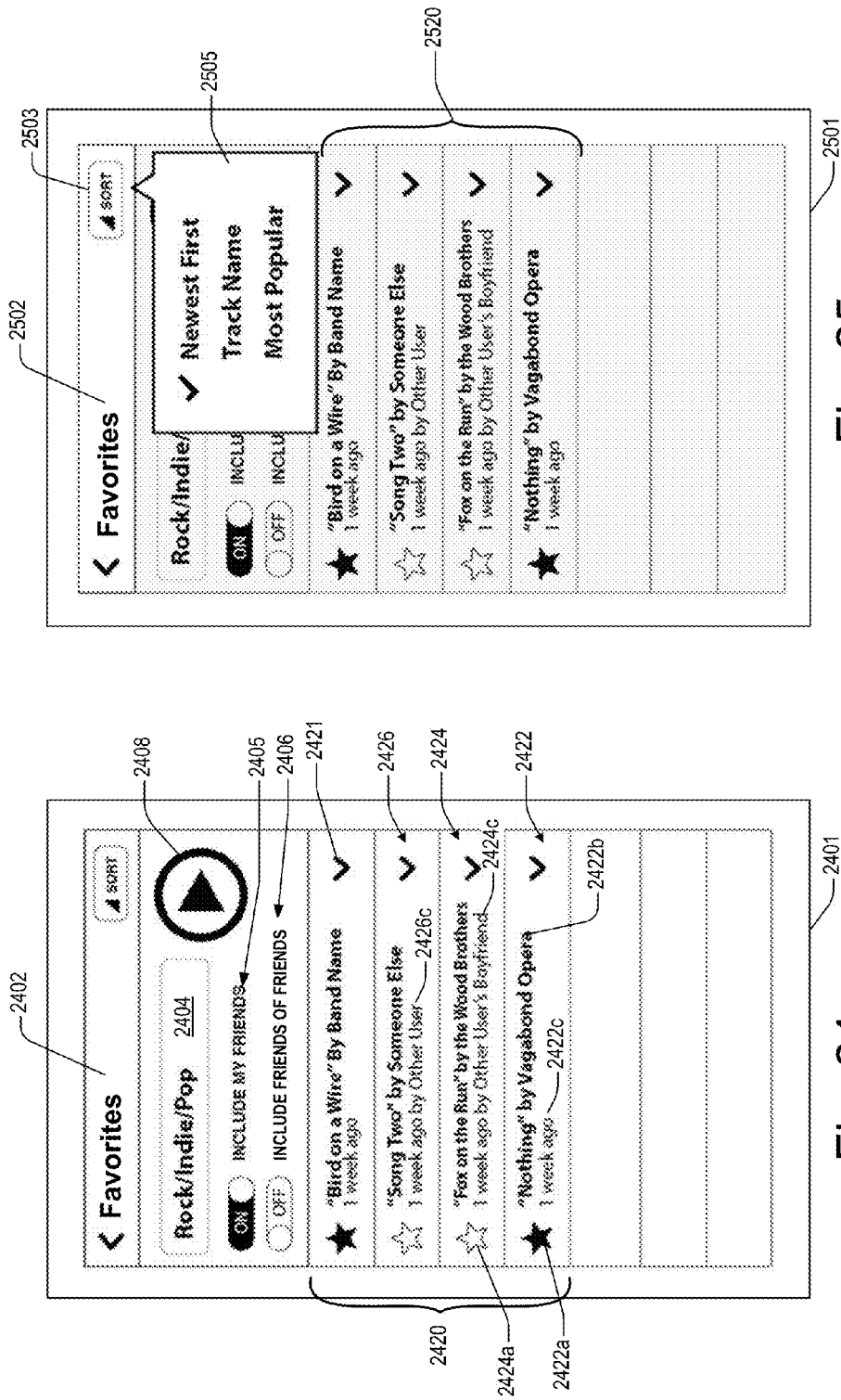

FIG. 24 illustrates an example screenshot of a User Favorite Tracks GUI which may be used to facilitate, initiate and/or perform various operation(s) and/or action(s) relating to the DeliRadio System technology described herein. In at least one embodiment, the User Favorite Tracks GUI may be configured or designed to provide functionality for enabling the user to identify, sort, filter, select, and/or edit his/her Favorite Tracks. As illustrated in the example embodiment of FIG. 24, a search/filter input interface 2404 may be provided to enable the user to search for desired tracks matching search keywords, and/or to filter the displayed favorite tracks based on various criteria such as, for example, artist, genre, then you, album, etc.

As illustrated in the example embodiment of FIG. 24, the User Favorite Tracks GUI may include a Play Button 2408, which, when selected (e.g., tapped on) by the user, may cause the DeliRadio System to dynamically generate a dynamic DeliRadio station which is based upon the filtered tracks 2420 which are being displayed in the Track List portion 2420 of the User Favorite Tracks GUI. In this way, for example, the Play Button may be utilized to create a genre-customized DeliRadio Station of the user's Favorite Tracks for the specified genre. In one embodiment, the user can also choose to view and/or to include (in a selected DeliRadio Station) selected Favorite Tracks of the user's DeliRadio's Friends (e.g., tracks which the user's friends have starred as "Favorites").

As illustrated in the example embodiment of FIG. 24, the User Favorite Tracks GUI may include information about when the user starred the track (e.g., 2422*c*, 2424*c*, 2426*c*). If the user clicks or taps on one of the "down arrow" buttons (e.g., 2421)—a drop down Action Drawer GUI may be displayed which may provide the user with suggested action choices such as, for example, one or more of the following (or combinations thereof): sharing, artist information, seeing which of the users DeliRadio Friends also likes this track or this artist, allowing the user to click through to those Mobile User Profiles, etc.

In at least one embodiment, the User Favorite Tracks GUI may include one or more, settings and/or features (e.g., 2405, 2406, etc.) which may be toggled on/off. For example, as illustrated in the example embodiment of FIG. 24, the user may toggle "on" or "off" the "Include My Friends" feature 2405, to thereby cause the User Favorite Tracks GUI to display/to not display Favorite Tracks of the user's DeliRadio Friends. Additionally, as illustrated in the example embodiment of FIG. 24, the user may toggle "on" or "off" the "Include Friends of Friends" feature 2406, to thereby cause the User Favorite Tracks GUI to display/to not display Favorite Tracks of friends of the user's DeliRadio Friends (e.g., Friends of Friends). In the specific example embodiment of FIG. 24, some of the displayed star icons (e.g., 2422*a*, 2424*a*) are "starred" (e.g., 2422*a*) and some are not "starred" (e.g., 2424*a*). In one embodiment, the tracks that are not "starred" indicate other user's Favorite Tracks, giving this user the ability to "star" that track as well. The drop down Action Drawer GUI feature may also be used to enable the user to learn more about the other users who have starred this track.

As illustrated in the example embodiment of FIG. 25, the User Favorite Tracks GUI may include sorting functionality (2503, 2505), which, for example, may allow the user to sort the displayed list of favorite tracks 2520 according to user selected criteria such as, for example, newest first (e.g., chronological sort), track name (e.g., alphabetical sort), most popular, etc.

Figure 26:
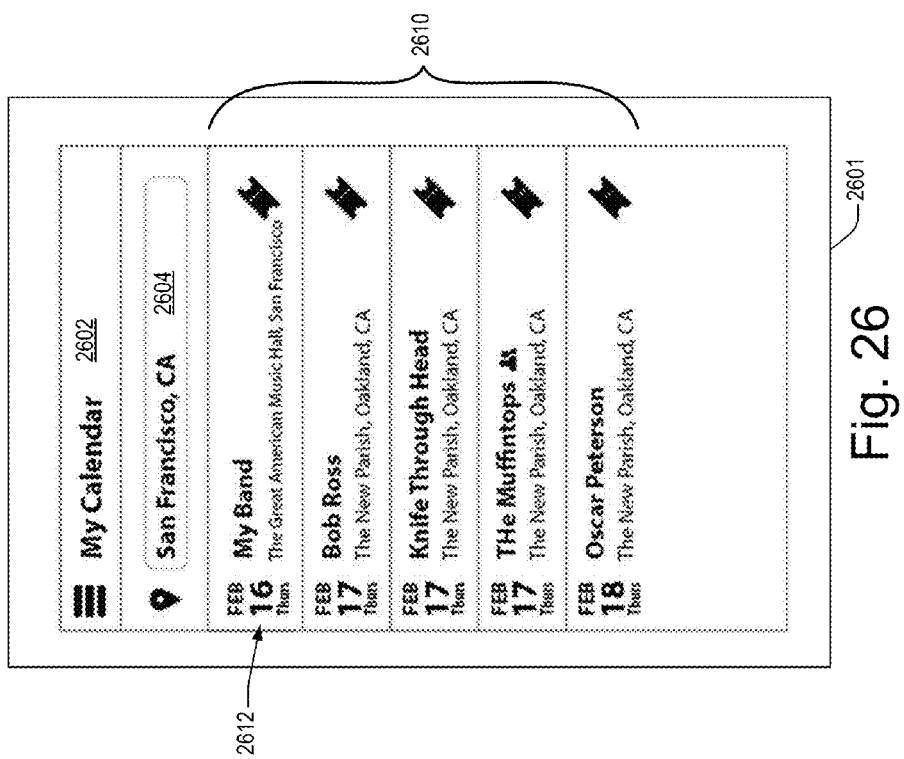

FIG. 26 illustrates an example screenshot of an embodiment of a User Calendar GUI 2601 which may be used to facilitate, initiate and/or perform various operation(s) and/or action(s) relating to the DeliRadio System technology described herein. In at least one embodiment, User Calendar GUI 2601 may be configured or designed to display a customized list 2610 of upcoming events relating to events, venues, tracks and/or artists that the user has starred. For example, the list of events may include artists (who have upcoming shows near the user's location) that are associated with one or more tracks that the user has starred. Clicking or tapping on one of the list entries (e.g., 2612) may direct the user to a related Event GUI which made display additional information relating to the selected event. In at least one embodiment, the DeliRadio Mobile Application may be configured or designed to allow the user to star the event, which may cause the selected event to automatically be added to the user's collection of Favorites.

As illustrated in the example embodiment of FIG. 26, the User Calendar GUI may also be configured or designed to include location search/filter functionality 2604, which, for example, may enable the user to input or specify a desired geographic location. In at least one embodiment, the DeliRadio Mobile Application and/or DeliRadio System may use the user-specified geographic location to generate a filtered list of calendar event results which have been customized based on the user's favorite or starred content (and/or which have been customized based on other information in the users profile. For example, in the specific example embodiment of FIG. 26, it is assumed that the DeliRadio Mobile Application is displaying a filtered list of upcoming shows in the user's current geographic location (e.g., San Francisco), wherein each of the different shows listed in the events list 2610 includes performances by at least one band or artist that has been dynamically identified (e.g., by the DeliRadio System) as being a "favorite" of the identified user (e.g., based on one or more tracks which the user has starred). Additionally, as illustrated in the example embodiment of FIG. 26, the customized calendar event list 2610 may include functionality for enabling the user to purchase and/or reserved tickets relating to one or more of the displayed events.

Figure 27:
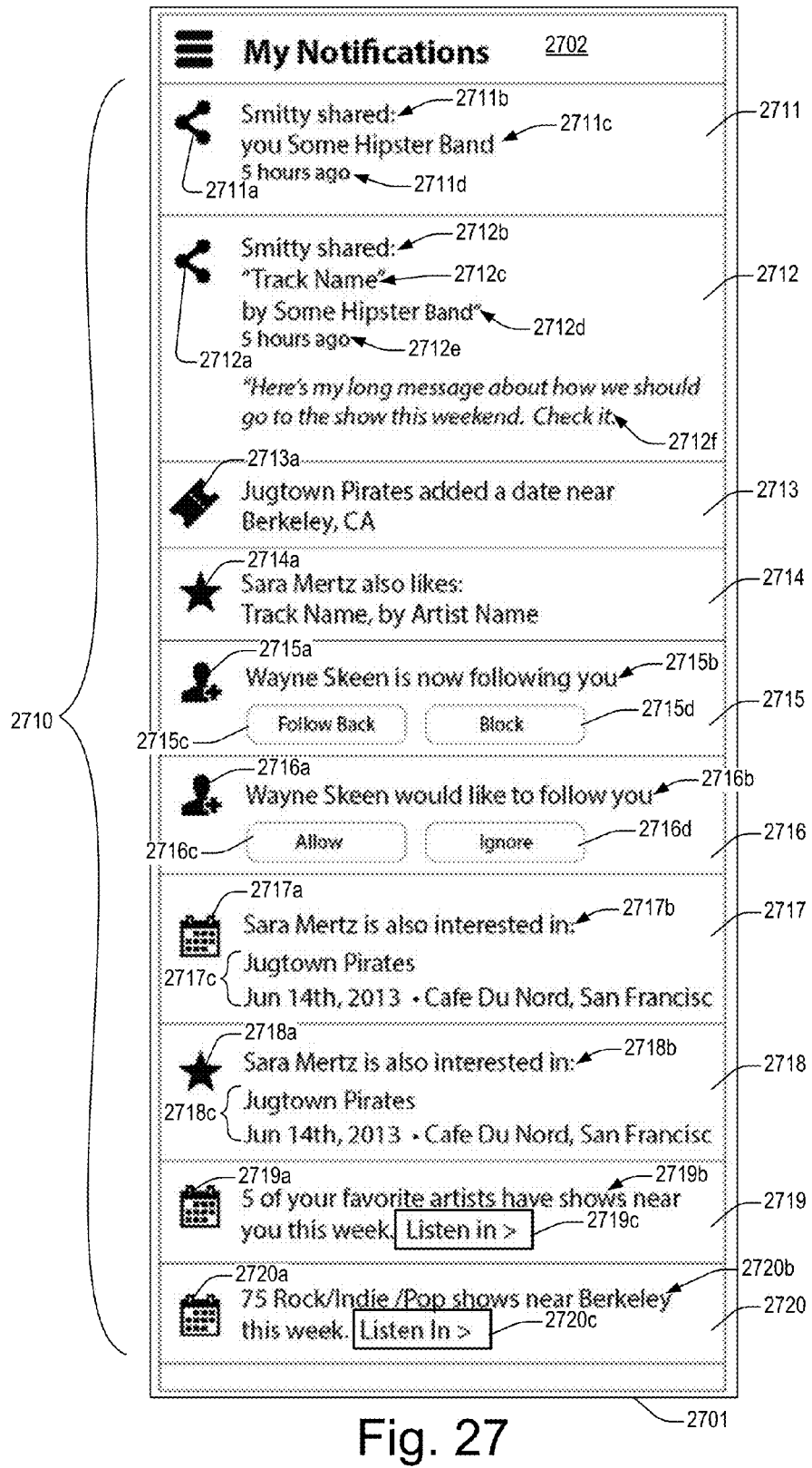

FIG. 27 illustrates an example screenshot of an embodiment of a User Notifications GUI 2701 which may be used to facilitate, initiate and/or perform various operation(s) and/or action(s) relating to the DeliRadio System technology described herein. In at least one embodiment, the user may access the User Notifications GUI by tapping on the "My Notifications" portion 914 of the Navigation Pane GUI of FIG. 9. In at least one embodiment, the User Notifications GUI may display a list 2710 of notifications which has been dynamically customized for the identified user. According to different embodiments, the User Notifications GUI may be configured or designed to display a variety of different types of notifications which, for example, may include, but are not limited to, one or more of the following (or combinations thereof):

- Artist, track, station, event shares from DeliRadio Friends, which may also include a short message or other content.
- New upcoming shows by Favorite Artists or Artists with Favorite Tracks.
- Favorite Artists, Tracks, Stations, Events as added by DeliRadio Friends.
- User follow requests—with option to allow or ignore.
- User follow notifications.
- General show notifications (which, for example, may be organized by genre or other criteria).
- Other types of notifications, communications, and/or events described and/or referenced herein.

In at least one embodiment, if User A and User B are mutual DeliRadio Friends and both have starred the same artist, and that artist has an upcoming local show, the User Notifications GUI for User A may display a notification that one of User A's Favorite Artists has an upcoming local show, and may also display a list of User A's other DeliRadio Friends (e.g., including User B) who like that artist and may also be interested in attending the identified show. If User A and User B are DeliRadio Friends, and User A stars an Event, and User B has starred one of the artists playing that Event, User B may receive a notification that User A may be interested in going to an Event where one of User B's Favorite Artists is performing. Also if User A stars an Event, User A may also receive notifications about other DeliRadio Friends/ users who have also starred that same Event.

Follow-type notifications may be implemented in accordance with several different embodiments. For example, in one embodiment, User A may configure his profile/account as "public" (e.g., allowing User A's account/profile to be publically visible). In this example, if User B (Wayne Skeen) requests to follow User A, User A may receive a notification message similar to public-follow request notification message 2715 (e.g., Wayne Skeen is now following you 2715*b*), along with options to Follow Back 2715*c* or Block 2715*d*. If, however, User A has configured his profile/account as "private", and if User B requests to follow User A, User A may receive a notification message similar to private-follow request notification message 2716 (e.g., Wayne Skeen would like to follow you 2716*b*), along with options to Allow 2716*c* or Ignore/Decline 2716*d*.

Figure 28:
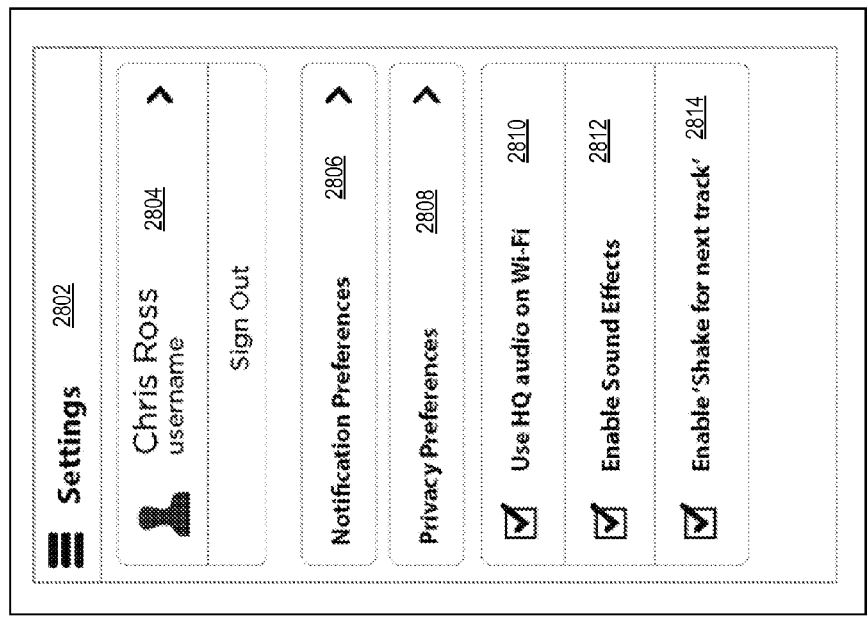

FIG. 28 illustrates an example screenshot of an embodiment of a User Settings GUI 2801 which may be used to facilitate, initiate and/or perform various operation(s) and/or action(s) relating to the DeliRadio System technology described herein. In at least one embodiment, the user may access the User Settings GUI by tapping on the "Settings" portion 916 of the Navigation Pane GUI of FIG. 9. According to different embodiments, the User Settings GUI may be configured or designed include functionality for enabling the user to configure various types of user-related account and/or profile settings such as, for example, one or more of the following (or combinations thereof):

- Notification preferences 2806.
- Privacy preferences 2808.
- Use high quality audio on Wi-Fi 2810.
- Enable Sound Effects 2812.
- Enable shake for next track feature 2814.
- Modify user profile details 2804.
- Modifying other types of user profile and/or account settings described and/or referenced herein.

DeliRadio Friends & Streams

FIGS. 8A-36 illustrate various example screenshots and GUIs relating to DeliRadio Friends & Streams functionality, at least a portion of which may be implemented at a mobile device (e.g., smartphone) via a DeliRadio Mobile Application. As described in greater detail below, at least a portion of the DeliRadio System GUIs may be configured or designed to provide mobile users with "location based" streaming radio functionality. Users from different geographic locations may access a variety of DeliRadio System GUIs to search for, create, and/or share customized streaming radio stations which may be configured to identify and play/stream music associated with one or more of the following (or combinations thereof):

- Upcoming shows;
- Bands/Artists;
- Venue related events;
- Online streaming radio stations;
- Online streaming video stations;
- Etc.

In at least one embodiment, the DeliRadio System may include functionality for enabling users to selectively filter search results and/or presented content according to a variety of different filtering criteria such as, for example, one or more of the following (or combinations thereof):

- geographic location;
- geographic proximity;

time/date criteria;
venue name(s);
music genre(s);
video genre(s);
artist/band name(s)
user ID;
geographic location of artist/band origin (e.g., home town);
geographic location of upcoming shows and/or events;
geographic proximity of upcoming shows and/or events;
etc.

Figures 8A, 8B:
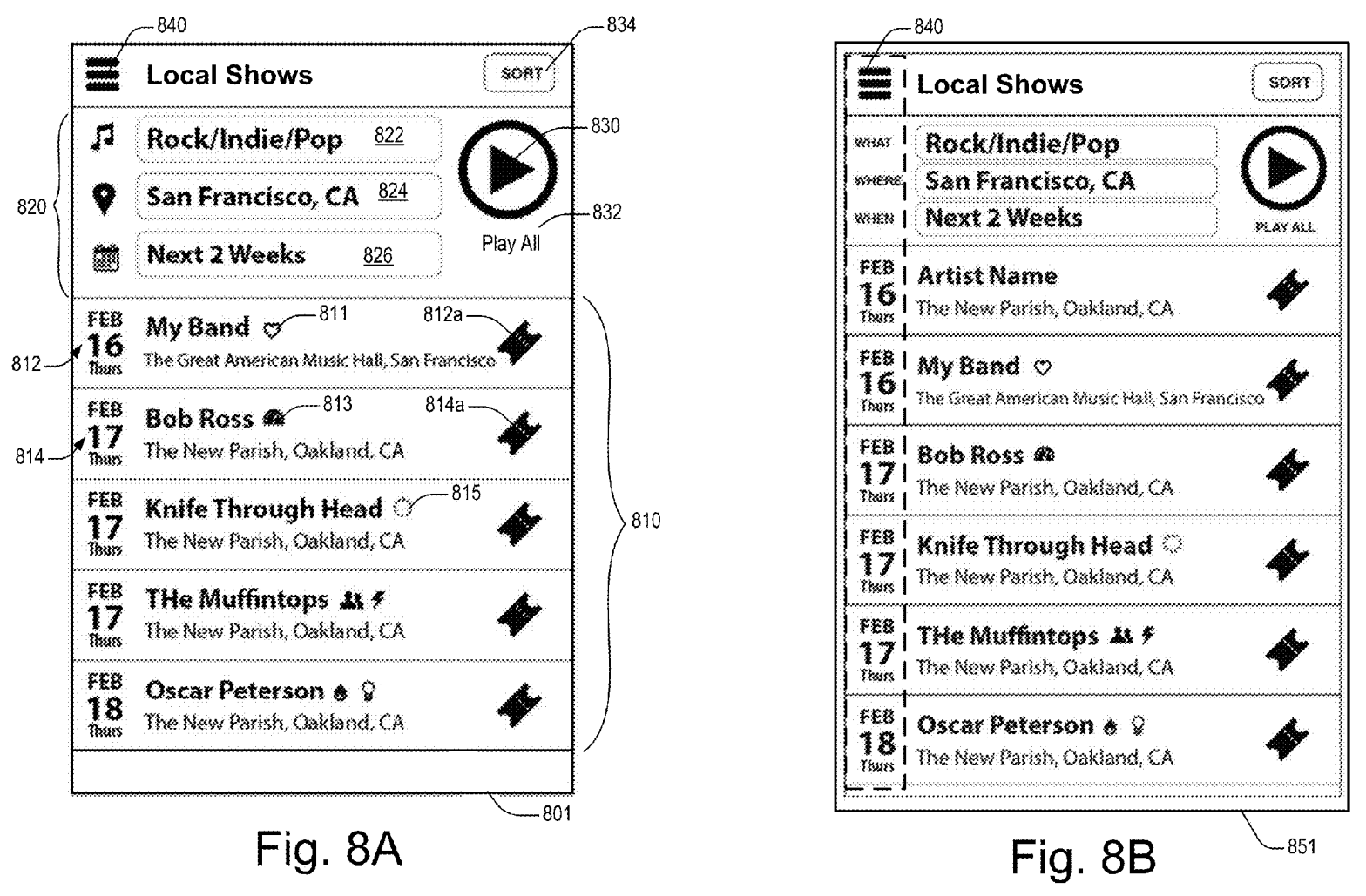

FIG. 8A illustrates an example screenshot of a Local Shows GUI which may be used to facilitate, initiate and/or perform various operation(s) and/or action(s) relating to the DeliRadio System technology described herein. As illustrated in the example embodiment of FIG. 8A, Local Shows GUI 801 provides an interface 820 which is configured or designed to enable a user to search for upcoming artist/band performances which match user-specified criteria such as, for example, one or more of the following (or combinations thereof): geographic location; geographic proximity; time/date criteria; venue name(s); music genre(s); video genre(s); artist/band name(s); geographic location of artist/band origin (e.g., home town); geographic location of upcoming shows and/or events; geographic proximity of upcoming shows and/or events; etc.

In the specific example embodiment of FIG. 8A, it is assumed that the user has initiated a search for upcoming artist/band performances which match the following user-selected criteria:

Music Genres/Types: Rock, Indie, Pop 822
Geographic Location San Francisco, Calif. 824
Timeframe: Next 2 Weeks In at least one embodiment, the user's specified search criteria may be provided to the MMMS Server System, which may use the search criteria to automatically and/or dynamically initiate (e.g., in real-time) one or more search query(s) at one or more MMMS System databases and/or 3$^{rd}$ party databases. Thereafter, the MMMS Server System may use the information and results obtained from the search query(s) to automatically and/or dynamically generate (e.g., in real-time) updated, customized, filtered content to be included in the Local Shows GUI that is displayed to the user. Accordingly, after the search/query has been initiated by the user, the content displayed in the Local Shows GUI may be automatically and dynamically updated to include customized GUIs and content matching (or relating to) user's specified filter-search criteria.

For example, as illustrated in the example embodiment of FIG. 8A, Local Shows GUI may be configured or designed to display Local Show search results 810 which includes updated content and links relating to the search criteria: Rock/Pop/Indie Shows Near San Francisco performing in the next Two Weeks.

According to different embodiments, the displayed content in the Local Show search results may include, for example, a list of different bands/artists (e.g., 812, 814, etc.) that will be performing in or near San Francisco in the next two weeks. In at least one embodiment, each different record (e.g., 812) in the list may include various types of artist-related, show-related, venue-related, and/or other types of related information such as, for example, one or more of the following (or combinations thereof):

Artist/Band Name
Artist/Band Home Town/City
Show Date
Venue Name (where show will be performed)
Venue Location
Links (e.g., 812a, 812b) and/or information relating to show ticket reservation/purchasing.

In at least one embodiment, using the MMMS Server System may be operable to use the user's filter criteria and filtered search results to dynamically generate (e.g., in real-time) at least one streaming radio station which will play songs only from artists which match the user's specified filter criteria. For example, as illustrated in the example embodiment of FIG. 8A, Local Shows GUI includes a "Play" button 830 which, when selected by the user (e.g., via screen tap), may dynamically generate and begin streaming a DeliRadio Station which plays songs performed by (or recorded by) the identified group of Rock/Pop/Indie artists/bands that will be performing shows in or near San Francisco within the next two weeks.

In at least one embodiment, when the user clicks on the Play button 830, a popup dynamic Station Player GUI may automatically be displayed at the user's mobile device which plays songs performed by (or recorded by) the identified artists/bands. In some embodiments, the customized DeliRadio Station may be created as a dynamic station in which the playlist for this station is dynamic, and changes over time, as different bands and venues match (over time) the customized filter criteria used to generate this station.

In at least one embodiment, this customized DeliRadio Station may be saved by the user under a desired station name selected by the user. In one embodiment, the user may click to save a dynamic station to the user's My Stations list. Once saved, the customized DeliRadio Station may be discovered by other users and/or shared to a variety of social networks such as Facebook, Twitter, etc. In at least one embodiment, the MMMS Server System tracks and saves (e.g., in at least one database) information relating to the customized DeliRadio Station, such as, for example, one or more of the following (or combinations thereof):

station name;
station type (e.g., dynamic or static);
station owner;
filter criteria used to generate the station;
artist/band names (or other artist/band identifiers) of artist(s)/band(s) associated with the station;
artist/band related information such as, for example: tour dates, twitter handles, DeliRadio artist/band page; genre information, tags, artist/band home town/city information, etc.;
song playlist information;
number of shares by users;
number of plays by users (e.g., over one or more time intervals);
number of stars collected;
track play history;
track popularity;
album information;
and/or other types of trackable DeliRadio information described herein.

In at least one embodiment, the MMMS Server System may periodically update the song list of the customized, dynamic DeliRadio Station so that the Station continues to stream only those songs which are performed by (or recorded by) Rock/Pop/Indie artists or bands that will be performing in or near near San Francisco within the next two weeks (e.g., w/in two weeks from the then current real-time date). In at least one embodiment, the displayed list of bands/shows may be sorted according to show date proximity, with the shows coming up the soonest being placed at or near the top of the list.

In at least one embodiment, the user may highlight or select artist/show record (e.g., 812) from the Local Show search results in order to access additional information and/or features relating to the highlighted/selected artist (and related shows), such as, for example, one or more of the following types of information (or combinations thereof):

Artist/Band Name;
Tags and/or Genre labels associated with the Artist/Band;
Artist/Band Home Town/City;
Upcoming Artist/Band Show/Tour dates'
Artist/Band related image content and/or video content (not shown)
Artist/Band Album information In at least one embodiment, using the MMMS Server System may be operable to use the user's filter criteria and filtered search results to dynamically generate (e.g., in real-time) at least one streaming radio station which will play only songs performed by (or recorded by) (or associated with) the selected artist. In some embodiments, the MMMS Server System may be operable to use the user's filter criteria and filtered search results to dynamically generate (e.g., in real-time) at least one streaming radio station which will play only songs performed by (or recorded by) artists or bands performing at the identified venue.

As illustrated in the example embodiment of FIG. 8A, various types of icons (e.g., 811, 813, 815, etc.) may be displayed next to each artist name, indicating the user's relationship to that artist. For example, a "heart" icon if the user has indicated they like this artist; a "speedometer" icon if this artist is trending upward in popularity; a "circle" icon if this artist is a favorite amongst the user's extended circle of friends; a "friend" icon if the user's friends like this artist; a "lightning bolt" or a "flame" icon if the artist is 'hot' right now; a "light bulb" icon if DeliRadio thinks the user might like this artist.

Figure 14:
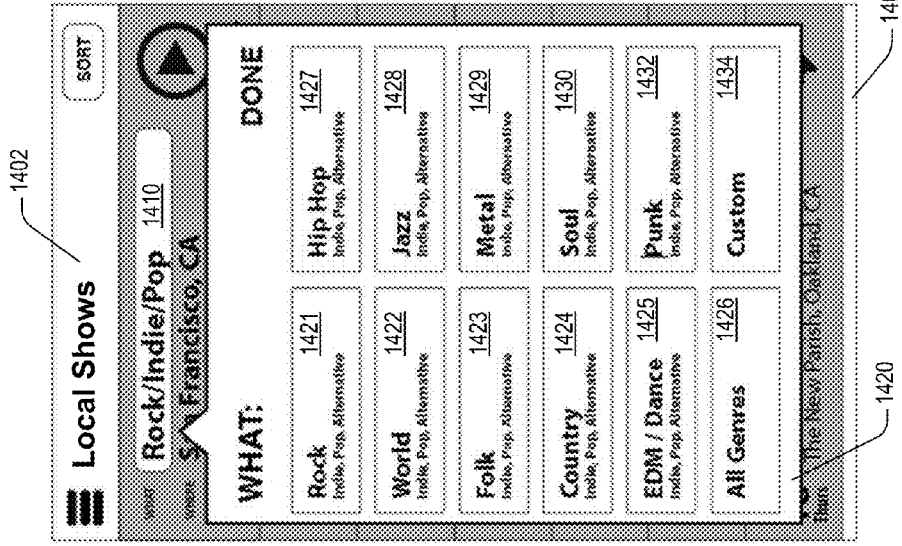

FIG. 14 illustrates an example screenshot of a Genre Selection GUI 1420 which may be used to facilitate, initiate and/or perform various operation(s) and/or action(s) relating to the DeliRadio System technology described herein. In the specific example embodiment of FIG. 14, it is assumed that the user has tapped on the Genre (e.g., "What") input field 1410 of the Local Shows GUI to access the Genre Selection GUI. As illustrated in the example embodiment of FIG. 14, Genre Selection GUI may be configured or designed include functionality for facilitating the user in selectively chosing and/or inputting genre-related and/or tag-related filtering criteria to be used as part of the user-specified search criteria. For example, according to different embodiments, Genre Selection GUI may me configured or designed to include one or more of the following features (or combinations thereof):

a predefined list of "Include-Type" Genre categories which (if selected by the user) are to be included as positive limitations of the filter criteria (e.g., punk+rock+jazz);
a predefined list of "Exclude-Type" Genre categories which (if selected by the user) are to be included as negative limitations of the filter criteria (e.g., not punk; not punk and not jazz);
a predefined list of "Include-Type" Tags which (if selected by the user) are to be included as positive limitations of the filter criteria;
a predefined list of "Exclude-Type" Tags which (if selected by the user) are to be included as negative limitations of the filter criteria;
an manual tag input interface which enables the user to manually enter one or more Tags to be included as part of the filter criteria;
a Presets interface which may include functionality for enabling the user to create and save different presents of user-customized Genres/Tags filtering criteria;
etc.

Figure 15:
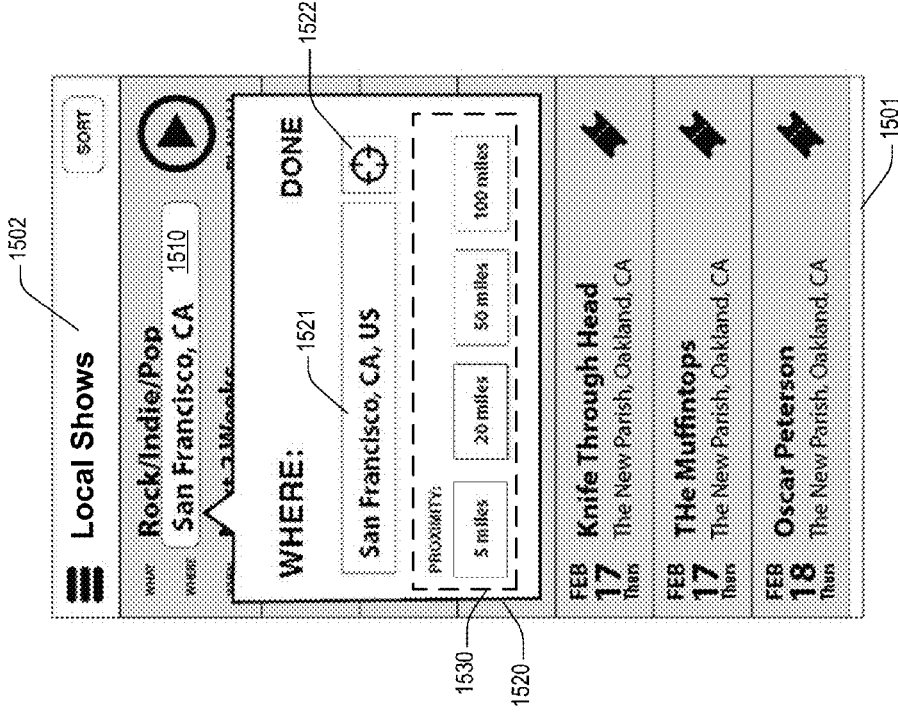

FIG. 15 illustrates an example screenshot of a Location/Proximity Selection GUI 1520 which may be used to facilitate, initiate and/or perform various operation(s) and/or action(s) relating to the DeliRadio System technology described herein. In the specific example embodiment of FIG. 15, it is assumed that the user has tapped on the Location/Proximity (e.g., "Where") input field 1510 of the Local Shows GUI to access the Location/Proximity Selection GUI. As illustrated in the example embodiment of FIG. 15, Location/Proximity Selection GUI may be configured or designed include functionality for facilitating the user in selectively chosing and/or inputting location/proximity filtering criteria to be used as part of the user-specified search criteria. For example, as illustrated in the example embodiment of FIG. 15, Location/Proximity Selection GUI may include one or more of the following features (or combinations thereof):

Location Input Interface 1521 for enabling a user to manually enter a desired location (e.g., city, state, country, zip code, etc.).
Automated current geolocation interface 1522, which, when tapped by the user, may cause the DeliRadio Mobile Application to access geolocation components of the user's mobile device (e.g., GPS components) to determine the user's current geolocation, and to cause the user's current geolocation to be automatically input into the Location Input Interface 1521. In at least one embodiment, the DeliRadio Mobile Application may use the user's current geolocation as the default input.
Proximity input interface 1530, which may be configured or designed to enable the user to specify a desired geographic proximity range to be used as part of the user-specified search criteria. For example, as illustrated in the example embodiment of FIG. 15, Location/Proximity Selection GUI may display a plurality of different proximity options (e.g., 5 mils, 20 miles, 50 miles, etc.) to be selected by the user. In some embodiments, the Location/Proximity Selection GUI may provide a manual input interface (e.g., a slider bar) for allowing the user to manually input a desired proximity value. In at least one embodiment, the DeliRadio Mobile Application may select a specific proximity value (e.g., 20 miles) as a default input.

FIG. 16 illustrates an example screenshot of a Timeframe Selection GUI 1620 which may be used to facilitate, initiate and/or perform various operation(s) and/or action(s) relating to the DeliRadio System technology described herein. In the specific example embodiment of FIG. 16, it is assumed that the user has tapped on the Location/Proximity (e.g., "When") input field 1610 of the Local Shows GUI to access the Timeframe Selection GUI. As illustrated in the example embodiment of FIG. 16, Timeframe Selection GUI may be configured or designed include functionality for facilitating the user in selectively chosing and/or inputting time-based filtering criteria to be used as part of the user-specified search criteria. For example, as illustrated in the example embodiment of FIG. 15, Location/Proximity Selection GUI may display a plurality of different timeframe options (e.g., tonight 1621, this weekend 1622, next two weeks 1623, all dates 1624, etc.) to be selected by the user. In some embodiments, the Timeframe Selection GUI may provide a custom date range input interface (e.g., 1626) for allowing the user to input a customized date range. In at least one embodiment, the DeliRadio Mobile Application may select a specific timeframe value (e.g., next two weeks) as a default input.

FIG. 17 shows an example screenshot of an alternate embodiment of a Local Shows GUI 1701, which has been configured or designed to include combined aspects of functionality from Genre Selection GUI 1420, Location/Proximity Selection GUI 1520, and Timeframe Selection GUI 1620.

Figures 18, 19:
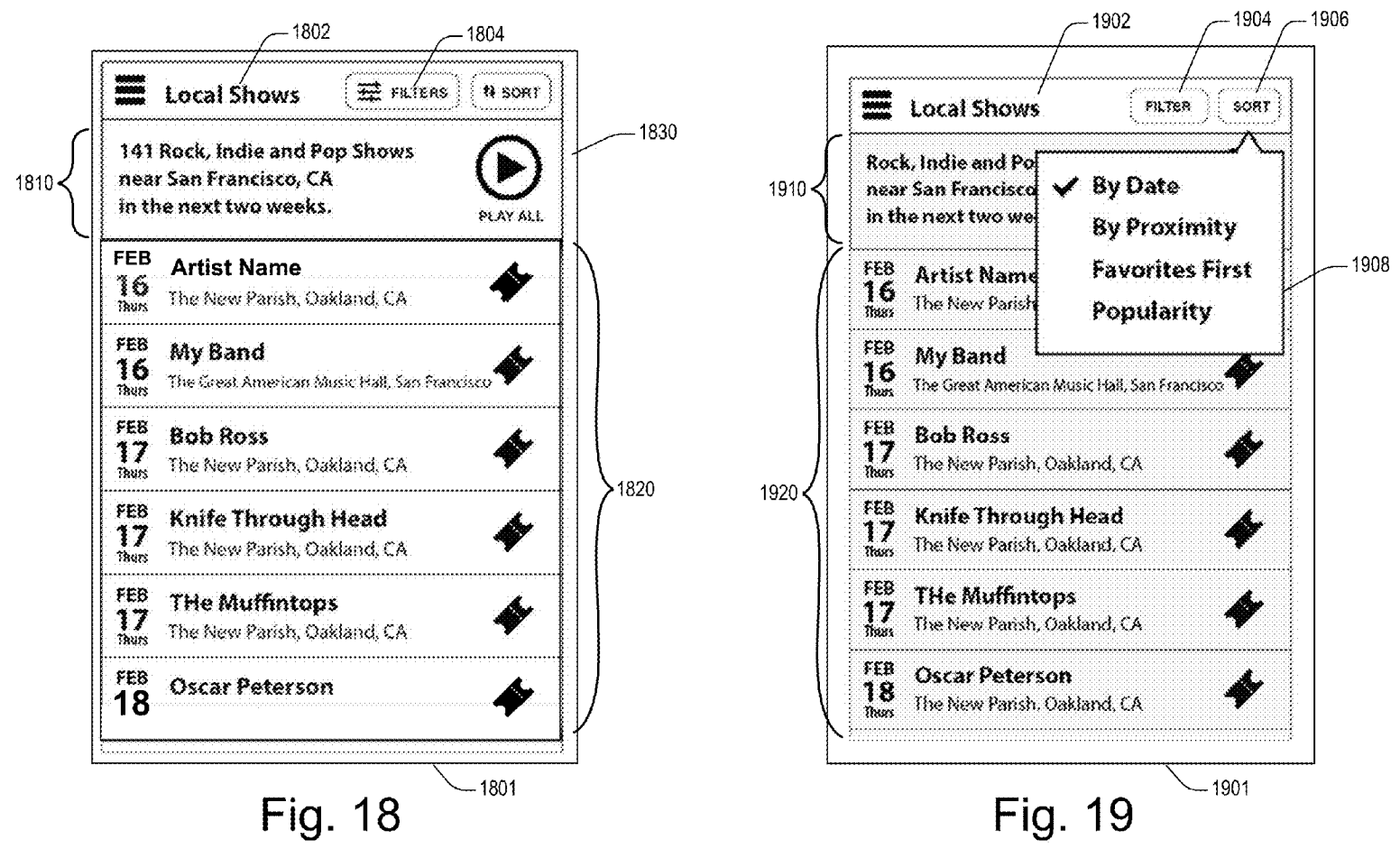

FIG. 18 shows an example screenshot of an alternate embodiment of a Local Shows GUI 1801 in which the filter criteria 1810 is shown in text format. In one embodiment, a user may tap on the Filters button 1804 to display additional GUIs for enabling the user to modify the filter criteria. As illustrated in the example embodiment of FIG. 19, the Local Shows GUI may include sorting functionality (1906, 1908), which, for example, may allow the user to sort the displayed list of upcoming shows/events (1920) according to user selected criteria such as, for example:

"By Date" which, for example, may list the search results chronologically.

"By Proximity" which, for example, may list the search results based on events occurring closest to the user's location.

"Favorites First" which, for example, may list the artists, venues and events that the user has starred or indicated as a Favorite.

"Popularity" which, for example, may list the results according to the most popular artists, venues and events (e.g., among the user's DeliRadio friends or among all DeliRadio users)

Etc.

FIG. 20 illustrates an example screenshot of an Event Page GUI 2001 which may be used to facilitate, initiate and/or perform various operation(s) and/or action(s) relating to the DeliRadio System technology described herein. In the specific example embodiment of FIG. 20, it is assumed that the user has tapped on an event listing (e.g., 1822) displayed in the Event List 1820 of Local Shows GUI (FIG. 18) to access the Event Page GUI. As illustrated in the example embodiment of FIG. 20, Event Page GUI may be configured or designed to provide information relating to the selected event, such as, for example, one or more of the following (or combinations thereof):

A list of the names of the artist(s) who will be performing at the event (2004).

The day/date of the event (2006).

The event venue name, and address (2008).

The ticket price and the start time of the event (2009).

In at least one embodiment, a user may click or tap on the name of one of the display artist names (e.g., "Artist Name") to display a Mobile Artist Profile Info GUI which provides more detailed information about the selected artist. According to different embodiments, the Mobile Artist Profile Info GUI may be displayed either via a new screen, or at the bottom of the Event Page GUI.

As illustrated in the example embodiment of FIG. 20, Event Page GUI may include one or more icons (e.g., 2010, 2012, 2014, 2016) which may each be configured or designed to enable the user to initiate and/or perform various operation(s) and/or action(s) such as, for example, one or more of the following (or combinations thereof):

Initiate (e.g., 2010) streaming of a customized DeliRadio Station which plays songs performed by (or recorded by) artists/bands who will be performing at the identified venue.

Star (e.g., 2012) the identified event, which may cause the event to be added to the user's favorite events.

Purchase and/or reserve (e.g., 2014) one or more tickets for the identified show.

Share details about the identified event with the user's DeliRadio friends, other DeliRadio users, social networks, email, twitter, etc.

and/or other types of actions, operations and/or activities described and/or referenced herein.

For example, in at least one embodiment, the user may tap the "Play" icon 2010 to cause the DeliRadio System to dynamically generate and begin streaming a customized DeliRadio Station which plays songs performed by (or recorded by) one or more of the artists/bands (e.g., 2004) who will be performing at the identified venue (e.g., 2008) on the identified date (e.g., 2006). In this way, the DeliRadio System provides functionality for enabling a user to create and play a dynamically customized DeliRadio Station which may represent a lineup for a selected show at a given venue, and which features full tracks by the artists/bands who will be performing at that show.

In other embodiments, additional venue-related DeliRadio Station icons and/or GUIs may be presented for enabling the user to:

Cause the DeliRadio System to dynamically generate and begin streaming a customized DeliRadio Station which plays songs matching one or more genres which are performed by (or recorded by) artists/bands who will be performing at the identified venue.

Cause the DeliRadio System to dynamically generate and begin streaming a customized DeliRadio Station which plays songs performed by (or recorded by) artists/bands who will be performing at the identified venue within a specified time period (e.g., within the next two weeks, within the next 30 days, this weekend, etc).

Cause the DeliRadio System to dynamically generate and begin streaming a customized DeliRadio Station which plays songs matching one or more genres which are performed by (or recorded by) artists/bands who will be performing at the identified venue within a specified time period.

Cause the DeliRadio System to dynamically generate and begin streaming a customized DeliRadio Station which only plays songs matching one or more genres which are performed by (or recorded by) artists/bands who will be performing at the identified venue within a specified time period.

Cause the DeliRadio System to dynamically generate and begin streaming a customized DeliRadio Station which plays songs matching one or more genres which are performed by (or recorded by) artists/bands are listed on the venue's show calendar.

Cause the DeliRadio System to dynamically generate and begin streaming a customized DeliRadio Station which plays songs matching one or more genres which are performed by (or recorded by) artists/bands who have performed at the identified venue in the past.

In at least some embodiments, the DeliRadio System and/or DeliRadio Mobile Application may include functionality which enables a user to create and stream a customized, multi-venue DeliRadio Station which plays songs/tracks performed by (or recorded by) artists/bands who have upcoming shows at at least one of a group of venues (e.g., songs by artists who will be performing at either The Fillmore Theater or the Warfield Theater (in San Francisco)).

In at least one embodiment, the DeliRadio System and/or DeliRadio Mobile Application may be configured or designed to present different types of Calendar Event GUIs which are customized for a given user. For example, some types of Calendar Event GUIs may include a list of "suggested events" (e.g., shows that the DeliRadio System "thinks" the user may be interested in attending) which, for example, may be based on one or more of the following (or combinations thereof):

The user's starred (or Favorite) DeliRadio artists/bands who have upcoming local shows in the user's current geographic location.

The user's starred (or Favorite) venues.

The user's starred (or Favorite) genres.

Invitations from the user's DeliRadio friends and/or other users who have invited or recommended the user to attend one or more shows/events.

In at least some embodiments, other types of Calendar Event GUIs may include a list of specific events:

That the user has already starred or expressed interest in attending.

That the user has already reserved or purchased tickets for.

FIG. 21 illustrates an example screenshot of a Local Artists GUI 2101 which may be used to facilitate, initiate and/or perform various operation(s) and/or action(s) relating to the DeliRadio System technology described herein. In the specific example embodiment of FIG. 21, it is assumed that the user has tapped on Local Artists GUI portion 906 of the Navigation Pane GUI of FIG. 9. As illustrated in the example embodiment of FIG. 21, Local Artists GUI may be configured or designed include functionality for dynamically determining and displaying a list of artists/bands (e.g., 2120) who have indicated a "hometown" that matches the user's search criteria for genre (e.g., 2104) and location) e.g., 2106). As illustrated in the example embodiment of FIG. 21, Local Artists GUI may include a "Play" icon 2108 which, when tapped or selected by the user, may cause the DeliRadio System to dynamically generate and begin streaming a customized DeliRadio Station which plays songs performed by (or recorded by) one or more of the artists/bands listed in the filtered results (e.g., 2120). In this way, the user is able to create and listen to a dynamic DeliRadio Station of tracks performed (or recorded by) local artists/bands which match the user's specified genre and/or location filters.

As illustrated in the example embodiment of FIG. 22, the Local Artists GUI may include sorting functionality (2203, 2205), which, for example, may allow the user to sort the displayed list of local artists/bands according to user selected criteria such as, for example:

"Favorites First" which, for example, may sort the list results according to the artists/bands that the user has starred or indicated as a Favorite.

"Popularity" which, for example, may sort the list results according to the most popular artists/bands (e.g., as rated by the user's DeliRadio friends or among all DeliRadio users)

"On Tour" which, for example, may sort the list results based on whether or not a given artist/band is currently on tour (and/or based on a given artist's/band's tour schedule).

FIG. 23 illustrates an example screenshot of a Local Venues GUI 2301 which may be used to facilitate, initiate and/or perform various operation(s) and/or action(s) relating to the DeliRadio System technology described herein. In the specific example embodiment of FIG. 23, it is assumed that the user has tapped on Venues & Festivals GUI portion 908 of the Navigation Pane GUI of FIG. 9. As illustrated in the example embodiment of FIG. 23, Local Venues GUI may be configured or designed include functionality for dynamically determining and displaying list (e.g., 2320) of local venues and festivals, which, for example, may be determined based on the user's input (e.g., via input interface 2304) and/or based on the user's current geographic location. As illustrated in the example embodiment of FIG. 23, a respective "Play" icon (e.g., 2322b, 2324b) may be displayed next to each different venue/festival (e.g., 2322a, 2324a) displayed in the Local Venues list 2320, which enables the user to create and play a dynamically customized DeliRadio Station which may represent a lineup of the bands/artists who are (or who will be) performing at the identified venue/festival, and which may feature full tracks by the artists/bands who will be performing at that venue/festival. In at least some embodiments, Local Venues GUI may also include additional venue/festival relating information such as, for example: venue/festival location, the number of DeliRadio artists who will be performing at the venue/festival (and/or who are included as one of the artists/bands of that venue/festival's DeliRadio Station), etc.

FIG. 8B illustrates an alternate example screenshot of a Local Shows GUI, which, is configured or designed to enable a user to search for upcoming artist/band performances which match user-specified criteria such as, for example, one or more of the following (or combinations thereof): geographic location; geographic proximity; time/date criteria; venue name(s); music genre(s); video genre(s); artist/band name(s); geographic location of artist/band origin (e.g., home town); geographic location of upcoming shows and/or events; geographic proximity of upcoming shows and/or events; etc.

As illustrated in the example embodiment of FIG. 8B, GUI 851 may include a Navigation Pane Access button 840, which, if selected by the user, may cause a Navigation Pane GUI to be displayed at the user's mobile device. Alternatively, in at least one embodiment, when a user swipes from left to right (or right to left) from one or more screens/GUIs of the DeliRadio Mobile App, a Navigation Pane GUI may be caused to be displayed, as illustrated, for example, in FIG. 9.

Figure 9:
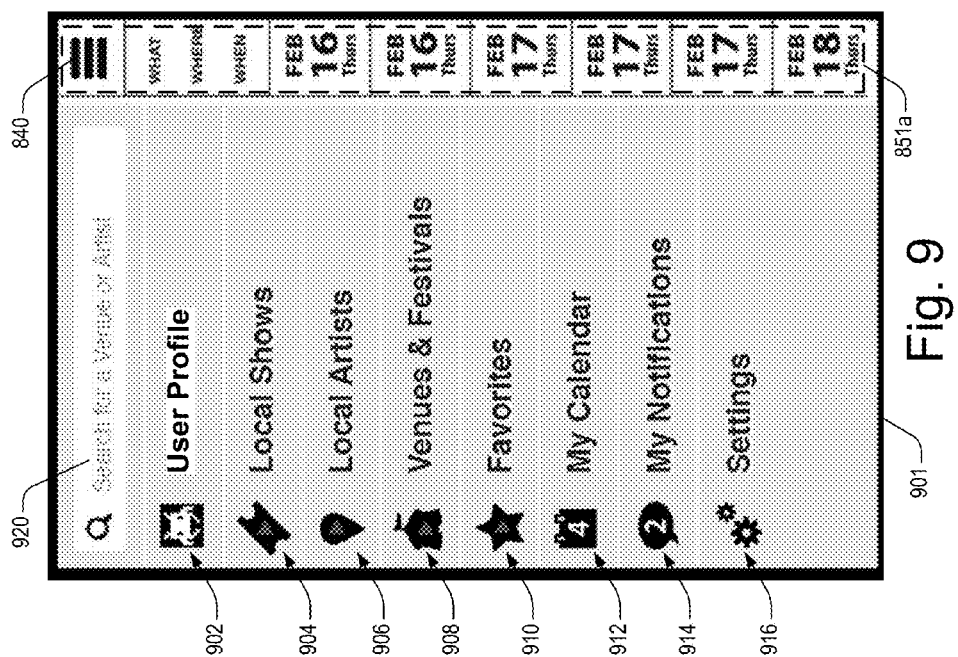

FIG. 9 illustrates an example screenshot of a Navigation Pane GUI, which may be configured or designed to provide the user with top-level menu choices for navigating and accessing various features and functionalities of the DeliRadio Mobile App, such as, for example, one or more of the following (or combinations thereof):

Accessing the DeliRadio user's profile and related information 902.

Displaying a list of local upcoming shows;

Performing customized searches for upcoming local shows 904.

Displaying a list of artists who will be performing locally; Performing customized searches for upcoming local shows 904.

Searching the DeliRadio database for artists or venues.

Displaying a local artist list and/or a.

Displaying a local venue and festival list.

User's collection of starred artists, tracks, events, venues and stations.

List of the events saved to the user's DeliRadio Calendar.

User's notifications of content shared with that user by other users, activity by other users, upcoming events, follow requests, etc.

User's settings for the Mobile App.

Etc.

One of the advantageous features of the DeliRadio mobile application relates to the ability for the DeliRadio mobile application to accurately determine (e.g., in real-time) the precise geolocation of the user at any given time, and to use such information to facilitate the searching, selection, filtering, and display of information which is contextually relevant to the users current, real-time geolocation. For example, in one embodiment, when a user launches the DeliRadio mobile application at the user's mobile device (e.g., smartphone), the DeliRadio mobile application may be configured or designed to precisely determine (e.g., in real-time) the user's current geographic location via use of the mobile device's GPS functionality (and/or via use of other mobile device components which are designed to determine the real-time, current geographic location of the mobile device). In general, the real-time tracking and granularity of determining a user's current geographic location is significantly more accurate using a mobile device's GPS functionality than it is using the device's IP address. Accordingly, by monitoring and tracking the real-time geolocation of the user using GPS functionality, more granular and detailed operations may be performed relating to the searching, selection, filtering, and display of information which is contextually relevant to the users current, real-time geolocation.

Figure 47:
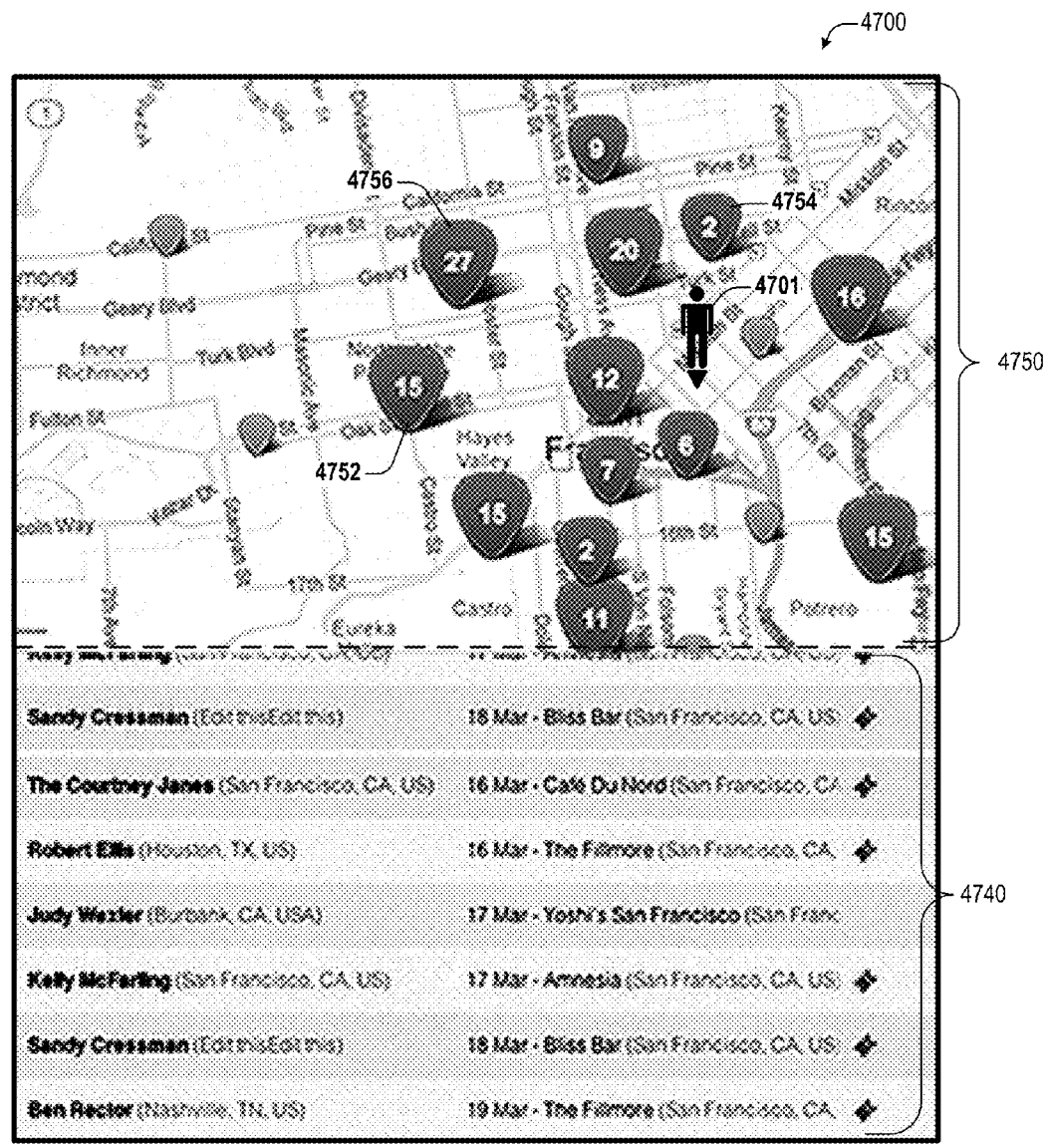

For example, as illustrated in the example embodiment of FIG. 47, the DeliRadio mobile application may use the user's current geolocation to display a Mobile User Event/Venue GUI 4700 which includes a MAP GUI portion 4750 that displays the user's current geographic location 4701 along with filtered search results (e.g., 4752, 4754, 4756) representing bands/artists which have upcoming gigs at venues within a predetermined proximity (e.g., w/in 2 miles) from the users current geographic location. In at least one embodiment, Mobile User Event/Venue GUI may be continuously and/or periodically updated to show changes in user's current geolocation, along with updated content showing updated search results based on the user's then current location. As illustrated in the example embodiment of FIG. 47, Mobile User Event/Venue GUI 4700 may also include an Event List GUI portion 4740. In at least one embodiment, each different record (e.g., 812, 814, etc.) in the Event List may include various types of artist-related, show-related, venue-related, and/or other types of related information such as, for example, one or more of the following (or combinations thereof):

Artist/Band Name
Artist/Band Home Town/City
Show Date
Venue Name (where show will be performed)
Venue Location
Links and/or information relating to show ticket reservation/purchasing.
etc.

According to different embodiments, the displayed list information may be sorted and/or organized based on various criteria such as, for example: proximity to user's current location, show dates/times, etc.

In another example, the DeliRadio-generated playlist of streaming music being streamed to the a user's mobile device may be automatically and dynamically modified over time (e.g., in real-time) based on user's updated geolocation. For example, in one embodiment, a user may be in a moving vehicle listening to a dynamically generated DeliRadio station which is configured to play songs performed by (or recorded by) artists/bands who will be performing at upcoming shows at venues within a radius of 30 miles from the users current geographic location. In one embodiment, if the user is traveling by car from San Francisco to Sacramento, the DeliRadio System may be configured or designed to periodically monitor and determine an updated current geolocation for the user, and may use the user's updated geolocation information to automatically and dynamically modify the playlist of songs being steamed to the user's mobile device. Thus, for example, as the user departs San Francisco, the streamed DeliRadio station may be dynamically configured to play songs performed by (or recorded by) artists/bands who will be performing at upcoming shows at venues in San Francisco. The DeliRadio System may periodically monitor and determine an updated current geolocation for the user, and as the user nears Sacramento, the streamed DeliRadio station may be dynamically modified to include songs performed by (or recorded by) artists/bands who will be performing at upcoming shows at venues in Sacramento.

Venue Check-In Functionality

In at least one embodiment, mobile device users may also advantageously use the DeliRadio Mobile Application to "Check-In" at a show or event. For example, in one embodiment, by accessing one or more databases relating to events, shows, and/or tour dates (e.g., including, for example, DeliRadio tour date archive database), and using the geolocation services/functionality at the user's mobile device (at least a portion of which may be provided by the DeliRadio Mobile Application), the venue check-in process may be streamlined considerably as compared to more traditional methods of check-in. In some embodiments, the DeliRadio Mobile Application may be configured or designed to automatically detect and track the user's current geolocation, and may be further configured or designed to perform automated check-in operations on behalf of the user. For example, in one embodiment, the DeliRadio Mobile Application may be configured or designed to facilitate, enable, initiate, and/or perform one or more of the following operation(s), action(s), and/or feature(s) (or combinations thereof):

Determine that the user has reserved or purchase tickets for a given event/show at a given venue.
Identify the start time of the identified show.
Determine the geolocation of the identified venue.
Automatically initiate and determine the geolocation of the user (or user's mobile device).

For example, in one embodiment, if the identified show is scheduled to take place from 8 PM-10 PM, the DeliRadio Mobile Application may be configured or designed to automatically initiate tracking of the user's geolocation during the scheduled show performance (e.g., from 8 PM-10 PM)

Automatically determine if the user's current geolocation matches the geolocation of the venue.
Automatically initiate and complete a "check-in" operation if it is determined that the user's current geolocation matches the geolocation of the venue.
Automatically populate the "check-in" event with contextually relevant information such as, for example, information relating to the artist/band currently performing at the identified venue, information relating to the artist/band for which the user has reserved/purchased tickets, etc.

In at least one embodiment, the DeliRadio Mobile Application may be configured or designed to include functionality for facilitating user "Check-In" activities at a given venue & event. After completing a check-in activity at a given location, the user may be granted (e.g., via the DeliRadio Mobile Application and/or DeliRadio website) access to additional functionality, promotional opportunities, and/or rewards, such as, for example, one or more of the following (or combinations thereof):

Join the venue email list.
Vote for upcoming shows (e.g., at that venue).
Access current band's info, twitter, Facebook, merchandise and email list signups.
Incentives for discounted drinks and/or merchandise.
Receive information or notification about friends or other DeliRadio users who will be attending one or more show(s) at the venue and/or who have already check-in at the venue for the current show.

Send photos to band and/or DeliRadio Band/Artist webpage or blog.

Integrate with additional "check-in" services.

Earn points for social activity which may be later redeemed by the user for promotional rewards, incentives, etc.

FIG. 10 illustrates an example screenshot of a Following Users GUI which may be used to facilitate, initiate and/or perform various operation(s) and/or action(s) relating to the DeliRadio System technology described herein. In at least one embodiment, the user may tap the "Following" menu item 738 of User Profile GUI 701 to be presented with the Following Users GUI 1001. As illustrated in the example embodiment of FIG. 10, the Following Users GUI may be configured or designed to display a list 1010 of other DeliRadio users that the current user (e.g., Chris Ross 1002) is following. According to different embodiments, profile pictures, real names and DeliRadio usernames may be displayed, together with arrows indicating that more information about each user is available. In at least one embodiment, the user may tap on one of the entries (e.g., 1003) of list 1010 corresponding to a specific user (e.g., Howie Cockrill) to access additional information about the selected user.

FIG. 11 illustrates an example screenshot of a User Info GUI which may be used to facilitate, initiate and/or perform various operation(s) and/or action(s) relating to the DeliRadio System technology described herein. In the specific example embodiment of FIG. 11, it is assumed that the user has tapped on entry 1003 of list 1010 (FIG. 10) to access additional information about the selected user (Howie Cockrill). As illustrated in the example embodiment of FIG. 11, User Info GUI may be configured or designed to display and/or provide access to various types of information associated with the User Profile for the DeliRadio user: Howie Cockrill, such as, for example, one or more of the following (or combinations thereof):

- User profile/bio information 1104.
- Favorites Information 1108 relating to the identified user's favorite tracks, albums, bands, playlists, etc. In one embodiment, the user may tap on the Favorits menu item 1108 to access a list of the identified user's (Howie Cockrill's) favorite tracks, albums, bands, playlists, etc.
- Following Information 1110 relating to other persons, artists/bands, and/or users which the identified user (Howie Cockrill) is currently following. In one embodiment, the user may tap on the Following menu item 1110 to access a list of other DeliRadio users and/or artists that the identified user (e.g., Howie Cockrill) is following.
- Follower Information 1112 relating to other persons, artists/bands, and/or users who are following the identified user (Howie Cockrill). In one embodiment, the user may tap on the Follower menu item 1112 to access a list of other DeliRadio users and/or artists who are following the identified user (e.g., Howie Cockrill).
- Functionality 1106 for enabling the current user (Chris Ross) to "unfollow" the identified user (Howie Cockrill), in which case the user will no longer receive information or notifications about Howie Cockrill's activity on DeliRadio.
- and/or other types of information and/or functionality described herein.

FIG. 12 illustrates an example screenshot of a User Favorites GUI which may be used to facilitate, initiate and/or perform various operation(s) and/or action(s) relating to the DeliRadio System technology described herein. In the specific example embodiment of FIG. 12, it is assumed that the user has tapped on the Favorites entry 1108 (FIG. 11) to access Favorites Information relating to the identified user (Howie Cockrill). As illustrated in the example embodiment of FIG. 12, User Favorites GUI may be configured or designed to display and/or provide access to various types of information associated with the user's favorite or starred content such as, for example, one or more of the following (or combinations thereof):

- Favorite artists 1204.
- Favorite tracks or songs 1206.
- Favorite shows or events 1208.
- Favorite venues 1210.
- Favorite stations (e.g., DeliRadio stations) 1212.
- And/or other types of information and/or functionality described herein.

In at least one embodiment, at least a portion of user's Favorites may be accessed or viewed by other users of the DeliRadio System, such as, for example, the identified user's friends, followers, etc.

FIG. 13 illustrates an example screenshot of a User Favorite Tracks GUI 1301 which may be used to facilitate, initiate and/or perform various operation(s) and/or action(s) relating to the DeliRadio System technology described herein. In the specific example embodiment of FIG. 13, it is assumed that the user has tapped on the Tracks portion 1206 of User Favorites GUI (FIG. 12) to access the User Favorite Tracks GUI. As illustrated in the example embodiment of FIG. 13, User Favorite Tracks GUI may be configured or designed to display and/or provide access to various types of information associated with the identified user's favorite tracks and/or other starred content.

As illustrated in the example embodiment of FIG. 13, the User Favorite Tracks GUI 1301 may include a Play Button 1305, which, when selected (e.g., tapped on) by a user, may cause the DeliRadio System to dynamically generate a dynamic DeliRadio station which is based on the identified user's (Howie Cockrill's) favorite tracks 1310. In this way, for example, the Play Button may be utilized to create a user-specific, customized DeliRadio Station which represents the identified user's favorite music.

As illustrated in the example embodiment of FIG. 13, the User Favorite Tracks GUI may include information about when the user starred the track. If the user clicks or taps on one of the "down arrow" buttons (e.g., 1321)—a drop down Action Drawer GUI may be displayed which may provide the user with suggested action choices such as, for example, one or more of the following (or combinations thereof): sharing, artist information, seeing which of the users DeliRadio Friends also likes this track or this artist, allowing the user to click through to those Mobile User Profiles, etc.

In at least one embodiment, by clicking on "Friends & Profile" on the QuickStart GUI, the user may be automatically navigated to a GUI portion, which, for example, may display a list of any tracks which the user's DeliRadio Friends have "starred" (and/or additional related information such as, for example, when they starred them, etc.). By clicking on a track which the DeliRadio Friend has starred, the user may listen to that track (and/or related tracks/radio stations).

Figure 29:
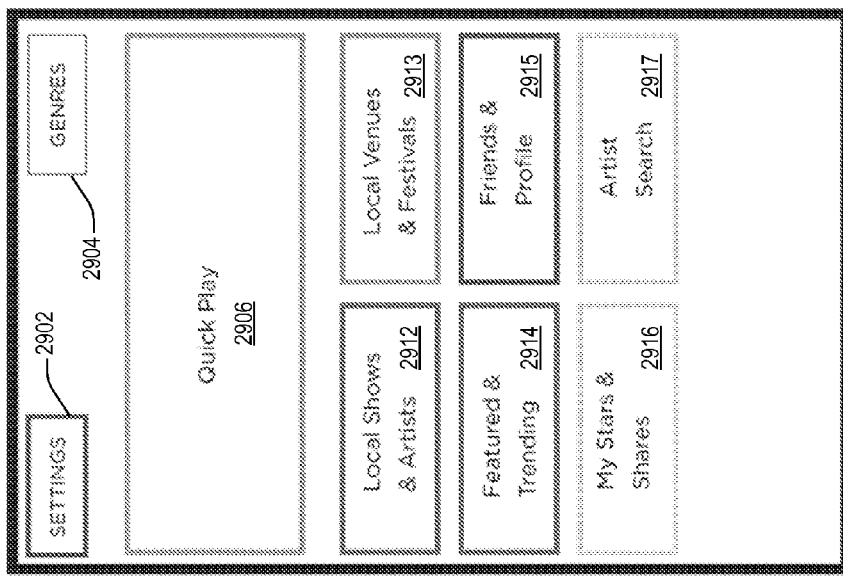

FIG. 29 shows an example screenshot of an embodiment of a DeliRadio Mobile Application Homescreen GUI 2901 which may be used to facilitate, initiate and/or perform various operation(s) and/or action(s) relating to the DeliRadio System technology described herein. In the example embodiment of FIG. 29, the DeliRadio Mobile Application Homescreen GUI may be configured or designed to enable the user to perform or initiate one or more of the following (or combinations thereof):

Access the user's app settings; select genres.
"QuickPlay" a station of artists with shows based around the user's location and selected genre(s).
Finetune the user's station settings with regard to location, proximity around that location, timeframe, and local artists vs. local shows.
Finetune the user's station settings with regard to venue and festival specific searches.
View and listen to featured and trending content on DeliRadio.
View the user's own profile and the user's DeliRadio friends' profiles.
View the content the user has favorited with "stars" as well as the content the user has shared with other DeliRadio friends and across social sharing platforms.
Search for specific artists within DeliRadio.

Figure 30:
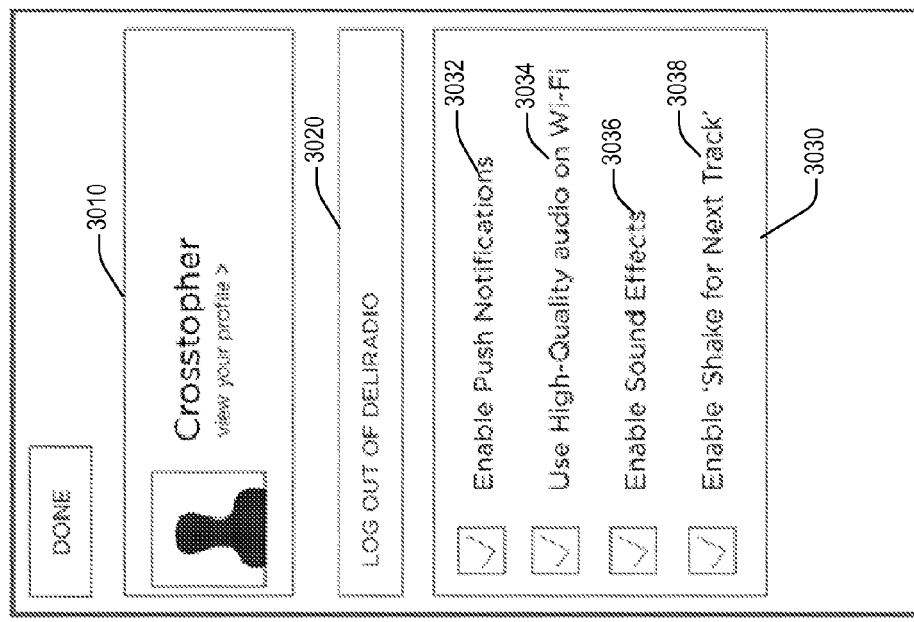

FIG. 30 shows an example screenshot of an alternate embodiment of a User Settings GUI 3001 which may be used to facilitate, initiate and/or perform various operation(s) and/or action(s) relating to the DeliRadio System technology described herein. In the example embodiment of FIG. 30, it is assumed that the user has tapped the "Settings" button on the QuickPlay homescreen and has landed on the User Settings GUI, where the user may view their own profile, log out of DeliRadio, enable "push" notifications to their mobile device, use high-quality audio on Wi-Fi, enable sound effects in the DeliRadio app, enable "Shake for Next Track" to skip tracks in a station, etc.

Figure 31:
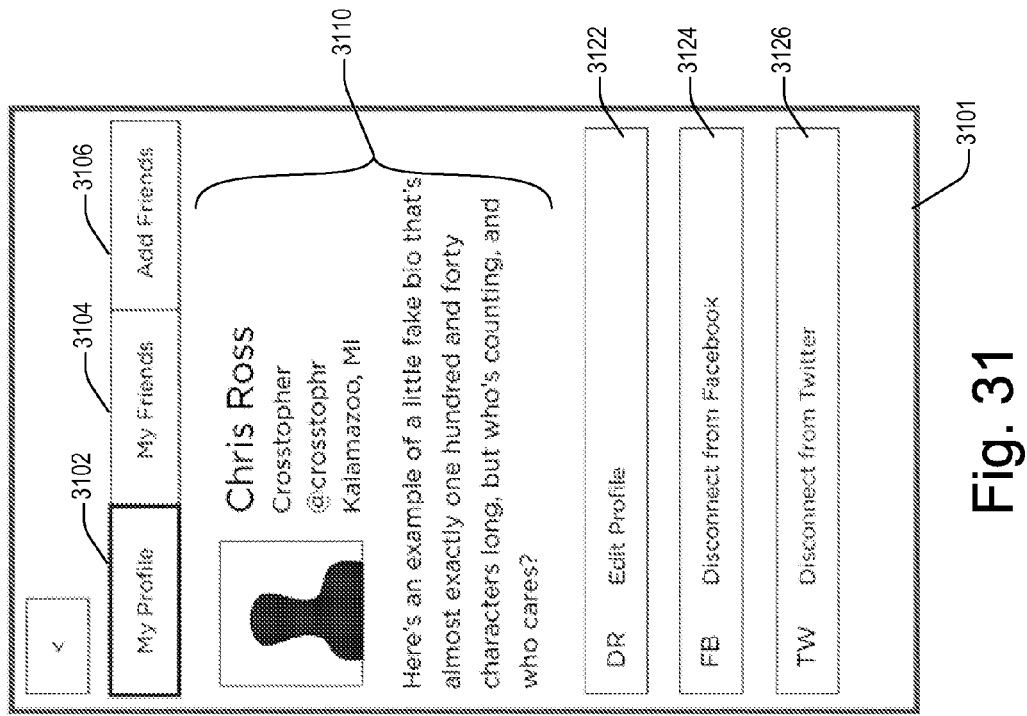

FIG. 31 shows an example screenshot of an alternate embodiment of a User Profile GUI 3101 which may be used to facilitate, initiate and/or perform various operation(s) and/or action(s) relating to the DeliRadio System technology described herein.

FIG. 32 shows an example screenshot of an embodiment of a User Edit Profile GUI 3101 which may be used to facilitate, initiate and/or perform various operation(s) and/or action(s) relating to the DeliRadio System technology described herein.

FIG. 33 shows an example screenshot of an embodiment of a My Friends GUI 3301 which may be used to facilitate, initiate and/or perform various operation(s) and/or action(s) relating to the DeliRadio System technology described herein. In the example embodiment of FIG. 33, the My Friends GUI may enable the user to view other DeliRadio users who have previously accepted the user's friend requests. In the specific example embodiment of FIG. 33, the current user has no pending unaccepted friend requests (3310). The user may edit their DeliRadio friends by clicking the "edit" button 3308. In at least some embodiment, the displayed list of the user's DeliRadio friends may include additional information such as, for example, one or more of the following (or combinations thereof):
friend's real name;
friend's hometown;
friend's recent activity;
friend's current geolocation;
and/or other types of user-related information described and/or referenced herein.

Figure 34:
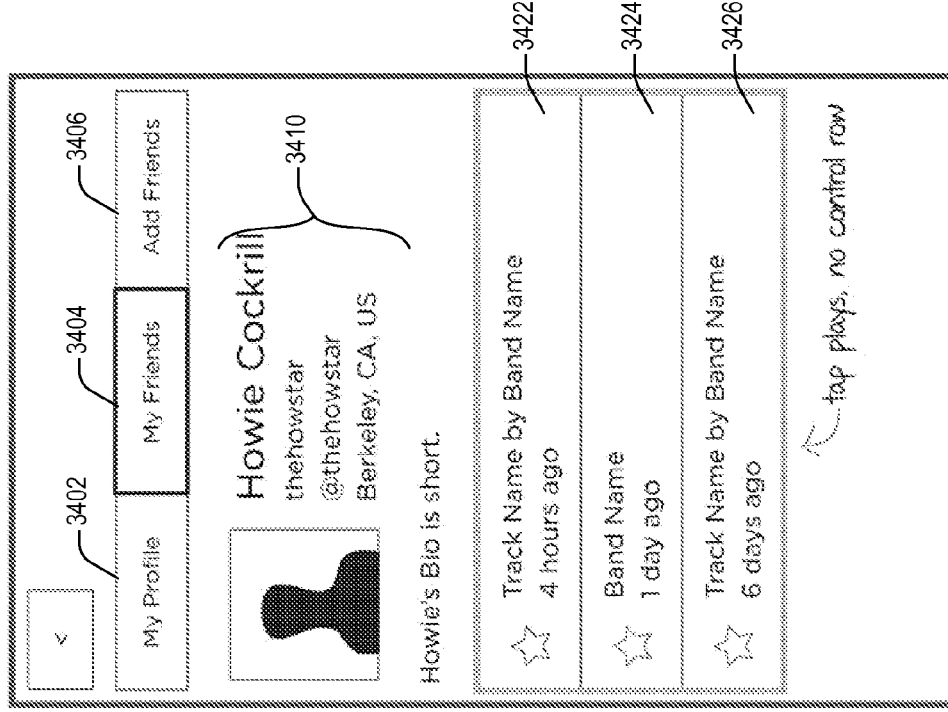

FIG. 34 shows an example screenshot of an alternate embodiment of a User Info GUI 3401 which may be used to facilitate, initiate and/or perform various operation(s) and/or action(s) relating to the DeliRadio System technology described herein. In the example embodiment of FIG. 34, it is assumed that the user has chosen to view the profile of a specific DeliRadio friend, Howie Cockrill. The user is able to see this friend's name, their DeliRadio username, their Twitter handle, their location, their bio, and tracks and/or artists that this DeliRadio friend have "starred." By tapping on a specific starred track (e.g., 3422), the DeliRadio Mobile Application may initiate streaming of the selected track from the DeliRadio System, for playback at user's mobile device. By tapping on a specific starred artist/band (e.g., 3424), the DeliRadio Mobile Application may initiate streaming of a dynamic DeliRadio Station which plays tracks performed by (or recorded by) the identified artist/band. In the specific example embodiment of FIG. 24, the displayed content "Tap plays, no control row" indicates that there are no drop-down action controls for at least one starred item as their might be for content starred by the user themselves.

Figure 35:
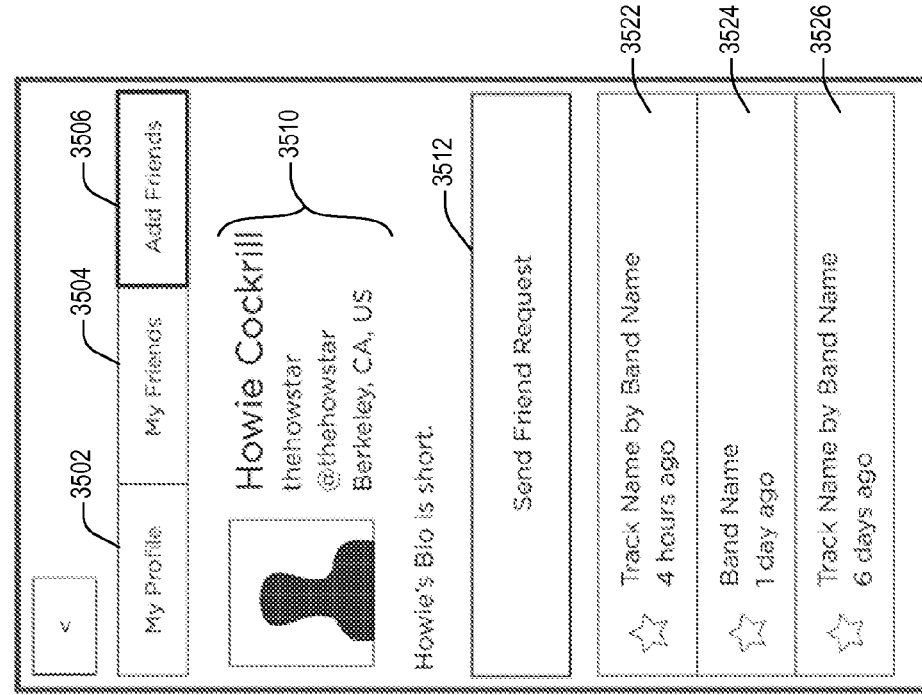

In the example embodiment of FIG. 35, it is assumed that the user has performed a search of DeliRadio users to add as "friends." The user has selected one potential friend (e.g., Howie Cockrill) from the list and is viewing that user's profile. The user may send a friend request (3512) to the selected user (Howie Cockrill) from this GUI, as well as view and listen to content "starred" by that user.

Figures 36, 37:
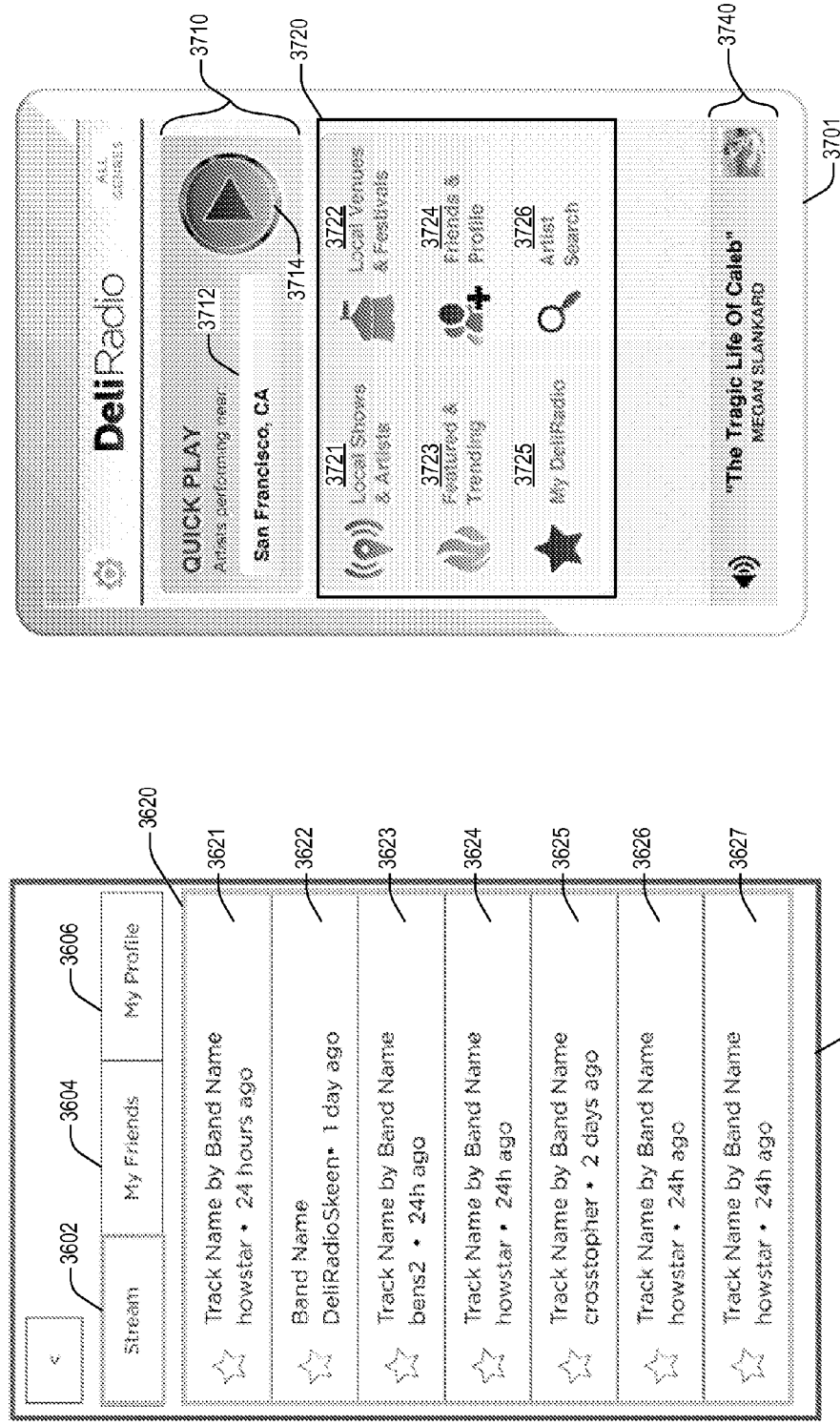

FIG. 36 shows an example screenshot of an embodiment of a Friends Favorites GUI 3601 which may be used to facilitate, initiate and/or perform various operation(s) and/or action(s) relating to the DeliRadio System technology described herein. In the example embodiment of FIG. 36, it is assumed that the user is viewing a "Stream" of activities/events relating to Favorite tracks and/or artists which have been recently starred by the user's DeliRadio friends. The user may tap a starred track name or band name to begin listening to the selected track, and/or to begin listening to a streamed customized DeliRadio Station which is dynamically created to play tracks performed by (or recorded by) the selected artist/band.

DeliRadio Quick Play

FIG. 37 shows an example screenshot of an embodiment of a QuickPlay GUI 3701 which may be used to facilitate, initiate and/or perform various operation(s) and/or action(s) relating to the DeliRadio System technology described herein. With one tap (e.g., on Play icon 3714), a user may hear artists with upcoming live events within a preset geographic radius and preset time frame around the user's selected location, filtered by the user's genre settings Immediately below the "QuickPlay" module, the user may also choose from other search and listening options, including, for example, one or more of the following (or combinations thereof):
Viewing a list of upcoming local events and the artists playing them, and listening to that list as a DeliRadio station. (e.g., 3721)
Viewing a list of venues and upcoming festivals local to the user, and listening to a specific venue or festival's lineup of artists as a DeliRadio station. (e.g., 3722)
Viewing a list of featured and popular DeliRadio artists and stations, and listening to each featured or popular artist's DeliRadio station and each featured or popular DeliRadio station. (e.g., 3723)
Viewing a list of the user's existing DeliRadio friends (where the user may also connect with additional friends) and viewing/editing the user's existing DeliRadio profile. (e.g., 3724)
Viewing, listening to and sharing with others the user's current "starred" or "favorited" DeliRadio artists, songs and stations. (e.g., 3725)
Searching for specific artists, venues, festivals and stations in DeliRadio's database. (e.g., 3726)
Access "genre filters" by tapping the Genre button in the top right corner of the mobile application GUI. When selected, these genre filters may be set to apply to a discrete search or be set to apply universally throughout one or more searches the user performs on the application.

Figure 39:
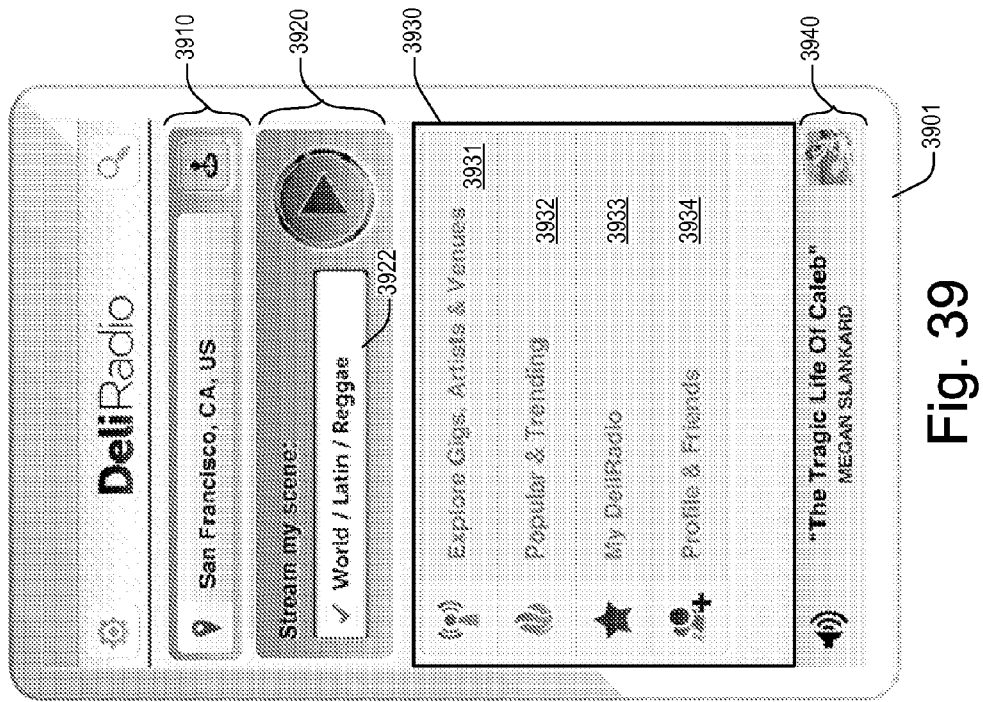
Figure 38:
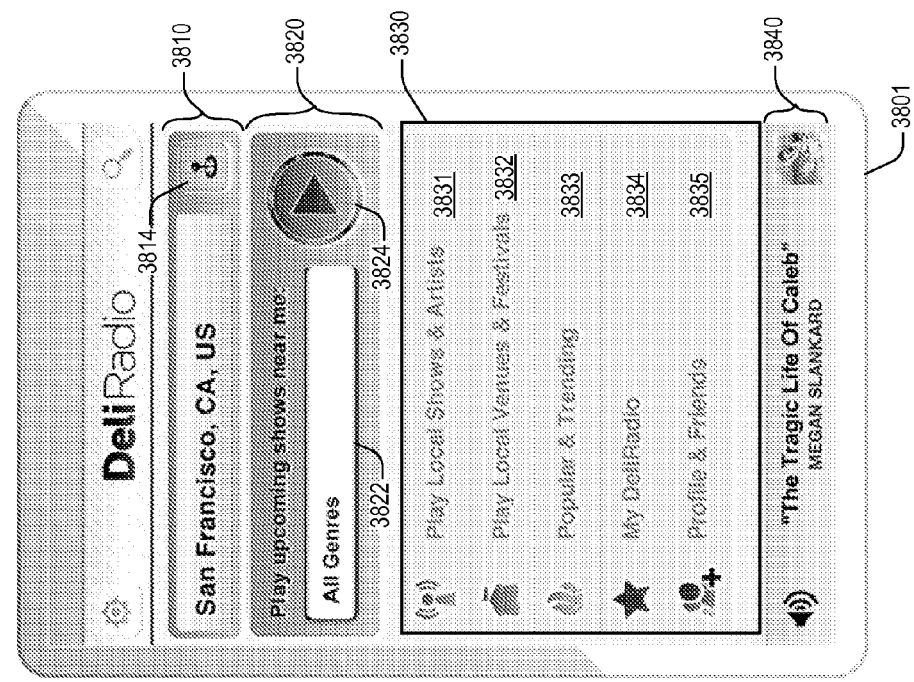

FIG. 38 shows an example screenshot of an embodiment of a QuickPlay Genre GUI 3801 which may be used to facilitate, initiate and/or perform various operation(s) and/or action(s) relating to the DeliRadio System technology described herein. With one tap (e.g., on Play icon 3824), a user may begin listening to a streamed, customized DeliRadio Station which is dynamically created to play tracks matching one or more specified genres (e.g., 3822) which are performed by (or recorded by) artists/bands that have upcoming shows in the specified geographic location (e.g., 3810). For example, as illustrated in the example embodiment of FIG. 39, it is assumed that the user has selected a genre grouping of "World/Latin/Reggae" (e.g., 3922). In at least one embodiment, the DeliRadio System may also filter the selection of tracks to be included in the streamed DeliRadio Station using preset geographic radius criteria and preset timeframe criteria.

Figure 40:
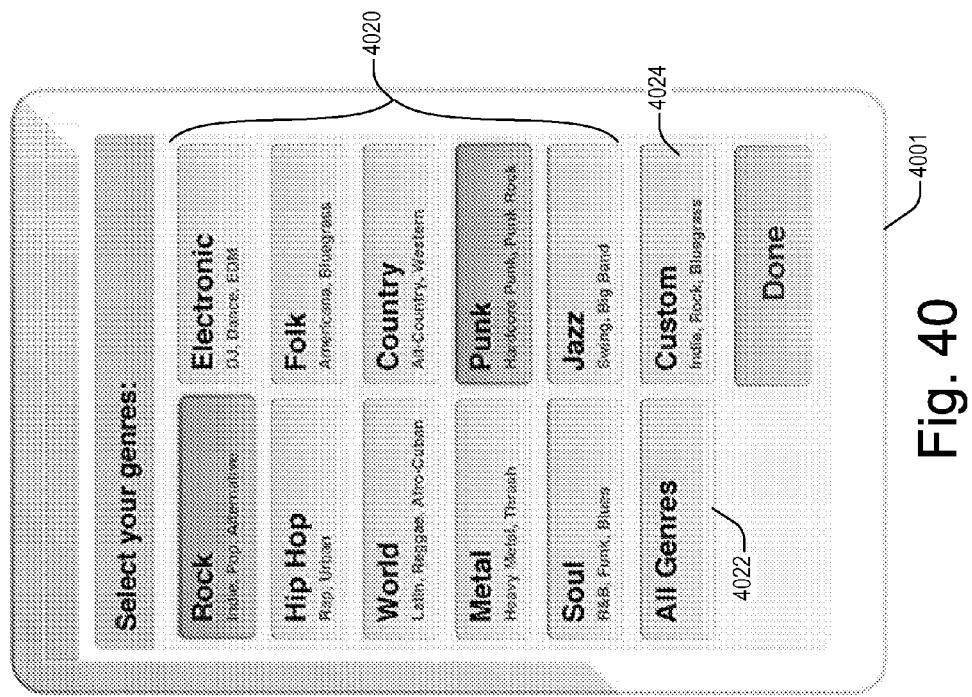

FIG. 40 shows an example screenshot of an alternate embodiment of a Genre Selection GUI 4001 which may be used to facilitate, initiate and/or perform various operation(s) and/or action(s) relating to the DeliRadio System technology described herein. In at least one embodiment, the Genre Selection GUI 4001 may be configured or designed include functionality for facilitating the user in selectively chosing and/or inputting genre-related and/or tag-related filtering criteria to be used as part of the user-specified search criteria. For example, as illustrated in the example embodiment of FIG. 40, the displayed top-level genre groups allow a user to quickly select a group of genres that are commonly associated with one another, rather than having to select them one by one. The ability to select genres one by one, and/or create customized genre groupings are also available to the user.

Figure 41A:
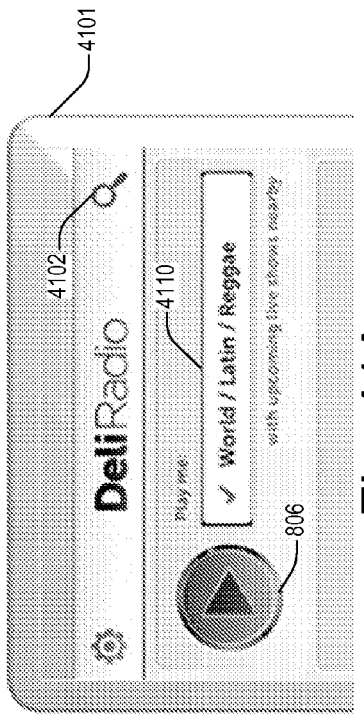
Figure 41B:
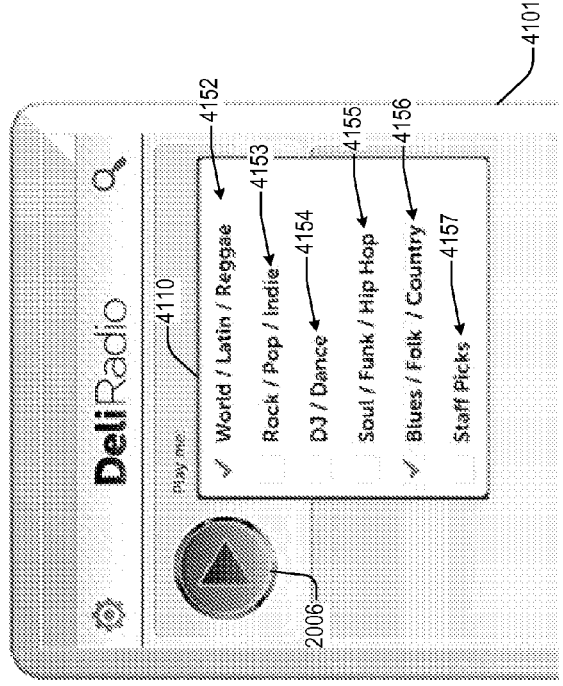

FIGS. 41A and 42B show an example screenshots of different embodiments illustrating the Genre Selection GUI (e.g., FIG. 38) may provide the user with the ability to input and/or to select one or more genres or genre groups via use of manual input interfaces and/or dynamic drop-down menus (e.g., 4110).

Figure 42:
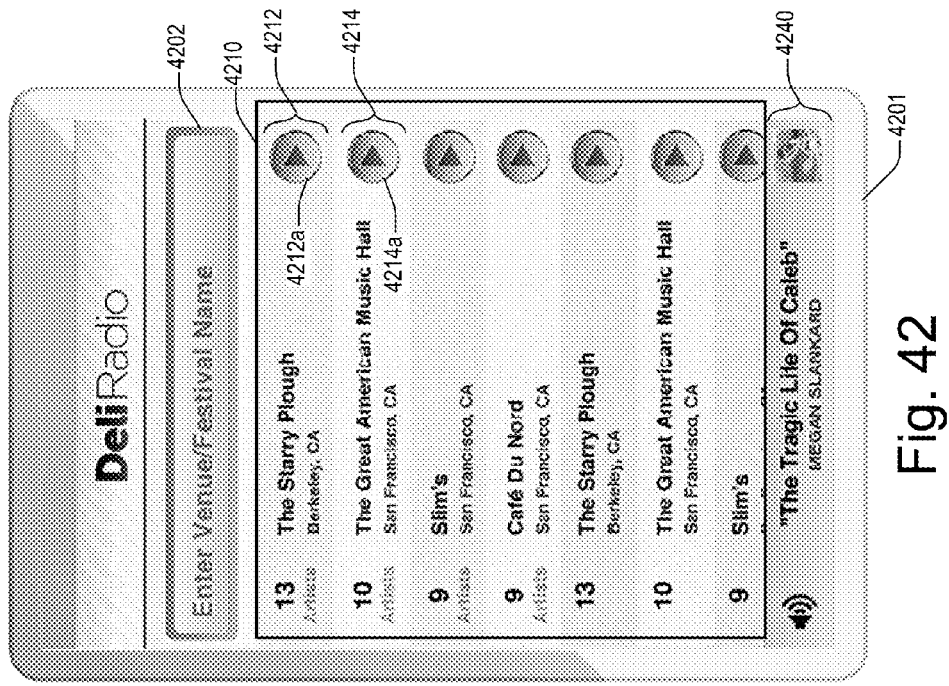

FIG. 42 shows an example screenshot of an alternate embodiment of a Local Shows GUI 4201 which may be used to facilitate, initiate and/or perform various operation(s) and/ or action(s) relating to the DeliRadio System technology described herein. In the example embodiment of FIG. 42, it is assumed that a user has tapped "Local Venues & Festivals" icon (3721) of the QuickPlay GUI of FIG. 37, and has been presented with Local Shows GUI 4201. In at least one embodiment, the Local Shows GUI may be configured or designed to provide functionality for enabling the user to view a listing of venues and festivals geographically proximal to the user as well as the number of artists in the DeliRadio database performing at that venue. Clicking or tapping the "Play" button (e.g., 4212*a*) associated with a given venue record (4212), may cause the DeliRadio System to dynamically generate and begin streaming a customized DeliRadio Station which plays tracks performed by (or recorded by) the artists/bands who will be performing at the identified venue or festival.

In at least one embodiment, as used here, the term "venue" may be defined as a physical place where an organized an organized event takes place such as a live music performance, a concert, a festival, and the like. Examples of different types of venues may include, but are not limited to, one or more of the following (or combinations thereof):

A physical building or convention center (e.g., Moscone Center, San Francisco).

An arena, amphitheatre, or stadium (e.g., Red Rocks Amphitheatre, Colorado)

A business establishment such as a bar, restaurant, coffee shop, etc.

A concert hall (e.g., Great American Music Hall, San Francisco)

An organized festival such as, for example, New Orleans Jazz Festival, High Sierra Music Festival, Telluride Bluegrass Festival, etc.

Figure 43:
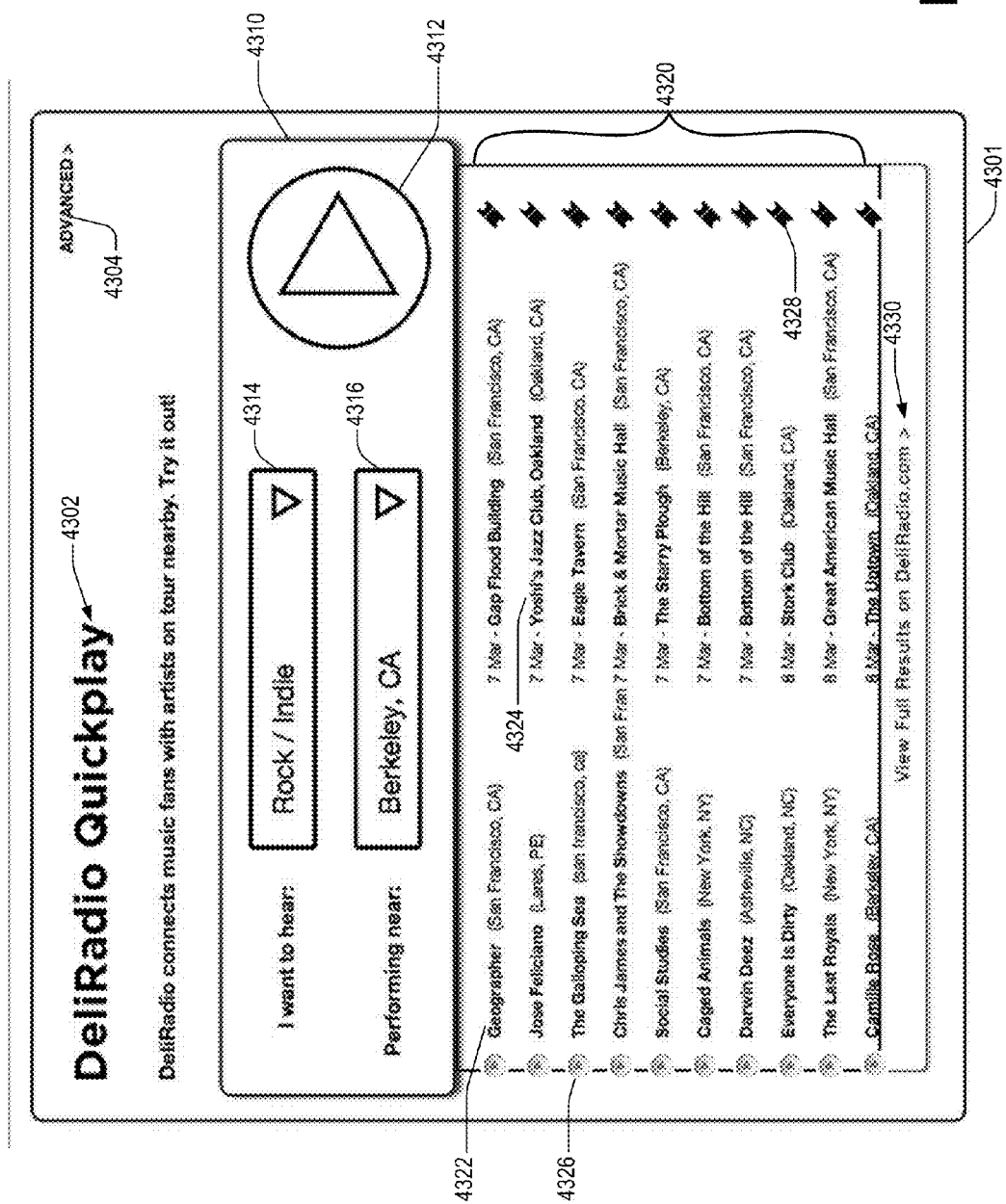

FIG. 43 shows an example screenshot of an embodiment of a DeliRadio Quickplay Webpage GUI 4301 which may be used to facilitate, initiate and/or perform various operation(s) and/or action(s) relating to the DeliRadio System technology described herein. In at least one embodiment, the DeliRadio Quickplay Webpage GUI may be implemented as a standalone website, which, for example, may be accessed via an internet URL such as http://play.deliradio.com. Upon loading, the user's geolocation may be determined by the DeliRadio System using the user's IP address, and the geolocation information may be dynamically entered into the "Performing Near" interface 4316 of the DeliRadio Quickplay Webpage GUI. The user may use the genre selection input interface 4314 to input/select genre filter criteria, and/or may interact with the "Performing Near" dropdown menu 4316 to select other geographic locations, if desired. In one embodiment, the "Performing Near" dropdown menu they include at least some preconfigured geographic locations such as, for example, Chicago, Paris, New York, London, Los Angeles, etc., as well as an option to input a "Custom Location." Clicking the "Advanced" icon 4304 may re-direct the user to the deliradio.com website. Clicking on "View Full Results on DeliRadio.com" may also re-direct the user to the deliradio.com website.

In at least one embodiment, by clicking on the Play icon 4312, a user may begin listening to a streamed, customized DeliRadio Station which is dynamically created to play tracks matching one or more specified genres (e.g., 4314) which are performed by (or recorded by) artists/bands that have upcoming shows in the specified geographic location (e.g., 4316). Clicking an Artist name (e.g., 4322) opens the artist's DeliRadio profile. Clicking the venue name (e.g., 4324) opens a Venue search on DeliRadio.

In at least one embodiment, associated with each artist entry in Quickplay list 4320 is a respective "Play" icon (e.g., 4326) which, when hovered over becomes active/green. Clicking on a given Play icon opens a Pop Out Player which begins streaming a customized DeliRadio Station which is dynamically created to play tracks which are performed by (or recorded by) the associated artist/band, that have upcoming shows in the specified geographic location (e.g., 4316). In some embodiments, each venue event listed in the Quickplay list 4320 has associated therewith a respective Ticket Icon (e.g., 4328) that, when clicked, may direct the user to a Ticket Purchase/Reservation GUI for facilitating the user in purchasing and/or reserving tickets for the selected event.

Additional details relating to DeliRadio ticket purchasing and/or reservation functionality are described in U.S. patent application Ser. No. 13/844,672, titled "MULTI-MEDIA MANAGEMENT, STREAMING, AND ELECTRONIC COMMERCE TECHNIQUES IMPLEMENTED OVER A COMPUTER NETWORK", naming SKEEN, et. al. as inventors, and filed Mar. 15, 2013, the entirety of which is incorporated herein by reference for all purposes.

Venue Stations

Figure 45:
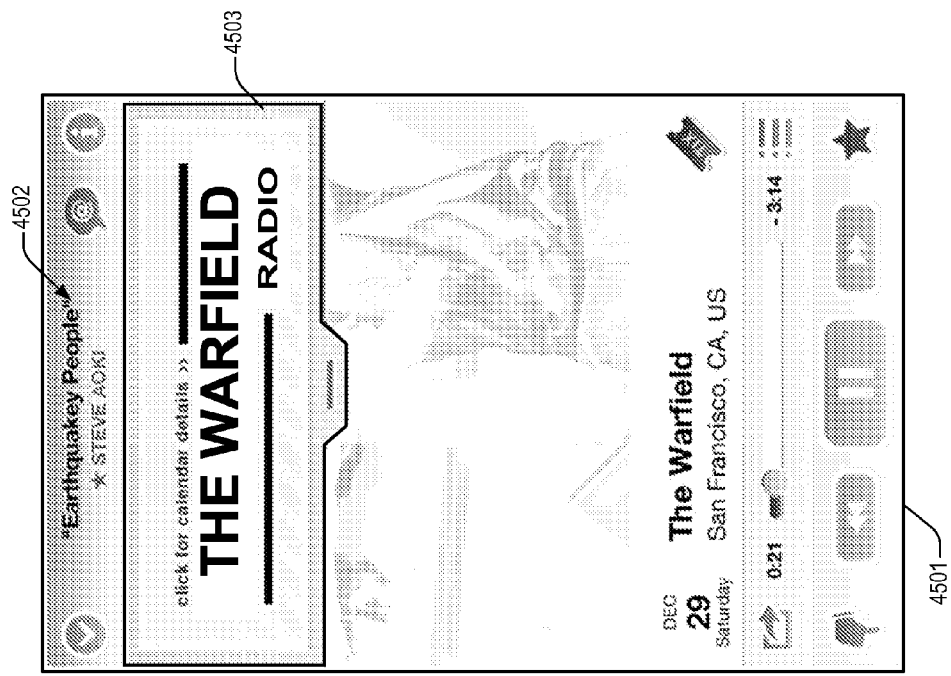
Figure 44:
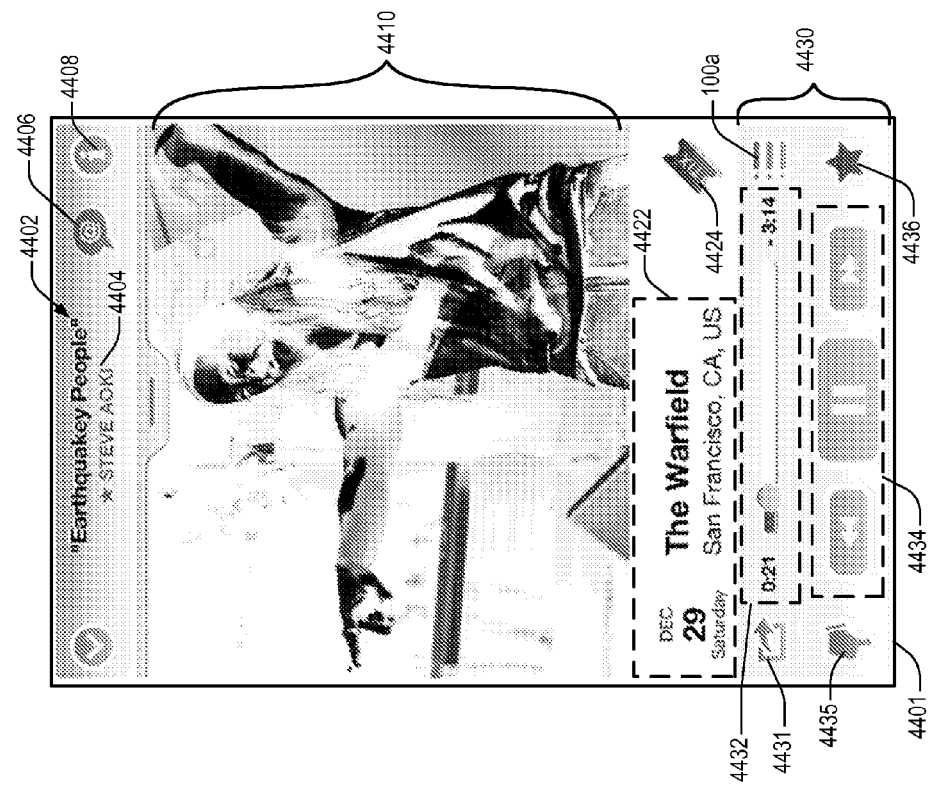

FIG. 44 shows an example screenshot of an embodiment of a Venue Station GUI 4401 which may be used to facilitate, initiate and/or perform various operation(s) and/or action(s) relating to the DeliRadio System technology described herein. FIG. 45 shows an example screenshot of an alternate embodiment of a Venue Station GUI 4501 which may be used to facilitate, initiate and/or perform various operation(s) and/or action(s) relating to the DeliRadio System technology described herein.

As illustrated in the example embodiments of FIGS. 44 and 45, the Venue Station GUI may be configured or designed to be implemented and branded as a venue-specific dynamic DeliRadio Station which has been customized for a specific venue. In at least one embodiment, multiple different venues may each have associated therewith respective DeliRadio Venue Station which has been customized for that specific venue. For example, in the example embodiment of FIG. 44, it is assumed that the Venue Station GUI has been customized as a DeliRadio Venue Station for The Warfield Theater of San Francisco, Calif. As illustrated in the example embodiment of FIG. 45, the Venue Station GUI shows a branded header for "The Warfield Radio". In at least one embodiment, the Warfield Radio station is configured to stream songs or tracks which are performed by (or recorded by) artists/bands that have upcoming shows at The Warfield Theater. In some embodiments, the Warfield Radio station may also be configured to stream songs or tracks which are performed by (or recorded by) artists/bands that have performed at The Warfield Theater.

In at least one embodiment, the DeliRadio Venue Station is a feature unique to the DeliRadio service, offering streaming radio and GUI functionality that displays upcoming show information for a given venue while concurrently streaming songs of that venue's upcoming linup of bands/artists. In at least one embodiment, the Venue Station GUI provides functionality for enabling the user to filter the displayed content and/or streamed audio content based on desired genre preferences and/or timeframe (e.g., show date) preferences.

According to different embodiments, the Venue Station GUI may be configured or designed to provide functionality for one or more of the following features (or combinations thereof):

- Control playback of tracks streamed from the DeliRadio Venue Station (e.g., via playback control interfaces 4432, 4434)
- Display image and/or video content (e.g., 4410) relating to the venue and/or relating to events or shows at the venue.
- Enables users to share the station to his/her social network profiles, email it to a friend, copy the station URL, or obtain the necessary code to embed the actual player on another website.
- Enables users to nix the Artist or Track, thereby instructing the system not to play the Artist or Track for the user in the future. According to different embodiments, the user may also Star the Band, Station, Album, Event, Venue, and/or Track(s) currently playing, thereby adding it to the user's list of favorite bands, stations, tracks, events, venues, etc.
- Displays a hyperlinked band name which users may click to visit the band's Artist Profile Page.
- Displays a hyperlinked venue name which users may click to visit the venue's DeliRadio Profile Page.
- Shows information about the currently-playing band's next performance, such as, for example, one or more of the following (or combinations thereof): date, venue name and location (e.g., 4422), and a link (e.g., 4424) to purchase and/or reserve tickets to that show.
- Display lyrics to the song currently playing, with display synced to song audio.
- Display guitar tablature or other musical notation for the song currently playing, with display synced to song audio.
- Display a slideshow of merchandise being offered for sale by the band. User may click on image of at least one item of merchandise to purchase that item.
- Display a User Interactivity GUI allowing the user to interact with the music. In one embodiment, the User Interactivity GUI includes, for example, a range of graphic elements, such as, for example, one or more of the following (or combinations thereof): pads, keys, rotary controllers, sliders, faders, and buttons. These elements are mapped to a sound-generating device, such as, for example, the MIDI synthesizer component in the user's computer. By interfacing with these elements, the user may generate his/her own musical or sonic accompaniment to the track currently playing. In one embodiment, the User Interactivity GUI also enables the user to dynamically remix the song currently playing, allowing him/her to change various aspects of the track, such as, for example, one or more of the following (or combinations thereof): instrument volumes, instrument panning, effects (reverb, delay, etc.). This remix functionality enables the user to isolate different elements of the track for study or enjoyment, as well as generate a variety of different remixes of the track, at least one of which may be saved.
- User-generated accompaniments and remixes may be displayed on the user's profile page, where they may be streamed, ranked by users, and purchased. These user-generated tracks may also be entered into the DeliRadio System, where they may be returned alongside the original track in search results.

One of the notable features of the DeliRadio Venue Station functionality is that such functionality may be advantageously leveraged by venue owners/managers to provide their customers with the ability to listen to a variety of songs which are performed by (or recorded by) artists/bands who will be performing at that particular venue. For example, by utilizing the DeliRadio Venue Station functionality venue owners/managers no longer need to be burdened with the task of continuously uploading, modifying and maintaining updated playlists of songs of artists/bands who will be performing at their venue. Rather, in at least one embodiment, the venue owner/manager need only embed their customized DeliRadio Venue Station on their website home page to provide their customers with the ability to listen to a variety of songs which are performed by (or recorded by) artists/bands who will be performing at that venue. Because the DeliRadio System includes functionality for automatically and continuously tracking upcoming shows and events at a given venue/festival, and includes functionality for automatically and continuously tracking the artists/bands who will be performing at the given venue, the DeliRadio System is able to automatically and dynamically generate a venue-specific dynamic DeliRadio Station which has been configured to stream songs or tracks which are performed by (or recorded by) artists/bands that have upcoming shows at that venue. In at least one embodiment, the DeliRadio System may charge a service or subscription fee to venue owners/operators for access to the various DeliRadio Venue Station features and functionalities Embedded Streaming Music Widgets for Websites In at least one embodiment, third party websites and online content providers can easily embed DeliRadio streaming music players on their websites. For example, one embodiment involves the user creating a DeliRadio station, launching a Pop-Out Player, and, from the Pop-Out Player, generating an embed code unique to that station. The user can then copy that code and paste it into the code for any website, and the user's station may then appear as an "embedded station" on that user's website. This embodiment of an embedded station condenses the visual appearance of the Pop-Out Player into a customizable size, and also gives the user choices of background colors. By using the sharing tools on the DeliRadio Pop-Out Player, the station may also be embedded on Facebook pages and in Facebook comment sections. A player embedded on a website as described herein can also be "popped out" into a DeliRadio Pop-Out Player so that the listening experience occurs within the Pop-Out Player, or the user can be redirected to the station listing on the DeliRadio.com website.

In addition to artist name and track name, the DeliRadio Pop-Out Player may feature concert information and ticket purchase/reservation links, which make it ideal for event-focused websites attempting to drive event ticket sales, such as venues, festivals, news weeklies, booking agencies, management companies, and live music focused blogs.

An alternate embodiment of the embedded player may include an image (e.g., coded via java script) that is embedded on a third party site. When the image is clicked, the Pop-Out Player associated with the station referenced in the image/java script may be opened. The image may be custom designed for each website to take on the "look and feel" of that website's branding, and may also include the website's or company's logo. In this way, new or additional website features and brand extensions (e.g., custom internet radio) may be added to an existing brand. The user can also upload a header graphic of their choice (with associated hyperlink) to the DeliRadio Pop-Out Player In at least one embodiment, the DeliRadio Pop-Out Player may be configured or designed to be implemented or instantiated as a standalone browser page, and may be further configured or designed to persist (and continue to play streaming music at the user's computer system) as a user navigates across different websites (or across multiple pages of a website) such that the Pop-Out Player and streamed music is not affected by page reloads and/or other Internet browsing activities performed by the user (including not being affected by page reloads of the website from which the Pop-Out Player originates).

At least some embodiments of DeliRadio embedded stations involve the stations automatically updating themselves over time based on event information within the station. Accordingly, once the DeliRadio embedded player is live on a website, the website operator does not need to update it. Although, in at least some embodiments may be desirable for the website operator to ensure that artists with events covered under the DeliRadio Station have DeliRadio accounts, thus ensuring those artists are being fed into the station.

Figure 46:
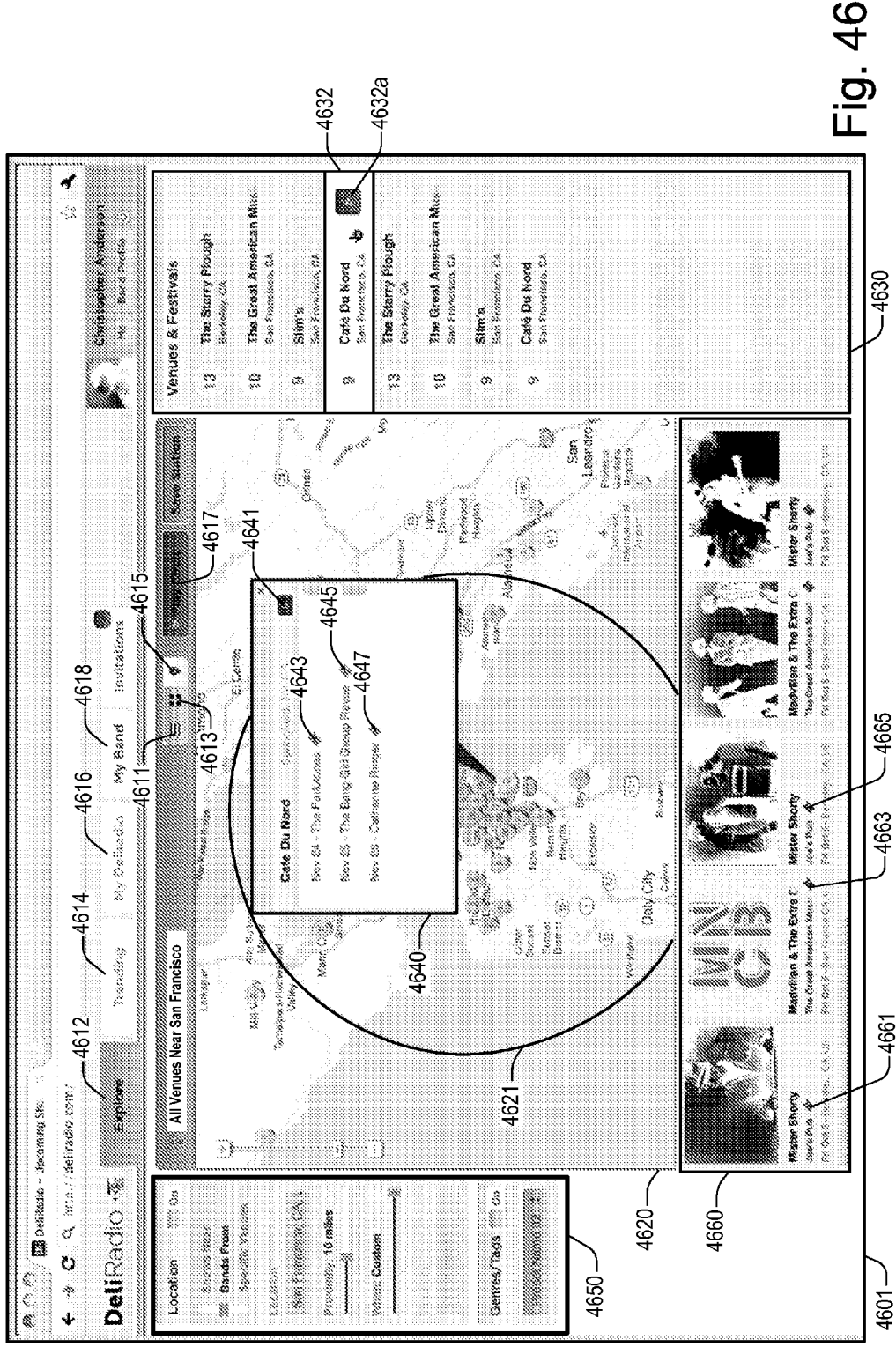

One of the advantages of the DeliRadio's embedded player widget is that it may be optimally designed specifically for the live events market. Alternate embodiments of DeliRadio's embedded players include:
  Track-by-track playlists, instead of radio stations
  Listener/User comments on the tracks in the station or the station as a whole, within the player, in timed relation to the song
  Music "buy" links
  Password protected embedded players for restricted access
  Giving users more customization control over the player, such as, for example, one or more of the following (or combinations thereof):
    how the images in the player animate
    whether the player starts playing automatically when a page is loaded
    display of info about the player, including song play count
    allowing users to provide their own themes via CSS FIG. 46 shows an example screenshot of an alternate embodiment of a DeliRadio Home Page GUI 4601 which may be used to facilitate, initiate and/or perform various operation(s) and/or action(s) relating to the DeliRadio System technology described herein. As illustrated in the example embodiment of FIG. 46, the DeliRadio Home Page GUI may be configured or designed to include, facilitate, enable, initiate, and/or perform one or more of the following operation(s), action(s), and/or feature(s) (or combinations thereof):
  Provide the ability for a user to select between map view, grid view and list view.
  Grid view shows venue & show date with ticket links (e.g., 4643, 4645, 4647).
  Shows & Festivals GUI portion 4630 displays information relating to venues and festivals included within the radius circle 4621.
  Dynamic sorting of list of venues/festivals.
  Highlighted/colored play button appears when user hovers over a venue in the list.
  Clicking on a blue guitar pick icon now turns it yellow to show that it's active.
  Play button 4641 in the venue window 4640 for enabling a user to stream songs or tracks which are performed by (or recorded by) artists/bands that have upcoming shows at the selected venue.
  Explore GUI functionality 4612 and Trending GUI 4614 functionality.
  Genre/tag filter may also show preset "saved" genre/tag searches.

Other Features/Benefits/Advantages

According to different embodiments, at least some DeliRadio System(s) may be configured, designed, and/or operable to provide, enable and/or facilitate one or more of the following features, functionalities, benefits and/or advantages (or combinations thereof):
  Station Header Graphic—In at least one embodiment, when a new station is created, the station creator/owner has the option of selecting an image to appear in the header of the Pop-Out Player. The image can also be associated with a hyperlink, so when it is clicked by a user, the user may be redirect to a desired URL (example: www.popnye.com). This functionality may be implemented as part of a broader concept of allowing venues & festivals to claim and "brand" their own DeliRadio stations.
  Venue Stations—In at least one embodiment, the "pre-set stations" of the DeliRadio homepage may include a list of venues that match the user's search/filter parameters. Each venue may have associated therewith a respective play button next to enable a user to listen to that venue's customized DeliRadio Venue Station.
  Events: "Starring"+Calendaring+Sharing:
  "Star" an event to add it to an internal DeliRadio calendar.
  Sync the user's DeliRadio calendar with iCal or Google Calendar.

Share an event with a friend or set of friends.

"Starring"+Facebook—By logging in with Facebook, the DeliRadio System may automatically "star" all the bands a user "liked" on Facebook which are also in DeliRadio database.

Playable Notifications (Email+In-App)—In at least one embodiment, this may be implemented using generic notification messages such as "80 rock shows happening near Albany this week. Listen here >>". In other embodiments, at least some notifications may be based on the user's "starred" bands, tracks, venues, and/or preferred genres. Users may also have the ability to receive notifications about their friends, and their friends' friends. In one embodiment, when a given notification is clicked or selected by a user, it launches the DeliRadio Pop-up Player (or DeliRadio Mobile Application on mobile device), and begins to stream a dynamic DeliRadio Station based on the selected notification details. Examples of at least some types of notifications may include, but are not limited to, one or more of the following (or combinations thereof):

"80 rock shows happening near Oakland this week" (generic genre-based notification)

"6 of the user's starred artists have nearby shows this week" (user starred artist notification)

"The user's friend DWolf just starred Steve Winwood" (friend stars artist notification)

"36 starred artists have nearby shows this week" (starred artist notification—stars could include artists the user has starred, artists the user's friends have starred, artists that friends of the user's friends have starred, etc.)

"The user's friend DWolf just starred an Event" (event notification)

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for facilitating user access to streamed multimedia content via a computer network, the method comprising:
    receiving a first set of input from a first user, the first set of input including first venue filter criteria, and including genre criteria specifying a first genre;
    determining a first set of filter criteria for use in performing a database search for music-related information matching the first set of filter criteria, wherein the first set of filter criteria includes the first venue filter criteria specifying a first venue;
    identifying a first set of artists or bands ("artists/bands") that are scheduled to perform in at least one live music performance at the first venue;
    identifying, using the first genre criteria, a filtered set of songs/tracks from at least one database which match the first genre criteria and which are performed by or recorded by at least one of the artists/bands of the first set of artists/bands;
    dynamically creating, using the filtered set of songs/tracks, a filtered venue-related streaming media station, wherein the filtered venue-related streaming media station is configured to stream songs/tracks from the filtered set of songs/tracks to the first user's electronic device; and
    streaming, in response to the first set of input, songs/tracks from the filtered set of songs/tracks to the first user's electronic device.

2. The method of claim 1 wherein the first set of input includes timeframe criteria specifying a first time interval, the method further comprising:
    identifying a second set of artists or bands ("artists/bands") that are scheduled to perform in at least one live music performance at the first venue during the first time interval; and
    identifying a second filtered set of songs/tracks from at least one database which are performed by or recorded by at least one of the artists/bands of the second set of artists/bands; and
    dynamically modifying, using the second filtered set of songs/tracks, the filtered venue-related streaming media station, wherein the filtered venue-related streaming media station is configured to stream songs/tracks from the second filtered set of songs/tracks to the first user's electronic device.

3. The method of claim 1 wherein the first set of input includes timeframe criteria specifying a first time interval, the method further comprising:
    identifying a second set of artists or bands ("artists/bands") that are scheduled to perform in at least one live music performance at the first venue during the first time interval;
    identifying a second filtered set of songs/tracks from at least one database which match the first genre criteria and which are performed by or recorded by at least one of the artists/bands of the second set of artists/bands; and
    dynamically creating, using the second filtered set of songs/tracks, a second filtered venue-related streaming media station, wherein the second filtered venue-related streaming media station is configured to stream songs/tracks from the second filtered set of songs/tracks to the first user's electronic device.

4. The method of claim 1 further comprising:
    dynamically creating, using the first set of songs/tracks, a second venue-related streaming media station, wherein the second venue-related streaming media station includes only songs/tracks from the first set of songs/tracks.

5. The method of claim 1 further comprising:
    identifying a second set of artists/bands that have performed at least one live music performance at the first venue;
    performing, using the second set of artists/bands, a database search of at least one database for songs or tracks ("songs/tracks") which are performed by or recorded by at least one of the artists/bands of the second set of artists/bands;
    identifying a second set of songs/tracks from the at least one database which are performed by or recorded by at least one of the artists/bands of the second set of artists/bands; and
    dynamically creating, using the second set of songs/tracks, a second venue-related streaming media station, wherein the second venue-related streaming media station includes songs/tracks from the second set of songs/tracks.

6. The method of claim 1 further comprising:
identifying a second set of artists/bands that have performed at least one live music performance at the first venue;
performing, using the second set of artists/bands, a database search of at least one database for songs or tracks ("songs/tracks") which are performed by or recorded by at least one of the artists/bands of the second set of artists/bands;
identifying a second set of songs/tracks from the at least one database which are performed by or recorded by at least one of the artists/bands of the second set of artists/bands; and
dynamically creating, using the first and second set of songs/tracks, a second venue-related streaming media station, wherein the second venue-related streaming media station includes both songs/tracks from the first set of songs/tracks and songs/tracks from the second set of songs/tracks.

7. The method of claim 1 wherein the first venue corresponds to a first physical venue where live music performances are hosted.

8. The method of claim 1 wherein the first venue corresponds to a first festival where live music performances are hosted.

9. The method of claim 1 wherein the first venue corresponds to a first virtual venue which hosts live music performances.

10. The method of claim 1 further comprising:
presenting a first graphical user interface ("first GUI") at a first computer device of the first user;
receiving, via the first GUI, the first set of input from the first user, the first set of input including the first venue filter criteria specifying the first venue, and including the genre criteria specifying the first genre; and
receiving, via the first GUI, a first request from the first user to listen to a venue-related streaming media station which is configured to play songs or tracks ("songs/tracks") matching at least the first genre which are performed by or recorded by artists or bands ("artists/bands") that are scheduled to perform at least one live music performance at the first venue; and
streaming, in response to the first request, songs/tracks from the filtered set of songs/tracks to the first user's electronic device for playback at the first user's electronic device.

11. A computer implemented method for facilitating user access to multimedia content via a computer network, the method comprising:
determining a first set of filter criteria for use in performing a database search for music-related information matching the first set of filter criteria, wherein the first set of filter criteria includes search type criteria indicating that a search is to be performed for artists or bands matching the first set of filter criteria which have upcoming shows at the at least one venue, and wherein the first set of input includes genre criteria specifying a first genre;
performing, using the first set of filter criteria, a database search of at least one database for music-related information matching the first set of filter criteria;
identifying, using the first set of filter criteria, a first set of artists or bands matching the first set of filter criteria which have upcoming shows at the at least one venue;
identifying, using the first genre criteria, a filtered set of songs/tracks from at least one database which match the first genre criteria and which are performed by or recorded by at least one of the artists/bands of the first set of artists/bands;
dynamically creating, using the filtered set of songs/tracks, a filtered venue-related streaming media station, wherein the filtered venue-related streaming media station is configured to stream songs/tracks from the filtered set of songs/tracks to the first user's electronic device; and
streaming songs/tracks from the filtered set of songs/tracks to the first user's electronic device.

12. A computer-based system for facilitating user access to multimedia content via a computer network, the system comprising:
at least one processor;
at least one interface operable to establish a communication link to at least one network device; and
a memory storing a plurality of instructions;
the at least one processor being operable to execute the plurality of instructions stored in the memory, and being operable to operate with the memory and the at least one interface to:
receive a first set of input from a first user, the first set of input including first venue filter criteria, and including genre criteria specifying a first genre;
determine a first set of filter criteria for use in performing a database search for music-related information matching the first set of filter criteria, wherein the first set of filter criteria includes the first venue filter criteria specifying a first venue;
identify a first set of artists or bands ("artists/bands") that are scheduled to perform at least one live music performance at the first venue;
identify, using the first genre criteria, a filtered set of songs/tracks from at least one database which match the first genre criteria and which are performed by or recorded by at least one of the artists/bands of the first set of artists/bands;
dynamically create, using the filtered set of songs/tracks, a filtered venue-related streaming media station, wherein the filtered venue-related streaming media station is configured to stream songs/tracks from the filtered set of songs/tracks to the first user's electronic device; and
stream songs/tracks from the filtered set of songs/tracks to the first user's electronic device.

13. The system of claim 12 wherein the first set of input includes timeframe criteria specifying a first time interval, the system being further operable to:
identify a second set of artists or bands ("artists/bands") that are scheduled to perform at least one live music performance at the first venue during the first time interval; and
identify a second filtered set of songs/tracks from at least one database which are performed by or recorded by at least one of the artists/bands of the second set of artists/bands; and
dynamically modify, using the second filtered set of songs/tracks, the filtered venue-related streaming media station, wherein the filtered venue-related streaming media station is configured to stream songs/tracks from the second filtered set of songs/tracks to the first user's electronic device.

14. The system of claim 12 wherein the first set of input includes timeframe criteria specifying a first time interval, the system being further operable to:

identify a second set of artists or bands ("artists/bands") that are scheduled to perform in at least one live music performance at the first venue during the first time interval;

identify a second filtered set of songs/tracks from at least one database which match the first genre criteria and which are performed by or recorded by at least one of the artists/bands of the second set of artists/bands; and dynamically create, using the second filtered set of songs/tracks, a second filtered venue-related streaming media station, wherein the second filtered venue-related streaming media station is configured to stream songs/tracks from the second filtered set of songs/tracks to the first user's electronic device.

15. The system of claim 12 being further operable to:

dynamically create, using the first set of songs/tracks, a second venue-related streaming media station, wherein the second venue-related streaming media station includes only songs/tracks from the first set of songs/tracks.

16. The system of claim 12 being further operable to:

identify a second set of artists/bands that have performed at least one live music performance at the first venue;

perform, using the second set of artists/bands, a database search of at least one database for songs or tracks ("songs/tracks") which are performed by or recorded by at least one of the artists/bands of the second set of artists/bands;

identify a second set of songs/tracks from the at least one database which are performed by or recorded by at least one of the artists/bands of the second set of artists/bands; and dynamically create, using the second set of songs/tracks, a second venue-related streaming media station, wherein the second venue-related streaming media station includes songs/tracks from the second set of songs/tracks.

17. The system of claim 12 being further operable to:

identify a second set of artists/bands that have performed at least one live music performance at the first venue;

perform, using the second set of artists/bands, a database search of at least one database for songs or tracks ("songs/tracks") which are performed by or recorded by at least one of the artists/bands of the second set of artists/bands;

identify a second set of songs/tracks from the at least one database which are performed by or recorded by at least one of the artists/bands of the second set of artists/bands; and dynamically create, using the first and second set of songs/tracks, a second venue-related streaming media station, wherein the second venue-related streaming media station includes both songs/tracks from the first set of songs/tracks and songs/tracks from the second set of songs/tracks.

18. A computer-based system for facilitating user access to multimedia content via a computer network, the system comprising:

means for receiving a first set of input from a first user, the first set of input including first venue filter criteria, and including genre criteria specifying a first genre;

means for determining a first set of filter criteria for use in performing a database search for music-related information matching the first set of filter criteria, wherein the first set of filter criteria includes the first venue filter criteria specifying a first venue;

means for identifying a first set of artists or bands ("artists/bands") that are scheduled to perform at least one live music performance at the first venue;

means for identifying, using the first genre criteria, a filtered set of songs/tracks from at least one database which match the first genre criteria and which are performed by or recorded by at least one of the artists/bands of the first set of artists/bands;

means for dynamically creating, using the filtered set of songs/tracks, a filtered venue-related streaming media station, wherein the filtered venue-related streaming media station is configured to stream songs/tracks from the filtered set of songs/tracks to the first user's electronic device; and means for streaming, in response to the first set of input, songs/tracks from the filtered set of songs/tracks to the first user's electronic device.

19. The system of claim 18 further comprising:

means for identifying a second set of artists or bands ("artists/bands") that are scheduled to perform in at least one live music performance at the first venue during the first time interval;

means for identifying a second filtered set of songs/tracks from at least one database which match the first genre criteria and which are performed by or recorded by at least one of the artists/bands of the second set of artists/bands; and means for dynamically creating, using the second filtered set of songs/tracks, a second filtered venue-related streaming media station, wherein the second filtered venue-related streaming media station is configured to stream songs/tracks from the second filtered set of songs/tracks to the first user's electronic device.

* * * * *